(12) United States Patent
Azuma et al.

(10) Patent No.: US 10,872,432 B2
(45) Date of Patent: Dec. 22, 2020

(54) DISPARITY ESTIMATION DEVICE, DISPARITY ESTIMATION METHOD, AND PROGRAM

(71) Applicant: Panasonic Intellectual Property Management Co., Ltd., Osaka (JP)

(72) Inventors: Takeo Azuma, Kyoto (JP); Kunio Nobori, Tokyo (JP); Satoshi Sato, Kyoto (JP); Nobuhiko Wakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 16/235,149

(22) Filed: Dec. 28, 2018

(65) Prior Publication Data
US 2019/0213746 A1 Jul. 11, 2019

(30) Foreign Application Priority Data

Jan. 5, 2018 (JP) .................................. 2018-000878

(51) Int. Cl.
*G06T 7/73* (2017.01)
*G06T 7/55* (2017.01)
(Continued)

(52) U.S. Cl.
CPC ............... *G06T 7/55* (2017.01); *G01B 11/00* (2013.01); *G06K 9/6202* (2013.01); *G06T 7/73* (2017.01);
(Continued)

(58) Field of Classification Search
None
See application file for complete search history.

(56) References Cited

U.S. PATENT DOCUMENTS 5,768,404 A * 6/1998 Morimura ................ G06K 9/20
382/107
6,215,898 B1 * 4/2001 Woodfill .................. G06K 9/32
382/154
(Continued)

FOREIGN PATENT DOCUMENTS

JP          10-155091        6/1998
JP         2000-512790       9/2000
(Continued)

OTHER PUBLICATIONS

Heiko Hirschmuller, "Stereo Processing by Semiglobal Matching and Mutual Information", IEEE Transactions on Pattern Analysis and Machine Intelligence, vol. 30, No. 2, pp. 328-341, Feb. 2008.
(Continued)

*Primary Examiner* — Delomia L Gilliard
(74) *Attorney, Agent, or Firm* — Wenderoth, Lind & Ponack, L.L.P.

(57) ABSTRACT

A disparity estimation device calculates, for each of first pixels of a first image and each of second pixels of a second image, a first census feature amount and a second census feature amount, calculates, for each of the first pixels, a first disparity value of the first pixel with integer accuracy, extracts, for each of the first pixels, reference pixels located in positions corresponding to the first disparity value and a near disparity value close to the first disparity value from the second pixels, calculates sub-pixel evaluation values based on the relationship between the pixel values of the first pixel and the neighboring pixel and the pixel values of each of the reference pixels and the neighboring pixel, and estimates a second disparity value of the first pixel with sub-pixel accuracy by equiangular fitting.

19 Claims, 46 Drawing Sheets

(51) Int. Cl.
*G06K 9/62* (2006.01)
*G01B 11/00* (2006.01)
*H04N 13/239* (2018.01)
*H04N 5/247* (2006.01)
*H04N 13/00* (2018.01)

(52) U.S. Cl.
CPC ... *H04N 13/239* (2018.05); *G06K 2009/6213* (2013.01); *G06T 2207/10012* (2013.01); *G06T 2207/10028* (2013.01); *H04N 5/247* (2013.01); *H04N 2013/0081* (2013.01)

(56) References Cited

U.S. PATENT DOCUMENTS

| | | | |
|---|---|---|---|
| 8,705,846 B2 * | 4/2014 | Ishigami | G06T 7/55 |
| | | | 382/154 |
| 9,064,331 B2 * | 6/2015 | Yamashita | G06T 15/00 |
| 2003/0065466 A1 | 4/2003 | Jackson et al. | |
| 2008/0031514 A1 | 2/2008 | Kakinami | |
| 2010/0150455 A1 | 6/2010 | Oyama | |
| 2011/0199462 A1 * | 8/2011 | Nanri | G08G 1/165 |
| | | | 348/47 |
| 2013/0114887 A1 | 5/2013 | Nanri et al. | |
| 2014/0072205 A1 * | 3/2014 | Ishii | G06T 15/08 |
| | | | 382/154 |
| 2014/0379114 A1 | 12/2014 | Nakamura | |
| 2015/0172633 A1 | 6/2015 | Nobori et al. | |
| 2015/0199818 A1 | 7/2015 | Einecke | |
| 2015/0248594 A1 * | 9/2015 | Zhong | G06T 7/593 |
| | | | 382/195 |
| 2015/0319409 A1 | 11/2015 | Imamura et al. | |
| 2016/0364875 A1 | 12/2016 | Seki | |

FOREIGN PATENT DOCUMENTS

| | | |
|---|---|---|
| JP | 2001-285692 | 10/2001 |
| JP | 2006-148745 | 6/2006 |
| JP | 3827912 | 9/2006 |
| JP | 2006-284620 | 10/2006 |
| JP | 2007-24647 | 2/2007 |
| JP | 2007-192832 | 8/2007 |
| JP | 4168125 | 10/2008 |
| JP | 4382156 | 12/2009 |
| JP | 4625711 | 2/2011 |
| JP | 4681856 | 5/2011 |
| JP | 4825971 | 11/2011 |
| JP | 4825980 | 11/2011 |
| JP | 2012-7980 | 1/2012 |
| JP | 4849757 | 1/2012 |
| JP | 2012-26841 | 2/2012 |
| JP | 2012-88114 | 5/2012 |
| JP | 2014-35196 | 2/2014 |
| JP | 5432835 | 3/2014 |
| JP | 5580164 | 8/2014 |
| JP | 2014-230215 | 12/2014 |
| JP | 2015-7866 | 1/2015 |
| JP | 2015-109595 | 6/2015 |
| JP | 2015-133108 | 7/2015 |
| JP | 2015-133691 | 7/2015 |
| JP | 2015-162156 | 9/2015 |
| JP | 2015-222423 | 12/2015 |
| JP | 2016-70774 | 5/2016 |
| JP | 2016-95229 | 5/2016 |
| WO | 98/47061 | 10/1998 |
| WO | 01/71280 | 9/2001 |
| WO | 2009/101798 | 8/2009 |

OTHER PUBLICATIONS

Masao Shimizu, et al., "Significance and Attributes of Sub-Pixel Estimation on Area-Based Matching", The transactions of the Institute of Electronics, Information and Communication Engineers, D-II, vol. J85-D-II, No. 12, pp. 1791-1800, Dec. 2002, with partial English translation.

* cited by examiner

| CORRECT DISPARITY VALUE | MEAN ERROR VALUE | ERROR RMS |
|---|---|---|
| 1.0 | -0.00166 | 0.09812 |
| 1.1 | -0.08518 | 0.14276 |
| 1.2 | -0.16623 | 0.21037 |
| 1.3 | -0.24357 | 0.29463 |
| 1.4 | -0.30251 | 0.41065 |
| 1.5 | 0.01833 | 0.82575 |
| 5.0 | -0.00161 | 0.09975 |
| 5.1 | -0.08575 | 0.15657 |
| 5.2 | -0.16711 | 0.22439 |
| 5.3 | -0.24514 | 0.31212 |
| 5.4 | -0.30811 | 0.45080 |
| 5.5 | -0.00471 | 0.83871 |
| TOTAL ERROR RMS | | 0.37390 |

FIG. 8

| CORRECT DISPARITY VALUE | MEAN ERROR VALUE | ERROR RMS |
|---|---|---|
| 1.0 | -0.00162 | 0.06574 |
| 1.1 | -0.08920 | 0.11420 |
| 1.2 | -0.16897 | 0.18792 |
| 1.3 | -0.23995 | 0.25944 |
| 1.4 | -0.28391 | 0.31140 |
| 1.5 | 0.01546 | 0.21861 |
| 1.6 | 0.24764 | 0.28536 |
| 1.7 | 0.22777 | 0.27083 |
| 1.8 | 0.16278 | 0.18296 |
| 1.9 | 0.08441 | 0.11167 |
| 5.0 | -0.00203 | 0.06622 |
| 5.1 | -0.08961 | 0.11483 |
| 5.2 | -0.16954 | 0.18867 |
| 5.3 | -0.24125 | 0.26088 |
| 5.4 | -0.28529 | 0.31304 |
| 5.5 | 0.01590 | 0.22001 |
| TOTAL ERROR RMS | | 0.21575 |

| CORRECT DISPARITY VALUE | MEAN ERROR VALUE | ERROR RMS |
|---|---|---|
| 1.0 | -0.00163 | 0.06520 |
| 1.1 | -0.08842 | 0.11349 |
| 1.2 | -0.16428 | 0.18464 |
| 1.3 | -0.23568 | 0.25612 |
| 1.4 | -0.27847 | 0.30782 |
| 1.5 | 0.00300 | 0.22181 |
| 5.0 | -0.00203 | 0.06577 |
| 5.1 | -0.08891 | 0.11425 |
| 5.2 | -0.16473 | 0.18512 |
| 5.3 | -0.23613 | 0.25676 |
| 5.4 | -0.27879 | 0.30843 |
| 5.5 | -0.00381 | 0.22266 |

| CORRECT DISPARITY VALUE | MEAN ERROR VALUE | ERROR RMS |
|---|---|---|
| 1.0 | -0.00194 | 0.06389 |
| 1.1 | -0.09156 | 0.11346 |
| 1.2 | -0.17159 | 0.18712 |
| 1.3 | -0.24509 | 0.26007 |
| 1.4 | -0.29338 | 0.31478 |
| 1.5 | -0.01526 | 0.21117 |
| 5.0 | -0.00234 | 0.06467 |
| 5.1 | -0.09193 | 0.11420 |
| 5.2 | -0.17189 | 0.18771 |
| 5.3 | -0.24523 | 0.26050 |
| 5.4 | -0.29302 | 0.31483 |
| 5.5 | -0.01209 | 0.21461 |

FIG. 18A

| 0 | 1 | 2 |
|---|---|---|
| 3 | ctr | 4 |
| 5 | 6 | 7 |

FIG. 18B

|    |    | 0  | 1  | 2  | 3  | 4  |    |    |
|----|----|----|----|----|----|----|----|----|
|    |    | 5  | 6  | 7  | 8  | 9  |    |    |
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | ctr | 32 | 33 | 34 | 35 |
| 36 | 37 | 38 | 39 | 40 | 41 | 42 | 43 | 44 |
| 45 | 46 | 47 | 48 | 49 | 50 | 51 | 52 | 53 |
|    |    | 54 | 55 | 56 | 57 | 58 |    |    |
|    |    | 59 | 60 | 61 | 62 | 63 |    |    |

FIG. 19A
LUMINANCE VALUES OF PIXEL
OF INTEREST AND NEIGHBORING PIXELS
SUBJECT TO CENSUS TRANSFORM
| 108 | 104 | 100 |
|-----|-----|-----|
| 99  | 100 | 96  |
| 104 | 96  | 94  |
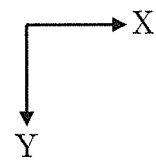
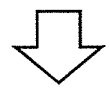
CENSUS TRANSFORMED VALUES
OF NEIGHBORING PIXELS
ARRANGEMENT
DIRECTION OF
BIT SEQUENCE
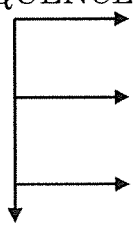
| 0 | 0 | 0 |
|---|---|---|
| 1 | ctr | 1 |
| 0 | 1 | 1 |
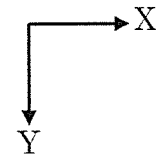
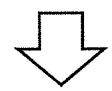
BIT SEQUENCE
(00011011)

FIG. 19B
LUMINANCE VALUES OF PIXEL
OF INTEREST AND NEIGHBORING PIXELS
SUBJECT TO CENSUS TRANSFORM

|    |    | 98  | 104 | 110 | 115 | 120 |    |    |
|----|----|-----|-----|-----|-----|-----|----|----|
|    |    | 104 | 104 | 108 | 115 | 116 |    |    |
| 98 | 101| 105 | 107 | 107 | 109 | 108 | 103| 99 |
| 94 | 97 | 102 | 104 | 102 | 103 | 100 | 96 | 91 |
| 89 | 92 | 96  | 102 | 100 | 97  | 92  | 90 | 86 |
| 86 | 86 | 90  | 96  | 93  | 90  | 86  | 99 | 109|
| 85 | 90 | 95  | 90  | 90  | 91  | 84  | 103| 114|
|    |    | 100 | 101 | 85  | 82  | 95  |    |    |
|    |    | 110 | 115 | 89  | 83  | 103 |    |    |

→X  ↓Y

ARRANGEMENT DIRECTION OF BIT SEQUENCE

CENSUS TRANSFORMED VALUES OF NEIGHBORING PIXELS

|   |   | 1 | 0 | 0 | 0 | 0 |   |   |
|---|---|---|---|---|---|---|---|---|
|   |   | 0 | 0 | 0 | 0 | 0 |   |   |
| 1 | 0 | 0 | 0 | 0 | 0 | 0 | 0 | 1 |
| 1 | 1 | 0 | 0 | 0 | 0 | 0 | 1 | 1 |
| 1 | 1 | 1 | 0 | ctr | 1 | 1 | 1 | 1 |
| 1 | 1 | 1 | 1 | 1 | 1 | 1 | 1 | 0 |
| 1 | 1 | 1 | 1 | 1 | 1 | 1 | 0 | 0 |
|   |   | 0 | 0 | 1 | 1 | 1 |   |   |
|   |   | 0 | 0 | 1 | 1 | 0 |   |   |

→X  ↓Y

BIT SEQUENCE
(1000000000100......1000011100110)

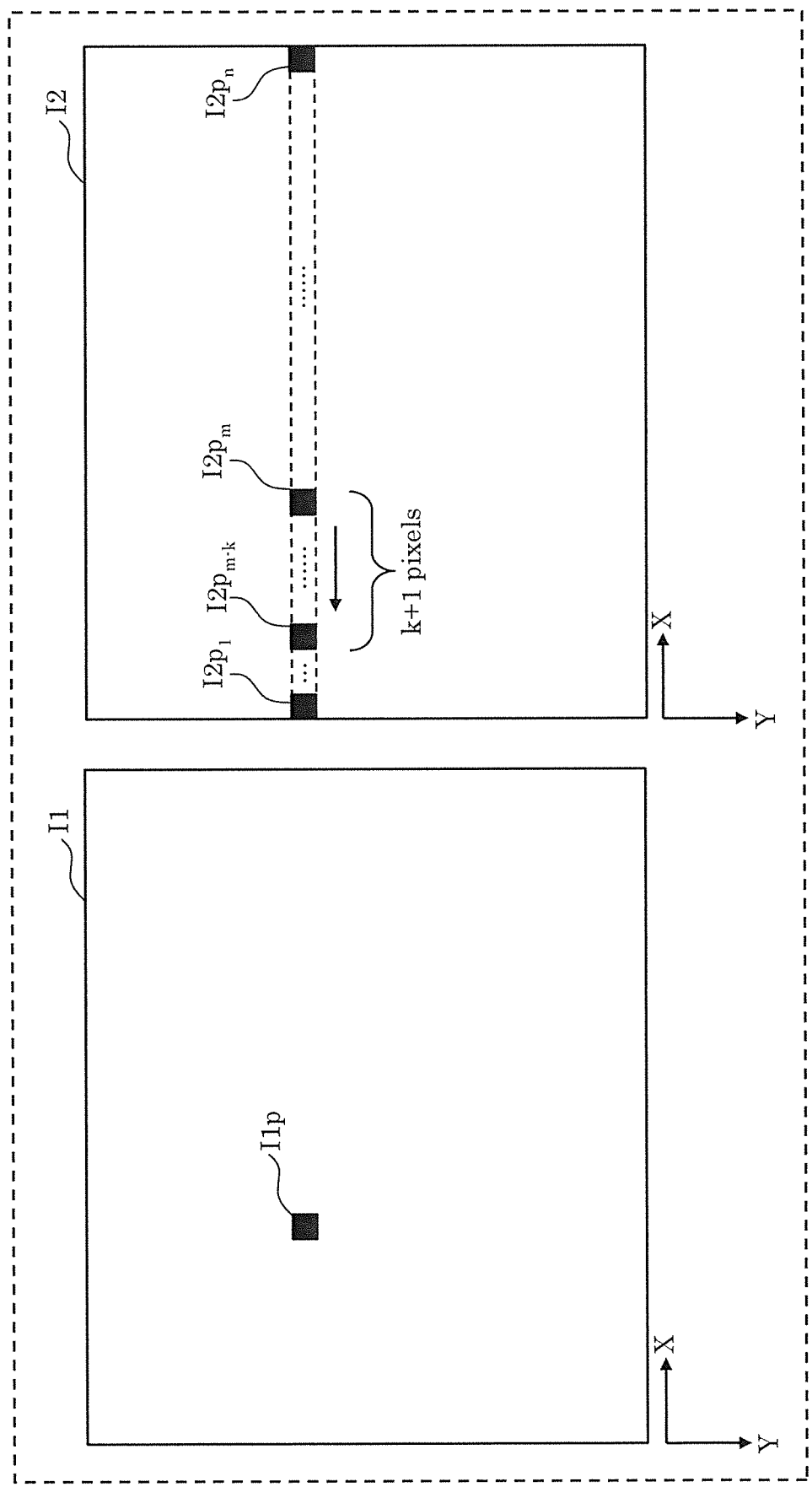

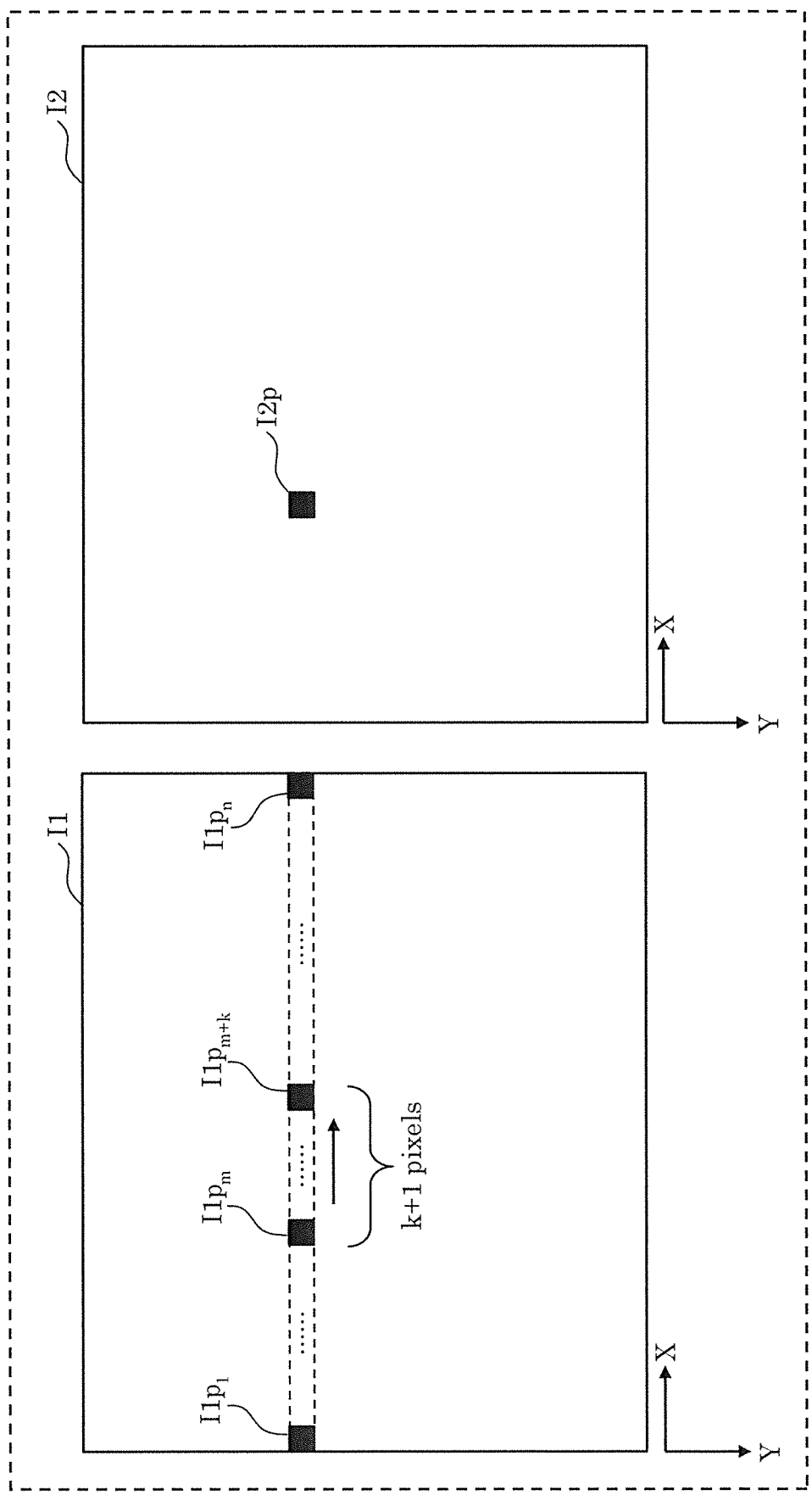

FIG. 36

COST OF PIXEL I1pi

| DISPARITY VALUE WITHIN SEARCH RANGE (UNIT: PIXEL) | DIFFERENCE DEGREE | DISPARITY VALUE OF NEIGHBORING PIXEL | PENALTY | COST |
|---|---|---|---|---|
| 0 | 4 | -3 | P2 | 4+P2 |
| -1 | 3 | | P2 | 3+P2 |
| -2 | 3 | | P2 | 3+P2 |
| -3 | 2 | | P1 | 2+P1 |
| -4 | 1 | | P2 | 1+P2 |
| -5 | 0 | | P2 | P2 |
| -6 | 1 | | P2 | 1+P2 |
| ⋮ | ⋮ | | ⋮ | ⋮ |
| -k | 6 | | P2 | 6+P2 |

DISPARITY ESTIMATION DEVICE, DISPARITY ESTIMATION METHOD, AND PROGRAM

CROSS REFERENCE TO RELATED APPLICATION

This application claims the benefit of priority of Japanese Patent Application Number 2018-000878 filed on Jan. 5, 2018, the entire content of which is hereby incorporated by reference.

BACKGROUND

1. Technical Field

The present disclosure relates to a disparity estimation device, a disparity estimation method, and a program.

2. Description of the Related Art

In recent years, studies have been carried out on techniques for calculating the depth from a camera to a subject using an image captured by the camera in the field of development of, for example, safe driving assistance systems and self-driving systems for automobiles, and surveillance camera systems or robots for detecting suspicious individuals, etc. As a technique for calculating the aforementioned depth, there is the stereo depth measurement technique in which the aforementioned depth is calculated from images captured by two or more cameras. In the images captured by the two or more cameras, the same subject is found in different directions; this difference in direction is referred to as a disparity. With the stereo depth measurement technique, the depth to the subject is calculated on the basis of the disparity by way of the triangulation technique. The accuracy of the disparity has a more significant impact on an error of the result of measuring the depth to a subject as the depth to the subject increases. Thus, studies have been conducted on techniques for determining the disparity between a plurality of images. For example, Japanese Patent No. 4168125 discloses a technique for estimating the disparity between two images captured by stereo cameras. In Japanese Patent No. 4168125, the census transform for pixel values and the correlation operation for census transformed pixel values are used in order to associate pixels of the two images. A disparity estimation method called the semi-global matching (SGM) is disclosed in Heiko Hirschmuller (February 2008), "*Stereo Processing by Semiglobal Matching and Mutual Information*", IEEE Transactions on Pattern Analysis Machine Intelligence (Vol. 39, No. 2): IEEE.

SUMMARY

In the techniques disclosed in Japanese Patent No. 4168125 and "*Stereo Processing by Semiglobal Matching and Mutual Information*", there are cases where the accuracy in estimating the disparity value with sub-pixel accuracy is low.

Thus, the present disclosure provides a disparity estimation device, a disparity estimation method, and a program by which the accuracy in estimating the disparity value between a plurality of images improves.

A disparity estimation device according to an aspect of the present disclosure includes: a processor; and a memory, wherein the processor performs: (a) obtaining, from the memory, a first image captured by a first camera disposed in a first position and a second image captured by a second camera disposed in a second position, the first image including a plurality of first pixels, the second image including a plurality of second pixels; (b) calculating, for each of the plurality of first pixels, a first census feature amount based on a comparison between a pixel value of the first pixel and a pixel value of a neighboring pixel of the first pixel in the first image, and calculating, for each of the plurality of second pixels, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels.

A disparity estimation method according to an aspect of the present disclosure includes: (a) obtaining a first image captured by a first camera disposed in a first position and a second image captured by a second camera disposed in a second position; (b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels. At least one of (a) to (f) is performed by at least one processor.

A program according to an aspect of the present disclosure causes a computer to execute: (a) obtaining a first image captured by a first camera disposed in a first position and a second image captured by a second camera disposed in a second position; (b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels.

Note that the aforementioned general or specific aspects may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a compact disc read-only memory (CD-ROM).

With the disparity estimation device, etc., according to the present disclosure, it is possible to improve the accuracy in estimating the disparity value between a plurality of images.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8 shows an estimation result of the disparity value obtained through the SGM using the live-action image in FIG. 7 and an image obtained by horizontally translating this live-action image;

FIG. 18A shows an example of neighboring pixels in the census transform;

FIG. 18B shows another example of neighboring pixels in the census transform;

FIG. 19A shows an example of the census transform on the neighboring pixels in FIG. 18A;

FIG. 19B shows an example of the census transform on the neighboring pixels in FIG. 18B;

FIG. 20 shows an example of a pixel search range upon calculation of a difference degree;

FIG. 21 shows another example of a pixel search range upon calculation of a difference degree;

FIG. 36 shows an example of costs for a single pixel on a scanning line for cost calculation;

DETAILED DESCRIPTION OF THE EMBODIMENTS

[Knowledge Found by Inventors]

The present inventors have studied techniques for estimating a disparity value of images with sub-pixel accuracy which is the accuracy level of sub-pixels smaller than pixels of a digital image as a unit in order to improve the accuracy of depth measurement in which a digital image is used. Note that the unit of the disparity value is a single pixel, or simply referred to as a pixel, and a sub-pixel indicates a portion less than a single pixel. The present inventors have studied the techniques disclosed in Japanese Patent No. 4168125 and "Stereo Processing by Semiglobal Matching and Mutual Information", as described below. For example, in the conventional technique disclosed in Japanese Patent No. 4168125, the census transform is performed on each pixel of stereo images which are two or more images captured by respective cameras or a compound-eye camera, and the census feature amount of each pixel which is a feature amount after the census transform is calculated. Furthermore, the difference degree of the census feature amount of each pixel between the stereo images is calculated using the Hamming distance. For a pixel of interest of one image, a pixel at the minimum Hamming distance to the pixel of interest is extracted from the other image, and the extracted pixel is determined as a pixel corresponding to the pixel of interest. Furthermore, the disparity value of each of the pixel corresponding to the pixel of interest and a neighboring pixel thereof in the other image is estimated with sub-pixel accuracy of less than a single pixel using a method called the equiangular fitting on the basis of the Hamming distance to the pixel of interest and the positional relationship between the images.

Figure 1:
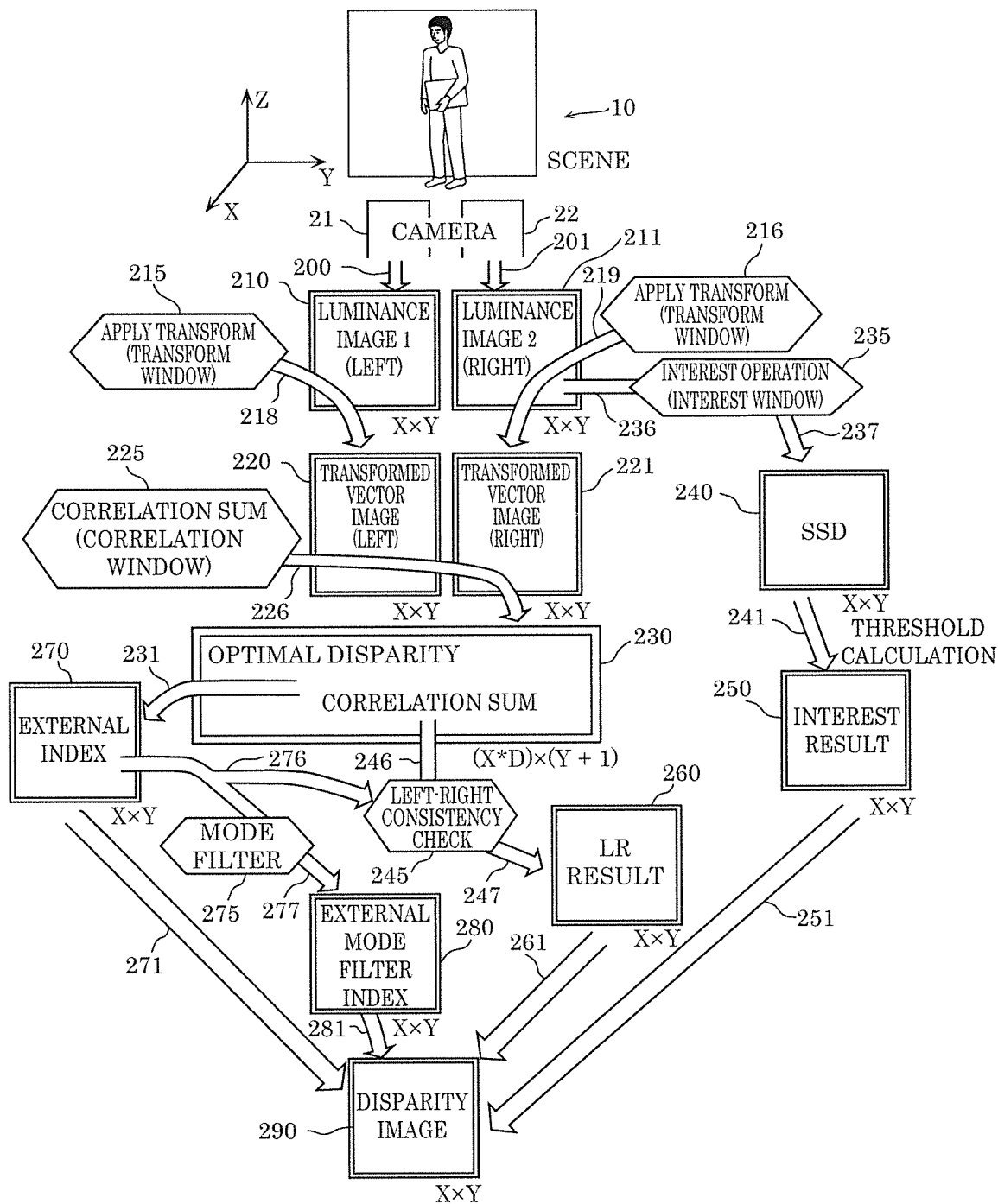
FIG. 1 shows the image processing system disclosed in Japanese Patent No. 4168125.

For example, FIG. 1 shows the image processing system disclosed in Japanese Patent No. 4168125. This system generates disparity image 290 from original image data 200 and 201 obtained as a result of imaging by left and right cameras 21 and 22. Disparity image 290 is a set of selected optimal disparities for each image element in the original images. In order to obtain disparity image 290, image data 200 and 201 are transformed, a correlation operation is performed between these transformed data, and checks for error and confidence are performed.

For example, left camera 21 and right camera 22 capture scene 10, and a frame grabber and a digitizer provide image data to a reconfigurable image processing system. Left image data 200 and right image data 201 in the form of individual pixel elements and the luminance of each of the individual pixel elements are mapped onto left luminance image 210 and right luminance image 211, respectively. These luminance images are each of width X and height Y, that is, is an X by Y luminance image. Non-parametric local transforms 215 and 216 such as the census transforms and the rank transforms are applied to each of these luminance images. As represented by arrow 218, transform 215 is applied to left luminance image 210 to generate transformed vector left image 220. Likewise, as indicated by arrow 219, transform 216 is applied to right luminance image 211 to generate transformed vector right image 221. These transforms are applied to substantially all the image elements in the two luminance images in a neighborhood or window of each of the imaging elements in each of the two luminance images. Accordingly, the size of the window and the location of a reference image element determine which image elements on the edges of the luminance image are ignored in the transform calculations. Although these ignored image elements are not used as reference image elements, these image elements may still be used in the calculation of transform vectors for other reference image elements.

The image processing system in FIG. 1 further includes correlation summation process 225. Correlation summation process 225 is one step in the correspondence determination between left image 220 and right image 221. Correlation summation process 225 operates on the transform vectors within a correlation window for left image 220 and the transform vectors within the same size correlation window for right image 221 to generate correlation sum matrix 230 as represented by single arrow 226. In generating this correlation sum matrix 230, one of left image 220 and right image 221 is used as a reference image, and the window in the other image is shifted. If right image 221 is treated as the reference image, correlation sum matrix 230 includes data that represents how each of the right image elements in right image 221 within a correlation window correlates or corresponds with a left image element within the correlation window for each of the shifts or disparities of the left image element in left image 220 from the right image element. By definition, data that represents the correlation or correspondence of a particular left image element with various shifts or disparities of the right image element is also included in correlation sum matrix 230. Based on these disparity-based correlation sums and correlation sum matrix 230, optimal disparities represented by arrow 231 may be selected for each right image element and stored in external index (also referred to as "index") array 270. Final disparity image 290 can then be determined with external index array 270 as represented by arrow 271. In the case of stereo views, the disparities are horizontal offsets between the windows in transform image 1 and the windows in transform image 2.

Although not included in FIG. 1, Japanese Patent No. 4168125 discloses deriving a disparity with sub-pixel accuracy by the equiangular fitting method (also referred to as the "equiangular line fitting method"). In this equiangular fitting method, the relationship of V-shaped or inverted V-shaped functions is applied to the relationship between a disparity value and the value of a correlation sum (hereinafter also referred to as a "correlation sum value") of a disparity value resulting in the minimum value of the correlation sum and disparity values around said disparity value, for example, each disparity value±1 from the disparity value resulting in the minimum value of the correlation sum.

Figure 2A:
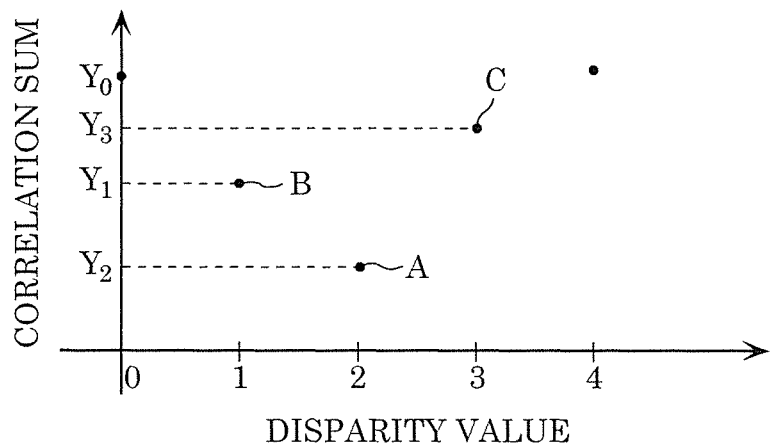
FIG. 2A illustrates the equiangular fitting method disclosed in Japanese Patent No. 4168125.
Figure 2B:
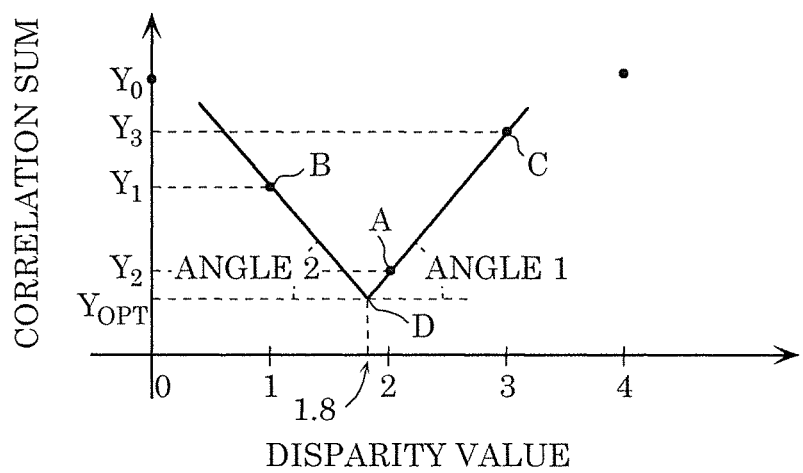
FIG. 2B illustrates the equiangular fitting method disclosed in Japanese Patent No. 4168125.

For example, FIG. 2A and FIG. 2B illustrate the equiangular fitting method disclosed in Japanese Patent No. 4168125. FIG. 2A shows the relationship between the correlation sum value and the disparity value; the correlation sum value has a minimum value of $Y_2$ when the disparity value is 2. In this case, in addition to point A at which the correlation sum value has minimum value $Y_2$ and the disparity value is 2, point B at which the disparity value is 1 and the correlation sum value is $Y_1$ and point C at which the disparity value is 3 and the correlation sum value is $Y_3$ are used. Furthermore, as shown in FIG. 2B, the V-shaped function passing through these three points is applied. At this time, the absolute value of the slope of the two lines of the V-shaped function is set equal to a greater one of the absolute value of the slope of a difference in the correlation sum value with respect to a difference in the disparity value between point A and point B and the absolute value of the slope of a difference in the correlation sum value with respect to a difference in the disparity value between point A and point C. Specifically, in FIG. 2A, the absolute value of the slope between point A and point C, i.e., difference $(Y_3-Y_2)$ of the correlation sum value, is greater than the absolute value of the slope between point A and point B, i.e., difference $(Y_2-Y_1)$ of the correlation sum value. Therefore, the absolute value of $(Y_3-Y_2)$ is used as the slope of the V-shaped function. In the V-shaped function, the slopes of the lines on both sides of the apex of the V shape have the same absolute value. In other words, angle 1 and angle 2 formed between a horizontal line and respective lines on the both sides are the same. This results in formation of a straight line passing through point B with a negative slope having the absolute value of the aforementioned slope and a straight line passing through points A and C with a positive slope having the absolute value of the aforementioned slope. Intersection D of these two straight lines is determined, and thus the disparity value is determined with sub-pixel accuracy of less than a single pixel. For example, the disparity value is 1.8 in the example of FIG. 2B.

The determination of disparity image 290 in FIG. 1 may include three optional confidence/error detection checks: interest operation, left-right consistency check, and the mode filter. The interest operation determines whether the luminance images are associated with a high level of confidence based on the texture of the scene that has been captured. Thus, interest operation associated with image elements of a scene that is of uniform texture has a lower confidence value than those scenes where the texture is more varying. The interest operation is applied to only one of the luminance images—either the left or the right luminance image. However, other embodiments may cover interest operations applied to both luminance images. In FIG. 1, interest operation 235 is applied to right luminance image 2 as represented by arrow 236 to generate a sliding sum of disparities (SSD) array 240 as represented by arrow 237 for each image element within an interest window. Upon applying threshold operation 241, final interest result array 250 is generated as an interest result. The interest result includes data that reflects whether a particular image element has passed the confidence threshold established in this image processing system. Based on the data in interest result array 250, disparity image 290 may be determined in conjunction with extremal index array 270.

The left-right consistency check is a form of error detection. This check determines and confirms whether an image element in the left image that has been selected as the optimal image element by an image element in the right image will also select that same image element in the right image as its optimal image element. Left-right consistency check 245 is applied to correlation sum array 230 as represented by arrow 246 and compared to extremal index array 270 as shown by arrow 276 to generate LR result array 260 as represented by arrow 247. LR result array 260 includes data that represents image elements that pass left-right consistency check 245. LR result array 260 is used to generate disparity image 290 as represented by arrow 261 in conjunction with extremal index array 270.

The third confidence/error detection check is the mode filter. The mode filter determines whether the optimal disparities selected have a high degree of consistency by selecting disparities based on population analysis. Thus, if the chosen optimal disparities in extremal index array 270 do not exhibit a high degree of consistency, then these optimal disparities are discarded. Mode filter 275 operates on extremal index array 270 as represented by arrow 276 to generate mode filter extremal index (also referred to as "index") array 280 as represented by arrow 277. Mode filter extremal index array 280 includes data that represents whether a particular image element has selected a disparity that has passed its disparity consistency check. The data and mode filter extremal index array 280 can be used to generate the disparity image 290 as represented by arrow 281 in conjunction with extremal index array 270.

These three confidence/error detection checks are optional. While some embodiments may employ all three checks in the determination of disparity image 290, other embodiments may include none of these checks. Still further embodiments may include a combination of these checks.

Figure 3:
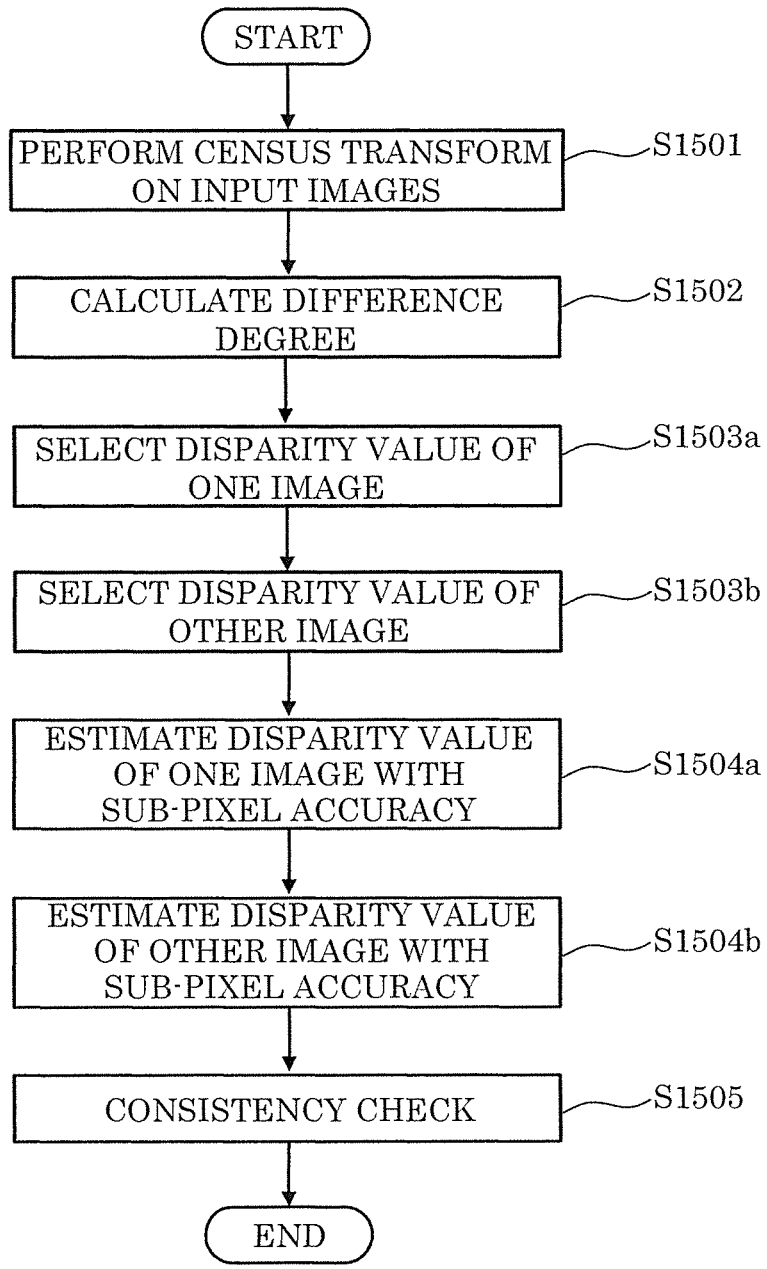
FIG. 3 schematically shows the flow of a conventional disparity estimation process.

For example, the conventional disparity estimation process disclosed in Japanese Patent No. 4168125 can be schematically shown as in FIG. 3. FIG. 3 schematically shows the flow of the conventional disparity estimation process. In Step S1501, the census transform is performed on each pixel of input images I1 and I2 which are stereo images, and thus each census feature amount is determined. Furthermore, in Step S1502, the correlation of the census feature amounts (also referred to as a "difference degree") with respect to the inter-pixel disparity value between input images I1 and I2 is calculated for each of the disparity values of pixels of input images I1 and I2. Here, the difference degree between the census feature amounts is calculated using the Hamming distance.

In Step S1503a and S1503b, for each pixel of a base image which is one of input images I1 and I2, a disparity value resulting in the minimum difference degree is selected using the disparity values and the difference degrees (that is, the Hamming distance) of pixels within a preset search range of the other image. Thus, the disparity value of each pixel of the base image with pixel accuracy is obtained. The above-described process is performed using input image I1 as the base image in Step S1503a and using input image I2 as the base image in Step S1503b.

In Steps S1504a and S1504b, the disparity value with sub-pixel accuracy at each pixel of base image I1 and base image I2 is estimated by the equiangular fitting method such as that described with reference to FIG. 2A and FIG. 2B. Specifically, for each pixel of the base images, the disparity value with sub-pixel accuracy is estimated using the minimum difference degree, the disparity value resulting in the minimum difference degree, disparity values around said disparity value, and the difference degrees thereof. In Step S1505, the consistency of the disparity value in the case of base image I1 and the disparity value in the case of base image I2 between corresponding pixels is checked. Specifically, whether the differences of bidirectional disparity values between corresponding pixels of base image I1 and base image I2 are less than a predetermined threshold value is checked. Furthermore, a disparity value making a difference greater than or equal to the threshold value is discarded, and the disparity estimation result for the pixel corresponding to said disparity value is not output.

Figure 4:
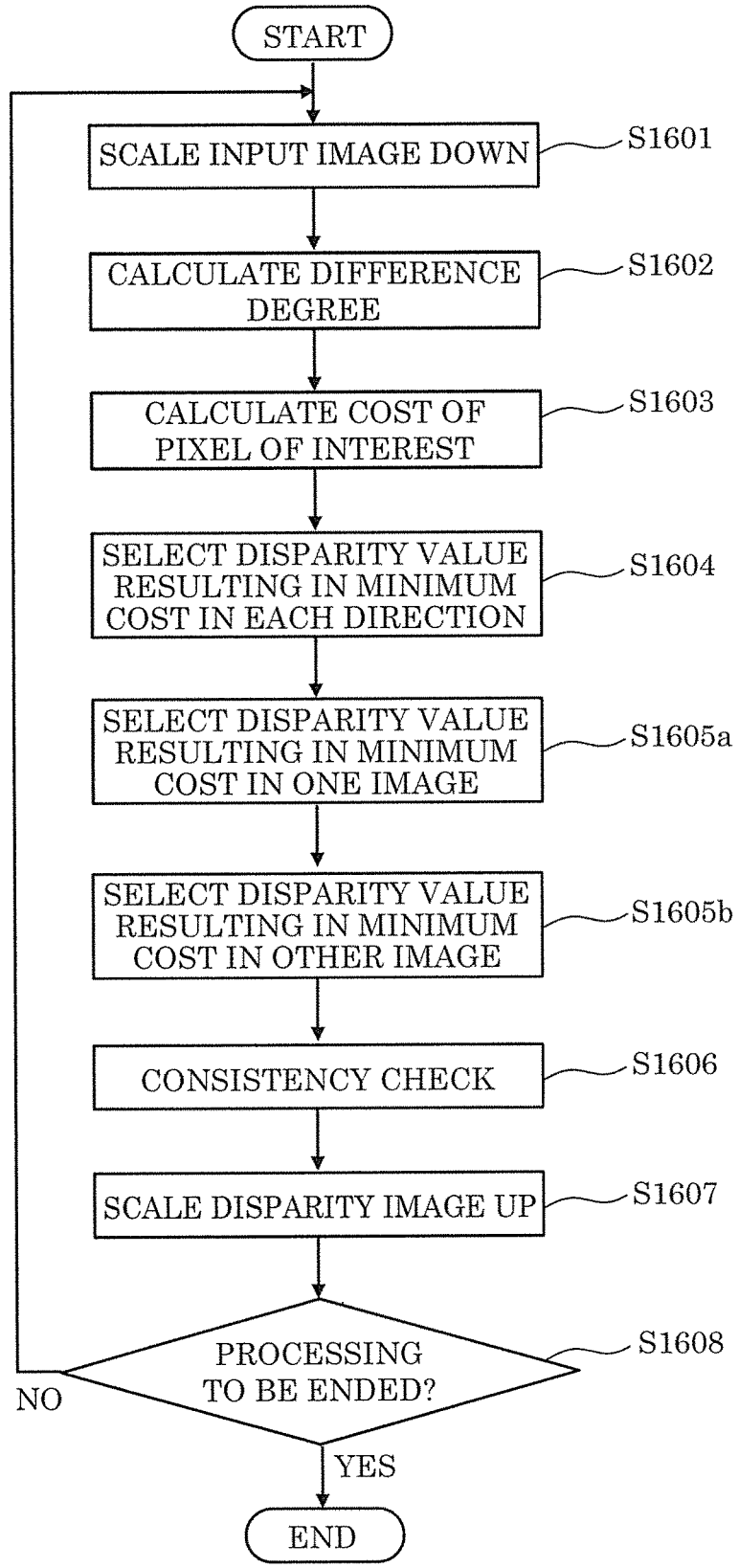
FIG. 4 schematically shows the flow of a conventional semi-global matching (SGM) process.

The disparity estimation process called the semi-global matching (hereinafter also referred to as "SGM") such as that disclosed in "Stereo Processing by Semiglobal Matching and Mutual Information" can be schematically shown as in FIG. 4. FIG. 4 schematically shows the flow of the conventional semi-global matching (SGM) process. In Step S1601, input images I1 and I2 and an initial disparity image are scaled down. The initial disparity image is a preset image, and each pixel has, as a pixel value, the disparity value of the pixel between the two images. When the image is scaled down, the number of pixels is reduced. In Step S1602, the difference degree of each pixel between input images I1 and I2 is calculated for each disparity value. In Step S1602, the difference degree between the census feature amounts (the Hamming distance), obtained using mutual information amounts or census feature amounts that are the same as or similar to those in Japanese Patent No. 4168125, can be used to calculate the difference degree between input images I1 and I2. In Step S1603, for each pixel of interest of the base image, the cost of disparity value distribution on straight lines passing through or centered on the pixel of interest and extending in 8 or 16 directions is calculated. In Step S1604, regarding the cost of disparity distribution on the straight lines passing through the pixel of interest and extending in the 8 or 16 directions, a disparity value resulting in the minimum cost in each of the directions is selected. In other words, costs are aggregated.

In Steps S1605a and S1605b, a disparity value in a direction resulting in the minimum cost is selected from the disparity values in the respective directions resulting in the minimum cost. At that time, the disparity value obtained using input image I1 as the base image is selected in Step S1605a, and the disparity value obtained using input image I2 as the base image is selected in Step S1605b. In Step S1606, the consistency between the disparity value obtained using input image I1 as the base image and the disparity value obtained using input image I2 as the base image is checked. In Step S1607, the disparity image including pixels that have, as pixel values, the disparity values checked for consistency in Step S1606 is scaled up. In this scale-up, both a process of increasing the number of pixels by way of spatial expansion of the disparity image and a process of increasing the disparity value (the pixel value of the disparity image) along with the spatial expansion are performed. For example, in the case where the rate of spatial expansion is twice, the disparity value is also transformed into a value twice as large. In Step S1608, a final determination is made about whether or not to repeat the processing from Steps S1601 to S1607.

In FIG. 4, as an example, in the case of performing a four-stage repeating process, input images I1 and I2 are subject to the disparity estimation process from Steps S1601 to S1608 using a scale of one-eighth in the first round, one-fourth in the second round, a half in the third round, and an equal scale in the fourth round. Therefore, in Step S1608, when the number of repetitions is less than four, the processing continues, and when the number of repetitions is four, the processing ends.

There is the following difference between the SGM and the disparity estimation process in Japanese Patent No. 4168125. In Japanese Patent No. 4168125, the search for a disparity value is performed by a local process, and the relationship between the disparity value of the pixel of interest and the disparity value of a pixel around the pixel of interest is not taken into consideration. In the SGM, upon cost calculation, a penalty is given to a spatial change of the disparity value so that the disparity value of the pixel of interest is likely to have a value equal or close to the disparity value of a pixel around the pixel of interest. In Japanese Patent No. 4168125, streaking artifacts, i.e., streak artifacts due to the disparity value being different across lines such as edges and boundaries may be generated, whereas in the SGM, the streaking artifacts can be reduced.

However, the conventional disparity estimation processes in Japanese Patent No. 4168125 and "Stereo Processing by Semiglobal Matching and Mutual Information" are problematic in that, in the case of estimating a disparity value in the vicinity of a disparity value with integer pixel accuracy resulting in the minimum difference degree (that is, Hamming distance) or the minimum cost based on the difference degree, specifically, a disparity value with sub-pixel accuracy using the difference values or costs corresponding to disparity values around the current disparity value (disparity values of ±1 pixel from the current disparity value), the accuracy of the resulting disparity value is low; in other words, there is a large amount of error.

The present inventors have considered the cause of the aforementioned problem as follows. In the estimation of a disparity value using a cost function defined by a difference in luminance such as the sum of absolute differences (SAD), which is the sum of the absolute values of differences between luminance values, and the sum of squared differences (SSD), which is the sum of squares of differences between luminance values), it is known that a disparity value with sub-pixel accuracy can be estimated through the equiangular fitting or parabola fitting in the vicinity of the minimum value of the cost function with integer pixel accuracy.

This is made possible by the fact that the spatial distribution of the cost function defined by the different in luminance can be approximated well by a linear or quadratic expression in the vicinity of the minimum value thereof. This means that, for example, assuming the distribution of 8-bit pixel values as a continuous quantity, the difference between the pixel values of corresponding points in two images can be assumed as a continuous quantity, and a segment that is as wide as ±0.5 pixels can be approximated well by a low-order Taylor series expansion.

In contrast, the Hamming distance between the census feature amounts is a difference between bit sequences representing the relationship of the brightness level of a pixel of interest and neighboring pixels thereof. There is no guarantee that in the vicinity of the minimum value of such a Hamming distance, the Hamming distance is linear, that is, in a straight line form, or a quadratic curve with respect to sub-pixel-level positional variations. In other words, it is reasonable that variations in the Hamming distance at an interval of a single pixel, that is, points at which the brightness level relationship is reversed within an interval of a single pixel, are considered random. When reference pixels which are pixels neighboring a pixel of interest in the census transform is increased, such a random phenomenon is expected to have smooth properties by the law of large numbers. However, the number of reference pixels referred to in the census transform, for example, 8 pixels or 64 pixels, is not considered as a sufficient number of samples to lead to sufficient accuracy in estimating a disparity value with sub-pixel accuracy. Furthermore, in the vicinity of the minimum value of the Hamming distance, only a few bits in a bit sequence having 8 bits or 64 bits are different bits, meaning that this is the case where the law of large numbers is least effective on the vicinity of the minimum value of the Hamming distance.

Figures 5, 6:
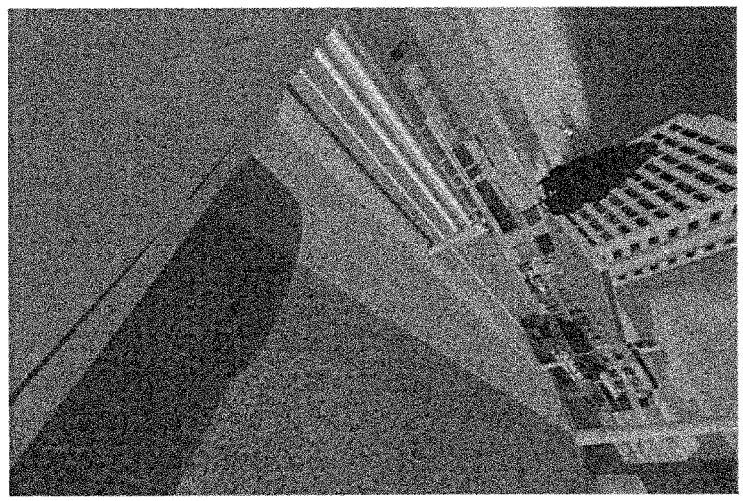
FIG. 5 is a computer graphic (CG) image used to verify a disparity estimation process involving the SGM.
FIG. 6 shows an estimation result of the disparity value obtained through the SGM using the CG image in FIG. 5 and an image obtained by horizontally translating this CG image.
Figure 7:
FIG. 7 is a live-action image used to verify a disparity estimation process involving the SGM.
Figures 9, 10:
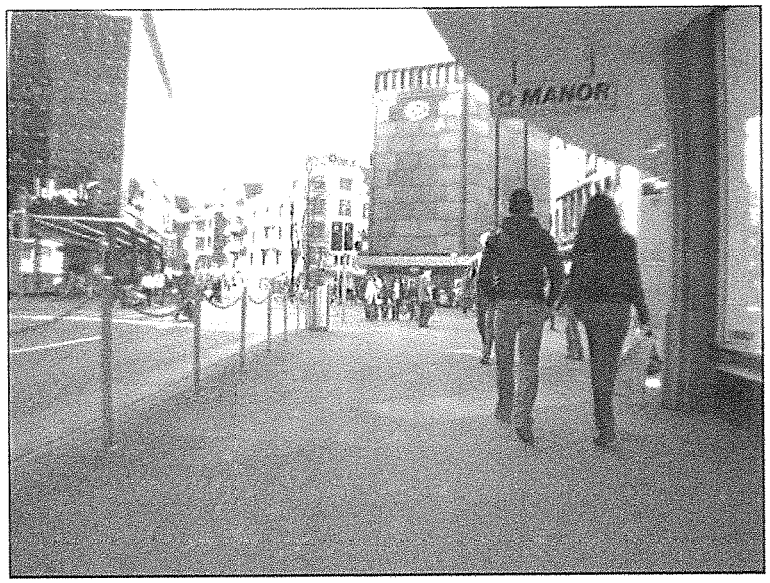
FIG. 9 is a live-action image used to verify a disparity estimation process involving the SGM.
FIG. 10 shows an estimation result of the disparity value obtained through the SGM using the live-action image in FIG. 9 and an image obtained by horizontally translating this live-action image.
Figures 11, 12:
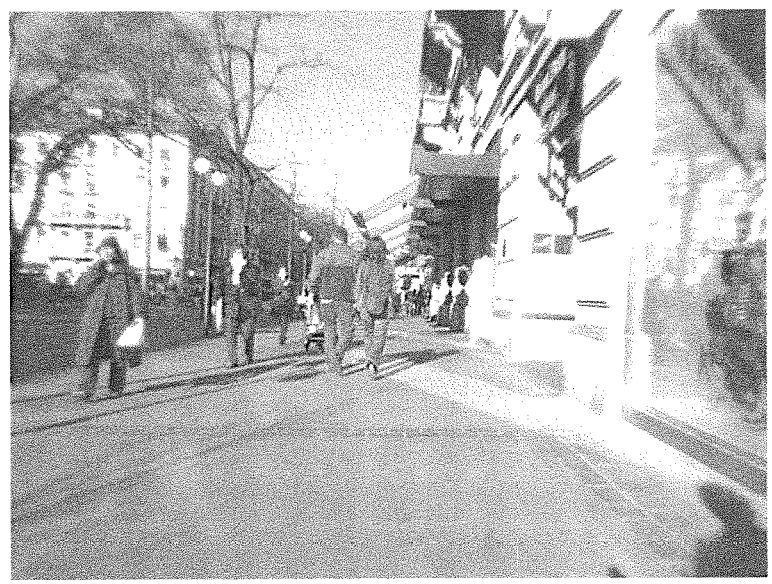
FIG. 11 is a live-action image used to verify a disparity estimation process involving the SGM.
FIG. 12 shows an estimation result of the disparity value obtained through the SGM using the live-action image in FIG. 11 and an image obtained by horizontally translating this live-action image.

As shown in FIG. 5 to FIG. 13, by actually estimating a disparity value, the present inventors have verified a disparity estimation process involving the SGM such as that disclosed in "*Stereo Processing by Semiglobal Matching and Mutual Information*". FIG. 5 is a computer graphic (CG) image used for the verification, and FIG. 7, FIG. 9, and FIG. 11 are live-action images used for the verification. FIG. 6 shows an estimated result of the disparity value obtained through the SGM using the CG image in FIG. 5 and an image obtained by horizontally translating this CG image.

FIG. 8 shows an estimated result of the disparity value obtained through the SGM using the live-action image in FIG. 7 and an image obtained by horizontally translating this live-action image. FIG. 10 shows an estimated result of the disparity value obtained through the SGM using the live-action image in FIG. 9 and an image obtained by horizontally translating this live-action image. FIG. 12 shows an estimated result of the disparity value obtained through the SGM using the live-action image in FIG. 11 and an image obtained by horizontally translating this live-action image.

In each image, 12 cases or 16 cases are horizontally translated; the details include 6 cases of movement at an interval of 0.1 pixels from 1.0 pixel to 1.5 pixels or 10 cases of movement at an interval of 0.1 pixels from 1.0 pixel to 1.9 pixels and 6 cases of movement at an interval of 0.1 pixels from 5.0 pixels to 5.5 pixels. A reference image which is an image resulting from the translation is generated by performing an interpolation process on pixels of an image after the translation by the aforementioned movement so that pixel coordinates thereof before and after the movement correspond to each other. The pixel coordinates are two-dimensional coordinates, the unit of which is a pixel of an image. The image before the movement is set as the base image, and the disparity value of a pixel of the reference image that corresponds to each pixel of the base image is estimated using the base image and the reference image. For example, when the estimated disparity value is "+1.0" or "−1.0", a pixel in a position resulting from 1-pixel movement in the horizontal direction, specifically, in the positive or negative direction along the X-axis of the pixel coordinates from a pixel of the reference image co-located in the pixel coordinates with a pixel of the base image represents the same subject as the pixel of the base image.

In the above-described estimation of a disparity value, as described above, after calculation of the difference degree of each pixel of the base image with respect to the disparity value with integer accuracy through the SGM, a disparity value is estimated with sub-pixel accuracy by the equiangular fitting method using the disparity value of the pixel resulting in the minimum difference degree and the disparity value and the difference degree of each of neighboring pixels at a distance of ±1 pixel from the current pixel. Note that it can be easily inferred that the same or similar result is obtained when, after calculation of the difference degree with respect to the disparity value with integer accuracy using the Hamming distance, a disparity value is estimated with sub-pixel accuracy by the equiangular fitting method in the vicinity of the minimum value of the difference degree.

In each of FIG. 6, FIG. 8, FIG. 10, and FIG. 12, the left column indicates a correct disparity value which is the aforementioned amount of horizontal movement, the middle column indicates a mean value (also referred to as "mean") of differences each obtained by subtracting the estimated disparity value of each pixel from the amount of movement in the left column, and the right column indicates a root means square (also referred to as "RMS") of the differences each obtained by subtracting the estimated disparity value of each pixel from the amount of movement in the left column. These figures show that compared to the case where the correct disparity value is the unit of integer pixels, i.e., "1.0" and "5.0", the estimated error of the disparity value tends to be greater in the case where the correct disparity value is the unit of sub-pixels other than the aforementioned values.

Figure 13:
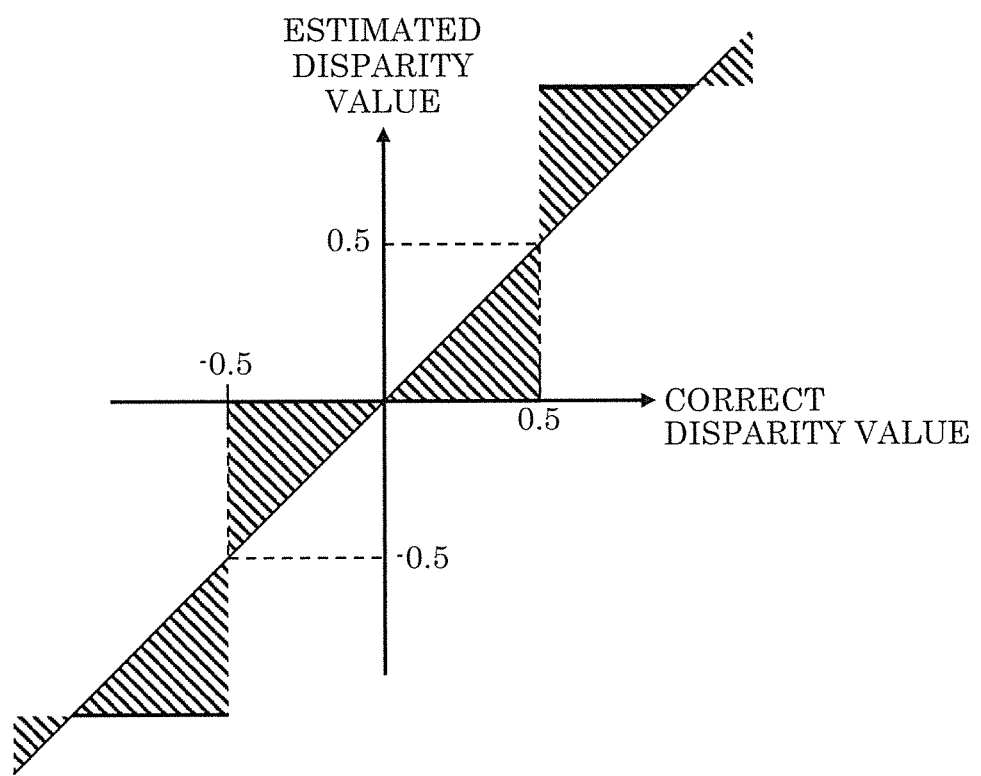
FIG. 13 shows a hypothetical example of the relationship between a correct disparity value and an estimated disparity value.

Suppose that when the accuracy in estimating a disparity value in units of integer pixels is high and the error of a disparity value in units of sub-pixels is random, only the disparity value with integer pixel accuracy is estimated, and the disparity value in units of sub-pixels is not estimated. In this case, the relationship between the correct disparity value and the estimated disparity value can be assumed as shown in FIG. 13. In other words, it is possible to assume that the disparity value in units of sub-pixels is included in the region covered in diagonal hatching in FIG. 13 and the distribution of errors of the disparity value in units of sub-pixels is uniform in the range of ±0.5 pixels. In this case, the RMS value of the error of the disparity value in the units of sub-pixels is determined by Expression 1 below.

[Math. 1]

$$MSE = \int_{-0.5}^{0.5} x^2 dx = \left[\frac{x^3}{3}\right]_{-0.5}^{0.5} = \frac{1}{12}$$ (Expression 1)

$$\text{Thus, RMS} = \sqrt{\frac{1}{12}} \approx 0.28$$

In FIG. 6, the RMS value of the errors of all the disparity values in the CG image in FIG. 5 (also referred to as the total error RMS value, which is specifically the RMS value obtained when the sections between 1.0 and 1.9 and between 5.0 and 5.9 are evaluated for errors at an interval of 0.1 pixels where the RMS values between 1.6 and 1.9 and between 5.6 and 5.9 are obtained by folding back the RMS values between 1.1 and 1.4 and 5.1 and 5.4 with respect to 1.5 and 5.5) exceeds the RMS value of the error obtained upon estimation of the disparity value with integer pixel accuracy represented by Expression 1 above. In FIG. 8, FIG. 10, and FIG. 12, the RMS value of the errors of all the disparity values of the live-action image is below the RMS value of the error represented by Expression 1 above, but each of the RMS values increases as the correct disparity value is qualitatively farther away from an integer value, which means that the disparity values have not been estimated with sub-pixel accuracy.

As a result of studying the above-described problem of conventional techniques such as those disclosed in Japanese Patent No. 4168125 and "*Stereo Processing by Semiglobal Matching and Mutual Information*", the present inventors invented the following technique in order to improve the accuracy in estimating a disparity value with sub-pixel accuracy between a plurality of images.

A disparity estimation device according to an aspect of the present disclosure includes: a processor; and a memory, wherein the processor performs: (a) obtaining, from the memory, a first image captured by a first camera disposed in a first position and a second image captured by a second camera disposed in a second position, the first image including a plurality of first pixels, the second image including a plurality of second pixels; (b) calculating, for each of the plurality of first pixels, a first census feature amount based on a comparison between a pixel value of the first pixel and a pixel value of a neighboring pixel of the first pixel in the first image, and calculating, for each of the plurality of second pixels, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels.

According to the above-described aspect, the disparity estimation device estimates the disparity value of each pixel of the first image with integer pixel accuracy using the first image and the second image on the basis of the census feature amounts and the difference degree. Furthermore, the disparity estimation device calculates a sub-pixel evaluation value based on the relationship of pixel values between a pixel of interest which is the first pixel of the first image and the plurality of reference pixels which are the second pixels of the second image, where neighboring pixels of each of the pixel of interest and the plurality of reference pixels are included, and estimates the disparity value of the pixel of interest with sub-pixel accuracy using the sub-pixel evaluation value. This disparity value reflects the distribution of the pixel values around the pixel of interest of the first image and the distribution of the pixel values around the reference pixel of the second image. The disparity image composed of such disparity values can be kept from streak artifacts that are generated due to the disparity values being different across lines such as edges and boundaries of a subject. Thus, the disparity estimation device is capable of estimating the disparity value between the plurality of images with a high level of accuracy.

In the disparity estimation device according to the aspect of the present disclosure, the plurality of first pixels may include a third pixel, a fourth pixel, and a fifth pixel, the plurality of second pixels may include a sixth pixel, a seventh pixel, and an eighth pixel, each of the fourth pixel and the fifth pixel may be a neighboring pixel of the third pixel located within a predetermined distance from the third pixel in the first image, each of the seventh pixel and the eighth pixel may be a neighboring pixel of the sixth pixel located within a predetermined distance from the sixth pixel in the second image, and in (b), the first census feature amount of the third pixel may include a comparison value between a pixel value of the third pixel and a pixel value of the fourth pixel and a comparison value between the pixel value of the third pixel and a pixel value of the fifth pixel, and the second census feature amount of the sixth pixel may include a comparison value between a pixel value of the sixth pixel and a pixel value of the seventh pixel and a comparison value between the pixel value of the sixth pixel and a pixel value of the eighth pixel.

In the disparity estimation device according to the aspect of the present disclosure, the processor may calculate a Hamming distance between the first census feature amount and the second census feature amount as the difference degree.

According to the above-described aspect, calculating the difference degree using the Hamming distance between the census feature amounts is easy. Thus, the disparity estimation device is capable of easily calculating the difference degree.

In the disparity estimation device according to the aspect of the present disclosure, in (e), the processor may perform: (e-1) extracting, from the plurality of second pixels, a first reference pixel, a second reference pixel, and a third reference pixel which are located in positions corresponding to the first disparity value of the first pixel, a first near disparity value close to the first disparity value, and a second near disparity value close to the first disparity value, respectively; (e-2) calculating a first sub-pixel evaluation value based on a difference between (i) the pixel value of the first pixel and the pixel value of the neighboring pixel of the first pixel and (ii) a pixel value of the first reference pixel and a pixel value of a neighboring pixel of the first reference pixel; (e-3) calculating a second sub-pixel evaluation value based on a difference between (i) the pixel value of the first pixel and the pixel value of the neighboring pixel of the first pixel and (ii) a pixel value of the second reference pixel and a pixel value of a neighboring pixel of the second reference pixel; (e-4) calculating a third sub-pixel evaluation value based on a difference between (i) the pixel value of the first pixel and the pixel value of the neighboring pixel of the first pixel and (ii) a pixel value of the third reference pixel and a pixel value of a neighboring pixel of the third reference pixel; and (e-5) estimating the second disparity value of the first pixel by equiangular fitting in which a set of the first sub-pixel evaluation value and the first disparity value, a set of the second sub-pixel evaluation value and the first near disparity value, and a set of the third sub-pixel evaluation value and the second near disparity value are used.

According to the above-described aspect, the disparity estimation device calculates a sub-pixel evaluation value based on a difference of pixel values between the pixel of interest which is the first pixel of the first image and the first to third reference pixels of the second image, where neighboring pixels of each of the pixel of interest and the first to third reference pixels are included, and calculates the optimal sub-pixel evaluation value and the disparity value with sub-pixel accuracy corresponding to the optimal sub-pixel evaluation value by the equiangular fitting method in which the sub-pixel evaluation value is used. Thus, the disparity estimation device is capable of estimating the disparity value of the pixel of interest with a high level of accuracy.

In the disparity estimation device according to the aspect of the present disclosure, between (c) and (d), the processor may perform (g) including: for each of evaluation pixels which is one of the plurality of first pixels located in a predetermined direction from a pixel of interest which is one of the plurality of first pixels that has a disparity value to be estimated in the first image, (g-1) calculating a first evaluation value for each of the plurality of second pixels that is located within a search range based on a comparison between a disparity value of a second evaluation pixel adjacent to a first evaluation pixel in the predetermined direction and a disparity value of the second pixel within the search range with respect to a co-located pixel located in the second image and corresponding to the first evaluation pixel, the search range being used to calculate the difference degree, the first evaluation pixel and the second evaluation pixel being included in the evaluation pixels; (g-2) calculating a second evaluation value for the disparity value of each of the plurality of second pixels within the search range based on a difference degree between the first evaluation pixel and the second pixel within the search range and the first evaluation value for the second pixel within the search range; and (g-3) calculating an addition evaluation value by adding up second evaluation values for all the evaluation pixels corresponding to the disparity value of each of the plurality of second pixels within the search range. In (d), the disparity value corresponding to the smallest addition evaluation value may be determined as the first disparity value of the pixel of interest.

According to the above-described aspect, the second evaluation value is an index in which a change in the disparity value of a pixel around the pixel of interest is reflected to the difference degree. Since the disparity estimation device determines a disparity value resulting in the minimum sum of the second evaluation value as the first disparity value of the pixel of interest, the first disparity value of the pixel of interest is likely to have a value equal or close to the disparity value of a pixel around the pixel of interest, and this is the case for the second disparity value of the pixel of interest. Thus, with the disparity estimation device, it is possible to reduce the streaking artifacts, i.e., streak artifacts which are generated due to the disparity values being different across lines such as edges and boundaries of a subject.

In the disparity estimation device according to the aspect of the present disclosure, in (e), when the first disparity value and a third disparity value corresponding to one of the plurality of second pixels that results in one of a maximum value and a minimum value of the plurality of sub-pixel evaluation values do not match each other for the first pixel, the processor may determine a disparity value of −0.5 or 0.5 as a decimal disparity value based on continuity of disparity values between the first pixel and the neighboring pixel of the first pixel, and use, instead of the first disparity value, a disparity value obtained by adding the disparity value determined to the first disparity value.

According to the above-described aspect, the accuracy in calculating the sub-pixel evaluation value based on the first disparity value is improved.

In the disparity estimation device according to the aspect of the present disclosure, in (b), the processor may perform: (b-1) determining, as a comparison region which is a region of neighboring pixels to be compared upon calculating a census feature amount of a current pixel, a plurality of comparison regions each of which includes the current pixel and which are in different positions with respect to the current pixel; and (b-2) calculating, for each of the plurality of comparison regions, the first census feature amount of the plurality of first pixels and the second census feature amount of the plurality of second pixels, in (c), the processor may calculate the difference degree for each of the plurality of comparison regions, and in (d), the processor may obtain the first disparity value of the first pixel with integer pixel accuracy by selecting a disparity value corresponding to a lowest difference degree among the difference degrees for all the plurality of comparison regions.

According to the above-described aspect, the disparity estimation device determines, as the first disparity value of the pixel of interest, a disparity value corresponding to the lowest difference degree among the difference degrees of the pixels of interest for the plurality of comparison regions. The error of this first disparity value attributed to the position of the comparison region with respect to the pixel of interest is small; this is also the case for the second disparity value. Thus, the disparity estimation device is capable of accurately matching the position of the contour of a subject and the position of the boundary generated due to a difference in the disparity value in the disparity image for pixels located close to the boundary of occlusion or the boundary between the foreground and the background at which the disparity value changes.

In the disparity estimation device according to the aspect of the present disclosure, in (c), for the first pixel and the second pixel for which the difference degree is calculated, the processor may add, to the difference degree, a weight based on at least one of a difference between a luminance value that is the pixel value of the neighboring pixel of the first pixel and a luminance value that is the pixel value of the neighboring pixel of the second pixel and a difference between a luminance gradient of the neighboring pixel of the first pixel and a luminance gradient of the neighboring pixel of the second pixel.

According to the above-described aspect, both the weight based on the difference between the luminance value of a pixel around the first pixel and the luminance value of a pixel around the second pixel and the weight based on the difference between the luminance gradient of a pixel around the first pixel and the luminance gradient of a pixel around the second pixel are spatial weights for the inside of the comparison region even when the arrangement of the comparison regions with respect to the pixel of interest is fixed. Accordingly, the difference degree can reflect a change in the luminance value and/or a change in the luminance gradient. Thus, only by using a single comparison region for the pixel of interest, the disparity estimation device is capable of accurately matching the position of the contour of a subject and the position of the boundary generated due to a difference in the disparity value in the disparity image for pixels located close to the boundary of occlusion or the boundary between the foreground and the background at which the disparity value changes.

In the disparity estimation device according to the aspect of the present disclosure, in (g), the processor may add, to the first evaluation value, a weight based on at least one of a difference between luminance values that is a difference between a pixel value of the first evaluation pixel and a pixel value of the second pixel within the search range, a difference between a luminance gradient of the first evaluation pixel and a luminance gradient of the second pixel within the search range, and a luminance gradient of one of the first evaluation pixel and the second pixel within the search range.

According to the above-described aspect, the aforementioned weight is used to spatially weight the inside of the comparison region even when the arrangement of the comparison regions with respect to the pixel of interest is fixed. Accordingly, the addition evaluation value calculated on the basis of the first evaluation value can reflect a change in the luminance value and/or a luminance gradient. Thus, only by using a single comparison region for the pixel of interest, the disparity estimation device is capable of accurately matching the position of the contour of a subject and the position of the boundary generated due to a difference in the disparity value in the disparity image for pixels located close to the boundary of occlusion or the boundary between the foreground and the background at which the disparity value changes.

A disparity estimation method according to an aspect of the present disclosure includes: (a) obtaining a first image captured by a first camera disposed in a first position and a second image captured by a second camera disposed in a second position; (b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels. At least one of (a) to (f) is performed by at least one processor. According to the above-described aspect, it is possible to obtain advantageous effects that are the same as or similar to those produced by the disparity estimation device according to an aspect of the present disclosure.

In the disparity estimation method according to the aspect of the present disclosure, the plurality of first pixels may include a third pixel, a fourth pixel, and a fifth pixel, the plurality of second pixels may include a sixth pixel, a seventh pixel, and an eighth pixel, each of the fourth pixel and the fifth pixel may be a neighboring pixel of the third pixel located within a predetermined distance from the third pixel in the first image, each of the seventh pixel and the eighth pixel may be a neighboring pixel of the sixth pixel located within a predetermined distance from the sixth pixel in the second image, and in (b), the first census feature amount of the third pixel may include a comparison value between a pixel value of the third pixel and a pixel value of the fourth pixel and a comparison value between the pixel value of the third pixel and a pixel value of the fifth pixel, and the second census feature amount of the sixth pixel may include a comparison value between a pixel value of the sixth pixel and a pixel value of the seventh pixel and a comparison value between the pixel value of the sixth pixel and a pixel value of the eighth pixel.

In the disparity estimation method according to the aspect of the present disclosure, a Hamming distance between the first census feature amount and the second census feature amount may be calculated as the difference degree.

In the disparity estimation method according to the aspect of the present disclosure, in (e), (e-1) a first reference pixel, a second reference pixel, and a third reference pixel which are located in positions corresponding to the first disparity value of the first pixel, a first near disparity value close to the first disparity value, and a second near disparity value close to the first disparity value, respectively, may be extracted from the plurality of second pixels, (e-2) a first sub-pixel evaluation value may be calculated which is based on a difference between (i) the pixel value of the first pixel and the pixel value of the neighboring pixel of the first pixel and (ii) a pixel value of the first reference pixel and a pixel value of a neighboring pixel of the first reference pixel, (e-3) a second sub-pixel evaluation value may be calculated which is based on a difference between (i) the pixel value of the first pixel and the pixel value of the neighboring pixel of the first pixel and (ii) a pixel value of the second reference pixel and a pixel value of a neighboring pixel of the second reference pixel, (e-4) a third sub-pixel evaluation value may be calculated which is based on a difference between (i) the pixel value of the first pixel and the pixel value of the neighboring pixel of the first pixel and (ii) a pixel value of the third reference pixel and a pixel value of a neighboring pixel of the third reference pixel, and (e-5) the second disparity value of the first pixel may be estimated by equiangular fitting in which a set of the first sub-pixel evaluation value and the first disparity value, a set of the second sub-pixel evaluation value and the first near disparity value, and a set of the third sub-pixel evaluation value and the second near disparity value are used.

The disparity estimation method according to the aspect of the present disclosure may include, between (c) and (d), (g) including: for each of evaluation pixels which is one of the plurality of first pixels located in a predetermined direction from a pixel of interest which is one of the plurality of first pixels that has a disparity value to be estimated in the first image, (g-1) calculating a first evaluation value for each of the plurality of second pixels that is located within a search range based on a comparison between a disparity value of a second evaluation pixel adjacent to a first evaluation pixel in the predetermined direction and a disparity value of the second pixel within the search range with respect to a co-located pixel located in the second image and corresponding to the first evaluation pixel, the search range being used to calculate the difference degree, the first evaluation pixel and the second evaluation pixel being included in the evaluation pixels; (g-2) calculating a second evaluation value for the disparity value of each of the plurality of second pixels within the search range based on a difference degree between the first evaluation pixel and the second pixel within the search range and the first evaluation value for the second pixel within the search range; and (g-3) calculating an addition evaluation value by adding up second evaluation values for all the evaluation pixels corresponding to the disparity value of each of the plurality of second pixels within the search range. In (d), the disparity value corresponding to the smallest addition evaluation value may be determined as the first disparity value of the pixel of interest.

In the disparity estimation method according to the aspect of the present disclosure, in (e), when the first disparity value and a third disparity value corresponding to one of the plurality of second pixels that results in one of a maximum value and a minimum value of the plurality of sub-pixel evaluation values do not match each other for the first pixel, a disparity value of −0.5 or 0.5 may be determined as a decimal disparity value based on continuity of disparity values between the first pixel and the neighboring pixel of the first pixel, and a disparity value obtained by adding the disparity value determined to the first disparity value may be used instead of the first disparity value.

In the disparity estimation method according to the aspect of the present disclosure, in (b): (b-1) as a comparison region which is a region of neighboring pixels to be compared upon calculating a census feature amount of a current pixel, a plurality of comparison regions each of which includes the current pixel and which are in different positions with respect to the current pixel may be determined; and (b-2) for each of the plurality of comparison regions, the first census feature amount of the plurality of first pixels and the second census feature amount of the plurality of second pixels may be calculated, in (c), the difference degree for each of the plurality of comparison regions may be calculated, and in (d), the first disparity value of the first pixel with integer pixel accuracy may be obtained by selecting a disparity value corresponding to a lowest difference degree among the difference degrees for all the plurality of comparison regions.

In the disparity estimation method according to the aspect of the present disclosure, in (c), a weight may be added to the difference degree for the first pixel and the second pixel for which the difference degree is calculated. The weight is based on at least one of a difference between a luminance value that is the pixel value of the neighboring pixel of the first pixel and a luminance value that is the pixel value of the neighboring pixel of the second pixel and a difference between a luminance gradient of the neighboring pixel of the first pixel and a luminance gradient of the neighboring pixel of the second pixel.

In the disparity estimation method according to the aspect of the present disclosure, in (g), a weight may be added to the first evaluation value. The weight is based on at least one of a difference between luminance values that is a difference between a pixel value of the first evaluation pixel and a pixel value of the second pixel within the search range, a difference between a luminance gradient of the first evaluation pixel and a luminance gradient of the second pixel within the search range, and a luminance gradient of one of the first evaluation pixel and the second pixel within the search range.

A program according to an aspect of the present disclosure causes a computer to execute: (a) obtaining a first image captured by a first camera disposed in a first position and a second image captured by a second camera disposed in a second position; (b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image; (c) calculating, for each of the plurality of first pixels, a difference degree corresponding to a disparity value in a position of each of at least one of the plurality of second pixels with respect to the first pixel using the first census feature amount and the second census feature amount of the at least one second pixel; (d) obtaining a first disparity value of each of the plurality of first pixels with integer pixel accuracy by selecting, using the difference degree, a disparity value corresponding to a lowest difference degree; (e) extracting, for each of the plurality of first pixels, a plurality of reference pixels located in positions corresponding to the first disparity value of the first pixel and a near disparity value close to the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels. According to the above-described aspect, it is possible to obtain advantageous effects that are the same as or similar to those produced by the disparity estimation device according to an aspect of the present disclosure.

Note that the aforementioned general or specific aspects may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a CD-ROM. Furthermore, the device may include one or more devices. When the device includes two or more devices, the two or more devices may be disposed in one device, and may be disposed in two or more separated devices. In the present Description and Claims, the "device" may not only mean a single device, but also mean a system including a plurality of devices.

Hereinafter, the disparity estimation device according to the present disclosure will be described in detail with reference to the drawings. Each of the embodiments described below shows a general or specific example. The numerical values, shapes, structural elements, the arrangement and connection of the structural elements, steps, the processing order of the steps etc. shown in the following embodiments are mere examples, and therefore do not limit the present disclosure. Therefore, among the structural elements in the following embodiments, structural elements not recited in any one of the independent claims which indicate the broadest concepts will be described as arbitrary structural elements. The respective figures are schematic diagrams and are not necessarily precise illustrations. Additionally, structural elements that are essentially the same share the same reference numerals in the respective figures, and there are cases where overlapping explanations thereof are omitted or simplified.

Embodiment 1

Depth measurement system 1 including disparity estimation device 100 according to Embodiment 1 will be described. Depth measurement system 1 calculates, from a plurality of captured images obtained by a plurality of cameras, the depth between a subject included in the captured images and the plurality of cameras, that is, three-dimensionally measures the depth to the position of the subject included in the captured images. Disparity estimation device 100 estimates the disparity value between the plurality of captured images to be used for the depth measurement. Note that the system capable of including disparity estimation device 100 is not limited to depth measurement system 1 and may be any system that uses the disparity value between the plurality of captured images.

Figure 14:
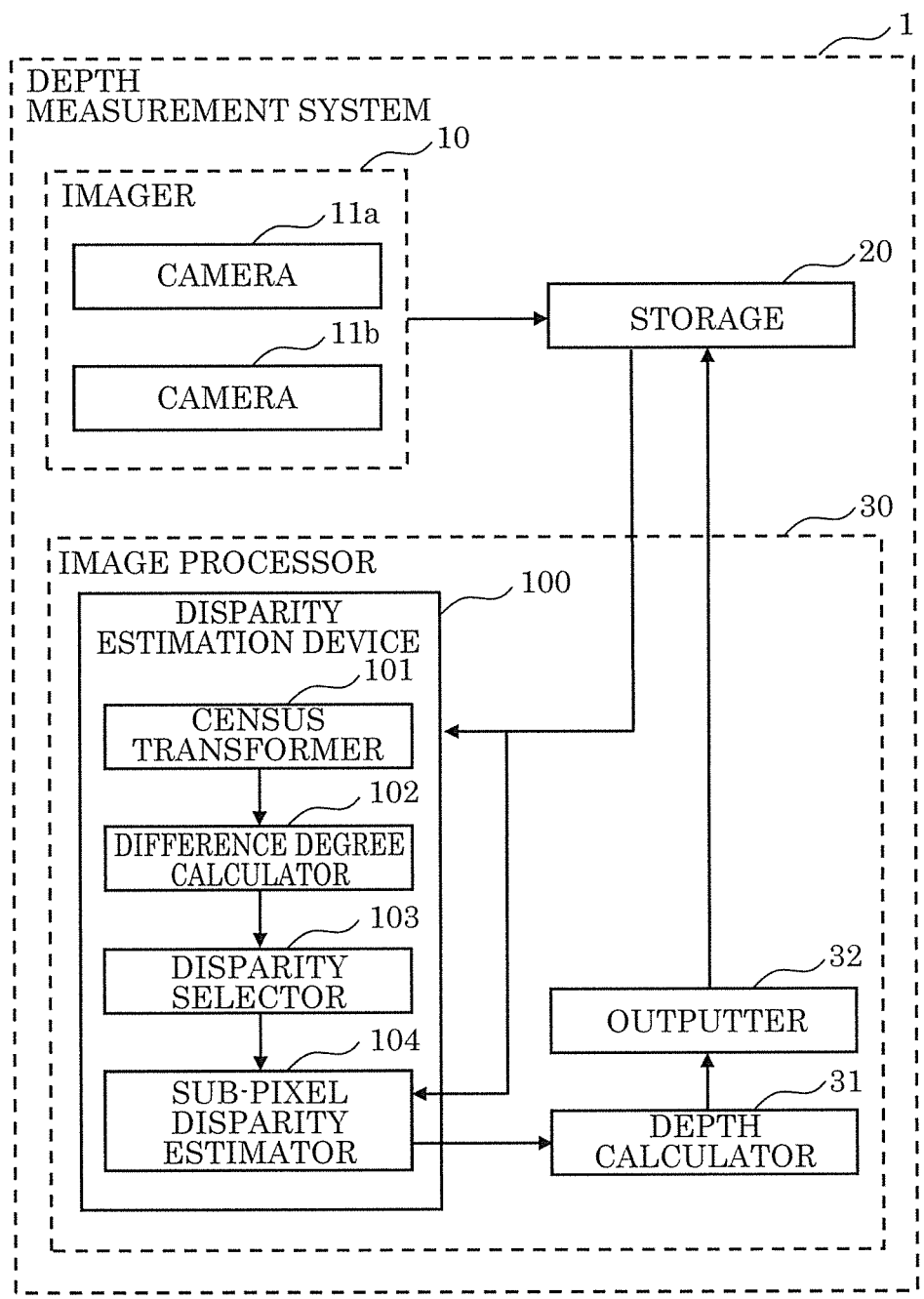
FIG. 14 is a block diagram showing an example of a functional configuration of a depth measurement system including a disparity estimation device according to Embodiment 1.

FIG. 14 is a block diagram showing an example of a functional configuration of depth measurement system 1 including disparity estimation device 100 according to Embodiment 1. As shown in FIG. 14, depth measurement system 1 includes imager 10, storage 20, and image processor 30. Imager 10, storage 20, and image processor 30 may be mounted on a single device or may be separately mounted on respective devices. In the case of the latter, the respective devices may transmit and receive information via wired or wireless communication. As the wired communication, any existing wired communication may be applied. As the wireless communication, any existing wireless communication may be applied. For example, as the wireless communication, a wireless local area network (LAN) such as wireless fidelity (Wi-Fi) (registered trademark) may be applied, and near-field wireless communication such as Bluetooth (registered trademark) and ZigBee (registered trademark) may be applied.

Imager 10 obtains an image by imaging and outputs the image to storage 20. Imager 10 includes at least two cameras; in the present embodiment, imager 10 includes two cameras 11a and 11b with different optical axis centers. In the present embodiment, cameras 11a and 11b capture, as moving images and/or still images, digital images in which the pixel value of each pixel is a luminance value, but may capture any digital images. Cameras 11a and 11b may be configured as separate cameras or may be configured as an integrated, compound-eye camera. Note that the number of cameras is not limited to two and may be any number greater than or equal to two. In the present embodiment, cameras 11a and 11b capture images at the same time.

Figure 15:
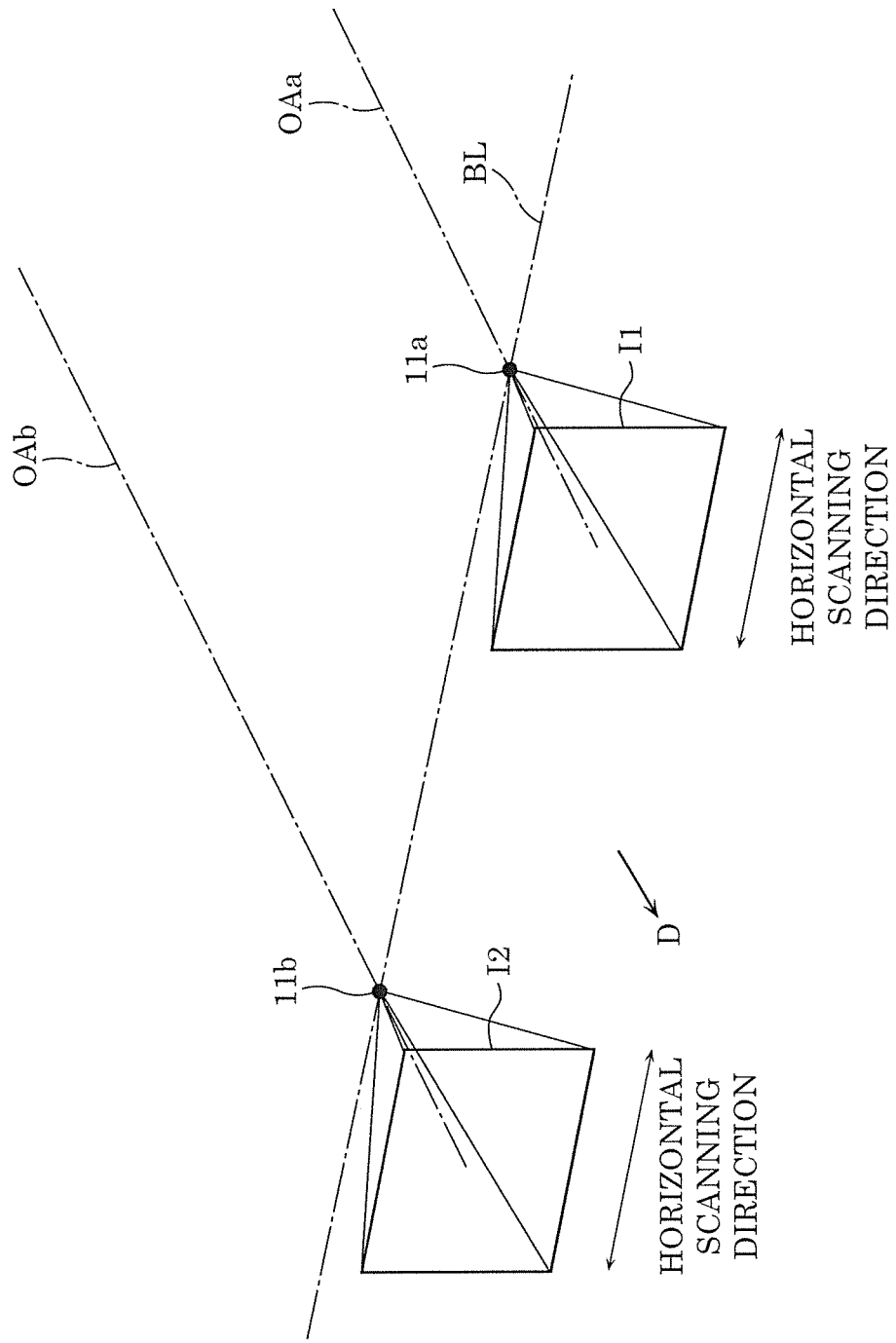
FIG. 15 is a schematic perspective view showing an arrangement example of cameras of an imager.
Figure 16:
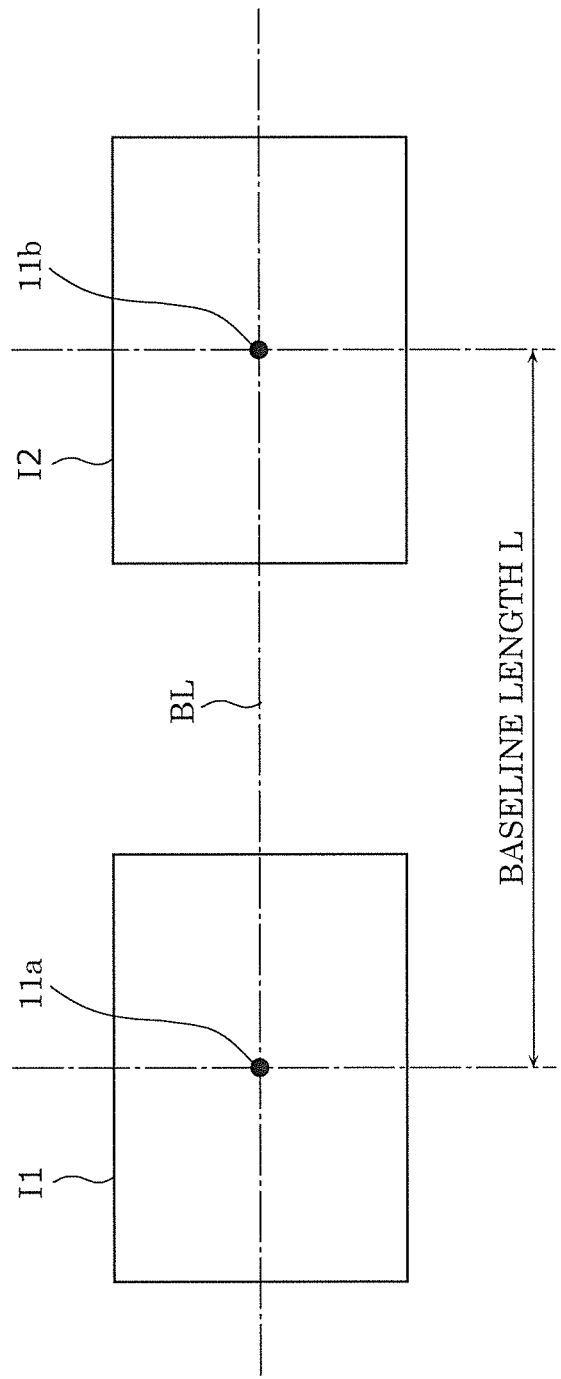
FIG. 16 is a schematic front view showing an example of the baseline length of the cameras in FIG. 15.

For example, in FIG. 15, an arrangement example of cameras 11a and 11b of imager 10 is shown in a schematic perspective view. Furthermore, in FIG. 16, an example of the baseline length of cameras 11a and 11b in FIG. 15 is shown in a schematic front view. In the example of FIG. 15, cameras 11a and 11b are horizontally arranged side by side. In this case, baseline BL connecting the centers of lenses of cameras 11a and 11b horizontally extends. Furthermore, respective optical axis centers OAa and OAb of cameras 11a and 11b are horizontally arranged side by side in parallel at a distance from each other and are perpendicular to the baseline BL direction. In this case, as shown in FIG. 16, baseline length L which is the distance between optical axis centers OAa and OAb of cameras 11a and 11b is greater than 0. Furthermore, cameras 11a and 11b are oriented in the same direction, namely, direction D; for instance, in the example of FIG. 15, optical axis centers OAa and OAb horizontally extend and are parallel to direction D. Moreover, the horizontal scanning direction and the baseline BL direction of cameras 11a and 11b are parallel. The horizontal scanning direction is the width direction among the long and width arrangement directions of a plurality of imaging elements included in each of the cameras; the horizontal scanning direction is substantially the same as the baseline BL direction. The plurality of imaging elements are, for example, planarly arranged in a grid, that is, in two directions including the horizontal direction, which is the width direction, and the vertical direction, which is the length direction, perpendicular to the horizontal direction. Here, camera 11a is an example of the first camera disposed in the first position, and camera 11b is an example of the second camera disposed in the second position.

Figure 17:
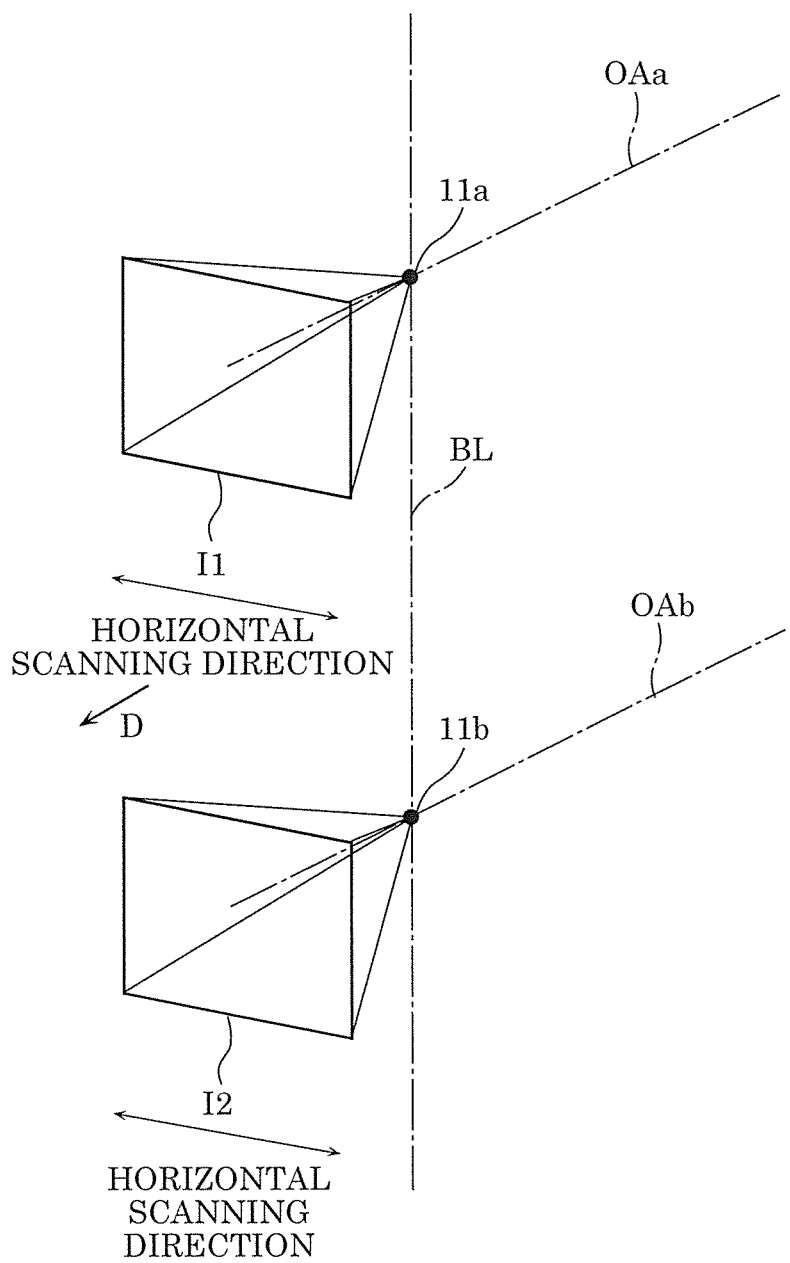
FIG. 17 is a schematic perspective view showing another arrangement example of cameras of an imager.

Note that the arrangement of cameras 11a and 11b is not limited to the horizontal arrangement such as that shown in FIG. 15; for example, the arrangement may be vertical arrangement, that is, top-to-bottom arrangement such as that shown in FIG. 17. FIG. 17 is a schematic perspective view showing another arrangement example of cameras 11a and 11b of imager 10. In this case, baseline BL vertically extends. Respective optical axis centers OAa and OAb of cameras 11a and 11b are vertically arranged side by side in parallel at a distance from each other and are perpendicular to the baseline BL direction. Furthermore, cameras 11a and 11b are oriented in the same direction, namely, direction D; for instance, in the example of FIG. 17, optical axis centers OAa and OAb horizontally extend and are parallel to direction D. Moreover, the horizontal scanning direction and the baseline BL direction of cameras 11a and 11b are perpendicular.

Cameras 11a and 11b described above are configured as stereo cameras capable of capturing images of the same subject, and the images captured by such cameras 11a and 11b are stereo images.

In the present Description and Claims, "parallel" and "perpendicular" may not only mean the case of being completely parallel and perpendicular, respectively, but also mean the case of being different from being completely parallel and perpendicular, respectively. The aforementioned difference may, for example, be an angle of less than 10 degrees.

Storage 20 allows storage and retrieval of various pieces of information. For example, storage 20 stores the captured image obtained by imager 10. In storage 20, programs for operating imager 10 and/or image processor 30 may be stored. These programs may be stored in a memory of each of imager 10 and image processor 30 which is not shown in the drawings. Storage 20 is, for example, implemented as a storage device such as a read-only memory (ROM), a random access memory (RAM), a semiconductor memory such as a flash memory, a hard disk, or a solid state drive (SSD). Here, storage 20 is an example of the memory.

Image processor 30 includes disparity estimation device 100, depth calculator 31, and outputter 32. Furthermore, disparity estimation device 100 includes census transformer 101, difference degree calculator 102, disparity selector 103, and sub-pixel disparity estimator 104. The structural elements of image processor 30 and disparity estimation device 100 described above may be configured using a computer system (not shown in the drawings) including a central processing unit (CPU) or a digital signal processor (DSP), memories such as RAM and ROM, and the like. A part or all of the functions of the structural elements may be achieved by the CPU or the DSP executing the programs recorded on the ROM using the RAM as a work memory. Furthermore, a part or all of the functions of the structural elements may be achieved by a dedicated hardware circuit such as an electronic circuit or an integrated circuit. A part or all of the functions of the structural elements may be achieved by a combination of the software function and the hardware circuit described above. The program may be provided as an application, for example, through communication via a communication network such as the Internet or communication in compliance with a mobile communication standard or via other wireless networks, wired networks, or broadcast.

Using corresponding captured images obtained by cameras 11a and 11b, disparity estimation device 100 estimates the disparity of each pixel, specifically, in various positions in the captured images, between the captured images, and outputs the disparity to disparity estimator 31. An example of the corresponding captured images is images captured by cameras 11a and 11b at the same point in time. On the basis of the disparity between the images captured by cameras 11a and 11b, depth calculator 31 calculates, using the triangulation technique, the depth between a subject appearing at each pixel and cameras 11a and 11b for various positions, specifically, the pixels, in the captured images, and outputs the depth to outputter 32. Depth calculator 31 calculates the depth between the subject and baseline BL of cameras 11a and 11b. Depth calculator 31 may generate a depth image in which the pixel value of each pixel is the depth from the optical center (OAa or OAb in FIG. 15 and FIG. 17) of a base camera (camera 11a or camera 11b). Outputter 32 associates depth information such as the depth image and the depth at each pixel of the captured image calculated by depth calculator 31 with the captured image, and outputs the depth information to storage 20, a device including depth measurement system 1, or the like. For example, in the case where depth measurement system 1 is mounted on an automobile, outputter 32 may output the depth information to an electronic control unit (ECU) for the automobile.

Census transformer 101 of disparity estimation device 100 performs the census transform on input images which are images I1 and I2 captured by cameras 11a and 11b. The census transform is a process of transforming, into a bit sequence, the distribution of the pixel values, i.e., luminance values, of neighboring pixels of the pixel of interest according to the value relationship between the pixel of interest and the neighboring pixels of the pixel of interest. Specifically, for example, when the pixel value of the pixel of interest is greater than the pixel value of a neighboring pixel, the census transformed value of the neighboring pixel is 1, and when the pixel value of the pixel of interest is less than or equal to the pixel value of a neighboring pixel, the census transformed value of the neighboring pixel is zero. Census transformer 101 performs the census transform on all the pixels of captured images I1 and I2. The neighboring pixel is located within a predetermined distance from the pixel of interest, and a region of the neighboring pixels is referred to a "comparison region".

For example, FIG. 18A and FIG. 18B show an example of neighboring pixels in the census transform. FIG. 19A shows an example of the census transform on the neighboring pixels in FIG. 18A, and FIG. 19B shows an example of the census transform on the neighboring pixels in FIG. 18B. In FIG. 18A, FIG. 18B, FIG. 19A, and FIG. 19B, ctr represents the pixel of interest. FIG. 18A and FIG. 19A show an example in which eight pixels near the pixel of interest are neighboring pixels, and FIG. 18B and FIG. 19B show an example in which 64 pixels near the pixel of interest are neighboring pixels. In the examples of FIG. 19A and FIG. 19B, the distribution of the pixel values of the neighboring pixels of the pixel of interest can be expressed by an 8-bit sequence and a 64-bit sequence, respectively, through the census transform. Specifically, each of FIG. 19A and FIG. 19B shows an example of the pixel values of the pixel of interest and the neighboring pixels before the census transform, an example of the census transformed values of the neighboring pixels, and an example of the bit sequence of the census transformed values.

For example, in FIG. 18A, FIG. 18B, FIG. 19A, and FIG. 19B, the X-axis of the pixel coordinates is defined along a horizontal direction in the drawings, the Y-axis of the pixel coordinates is defined along a direction perpendicular to the horizontal direction in the drawings, the positive direction long the X-axis is defined as the right side along the horizontal direction in the drawings, and the positive direction along the Y-axis is defined as the lower side in the drawings. The X-axis extends along baseline BL of cameras 11a and 11b.

For example, the bit sequence includes the census transformed value of a neighboring pixel having the minimum y-coordinate and the minimum x-coordinate as the first element, that is, the first bit, further includes, as a serial element, the census transformed value of a neighboring pixel on the positive direction along the X-axis that has the same y-coordinate, and then includes, as a serial element, the census transformed value of a neighboring pixel on the positive direction along the X-axis that has the same y-coordinate as the y-coordinate is incremented by 1. For instance, the bit sequence is represented as (00011011) in the example of FIG. 19A. In this way, bit sequences are generated for all the pixels of each of captured images I1 and I2. Note that the number and arrangement of the neighboring pixels are not limited to the number and arrangement in FIG. 18A and FIG. 18B and may be any number and arrangement. Here, a bit sequence of census transformed values such as that described above constitutes a census feature amount.

Difference degree calculator 102 calculates the difference degree of the census feature amount of a pixel within a predetermined search range between captured images I1 and I2. In the present embodiment, the Hamming distance is used as the difference degree of the census feature amount. Here, the search range will be described. The search range includes at least one pixel. As shown in FIG. 15, in the present embodiment, camera 11a is disposed to the left of camera 11b when viewed along direction D which is the imaging direction, and serves as a left camera, and camera 11b serves as a right camera.

The following will describe the search range applied in the case where image I1 captured by camera 11a is used as a base image and image I2 captured by camera 11b is used as a reference image. In this case, as shown in FIG. 20, for example, the difference degree of the census feature amount is calculated between a pixel (hereinafter referred to as "pixel of interest") I1p on base image I1 and each of all the pixels (hereinafter also referred to as "reference pixels") I2$p_1$ to I2$p_n$ within the search range on reference image I2. Note that FIG. 20 shows an example of the pixel search range upon calculation of the difference degree. Reference pixels I2$p_1$ to I2$p_n$ form a row of pixels having the same y-coordinate as the pixel coordinates of pixel of interest I1p, and this row of pixels forms the search range. Such a search range is a one-dimensional search range of the pixel coordinates and is the entire one pixel row in reference image I2.

Alternatively, the difference degree of the census feature amount may be calculated between pixel of interest I1p and each of k+1 reference pixels (k is a positive integer) including co-located pixel I2$p_m$ which is in reference image I2 and has the same pixel coordinates with pixel of interest I1p. The pixel coordinates of pixel of interest I1p and the pixel coordinates of co-located pixel I2$p_m$ are different in association with the disparity value at pixel of interest I1p, but in the present embodiment, the disparity value of each pixel of an initial disparity image representing the initial disparity values of the respective pixels is zero. Therefore, the pixel coordinates of pixel of interest I1p and the pixel coordinates of co-located pixel I2$p_m$ are the same. Such reference pixels have the same y-coordinate with that of co-located pixel I2$p_m$, are k+1 pixels arranged starting from co-located pixel I2$p_m$ in the negative direction along the X-axis, i.e., k+1 pixels between co-located pixel I2$p_m$ and pixel I2$p_{m-k}$, and form the search range. Such a search range is a one-dimensional search range and covers the k+1 pixels arranged starting from co-located pixel I2$p_m$ toward camera 11a along baseline BL in the pixel row including co-located pixel I2$p_m$ in reference image I2. In the following embodiments, cases where the k+1 pixels are set as the search range will be described.

Note that the disparity value of co-located pixel I2$p_m$ with respect to pixel of interest I1p is 0 pixel, and the disparity value of pixel I2$p_{m-k}$ with respect to pixel of interest I1p is −k pixel. Therefore, the search range is a range where the horizontal disparity value with respect to pixel of interest I1p is between the 0 pixel and the −k pixel. Note that the aforementioned search range is the range where the disparity value is less than or equal to 0, but this is not limiting; the search range may include the range where the disparity value exceeds 0. In the present embodiment, the disparity value having a positive value represents a disparity in the positive direction along the X-axis, and the disparity value having a negative value represents a disparity in the negative direction along the X-axis.

Similarly, the search range applied when captured image I2 is used as a base image and captured image I1 is used as a reference image will be described. In this case, as shown in FIG. 21, the difference degree of the census feature amount is calculated between pixel of interest I2p on base image I2 and each of all reference pixels I1$p_1$ to I1$p_n$ within the search range on reference image I1. Note that FIG. 21 shows another example of the pixel search range upon calculation of the difference degree. Such a search range is the entire one pixel row in reference image I1, and the y-coordinate of this row is the same as that of pixel of interest I2p.

Alternatively, the difference degree of the census feature amount may be calculated between pixel of interest I2p and each of k+1 reference pixels including co-located pixel I1$p_m$ in reference image I1. Such reference pixels have the same y-coordinate with that of co-located pixel I1$p_m$, are k+1 pixels arranged starting from co-located pixel I1$p_m$ in the positive direction along the X-axis, i.e., k+1 pixels between co-located pixel I1$p_m$ and pixel I1$p_{m+k}$, and form the search range. Such a search range covers the k+1 pixels arranged starting from co-located pixel I1$p_m$ toward camera 11b along baseline BL in the pixel row including co-located pixel I1$p_m$ in reference image I1. The search range is the range where the horizontal disparity value with respect to pixel of interest I2p is between the 0 pixel and the k pixel. The aforementioned search range is the range where the disparity value is greater than or equal to 0, but this is not limiting; the search range may include the range where the disparity value is less than 0.

The difference degree based on the Hamming distance is calculated as follows. For example, when the census feature amount of the pixel of interest of the base image is a bit sequence (00011011) and the census feature amount of the reference pixel of the reference image is a bit sequence (10110001), the Hamming distance between these two pixels is 1+0+1+0+1+0+1+0=4, and the difference degree is "4". The difference degree, which is the Hamming distance, is the number of digits of the bit sequences indicating the census feature amounts of the two pixels which have different values at the same digits. Specifically, upon calculation of the Hamming distance, when the bits of two bit sequences at the same digit have the same value, the difference between bits is "0", and when the bits at the same digit have different values, the difference between bits is "1"; the sum of all the differences between bits is the Hamming distance.

In this way, for each pixel of interest of the base image, by using the census feature amount of the pixel of interest and the census feature amount of at least one reference pixel of the reference image, difference degree calculator 102 calculates a difference degree corresponding to the disparity value in the position of the reference pixel with respect to the pixel of interest. Here, the plurality of pixels of captured image I1 serving as the base image is an example of the plurality of first pixels and include the third pixel, the fourth pixel, and the fifth pixel. The plurality of pixels of captured image I2 serving as the reference image is an example of the plurality of second pixels and include the sixth pixel, the seventh pixel, and the eighth pixel. The fourth pixel and the fifth pixel are neighboring pixels of the third pixel each of which is located within a predetermined distance from the third pixel such as the comparison region on captured image I1. The seventh pixel and the eighth pixel are neighboring pixels of the sixth pixel each of which is located within a predetermined distance from the sixth pixel such as the comparison region on captured image I2. The census feature amount of the third pixel includes the comparison value between the pixel value of the third pixel and the pixel value of the fourth pixel and the comparison value between the pixel value of the third pixel and the pixel value of the fifth pixel. The census feature amount of the sixth pixel includes the comparison value between the pixel value of the sixth pixel and the pixel value of the seventh pixel and the comparison value between the pixel value of the sixth pixel and the pixel value of the eighth pixel.

Disparity selector 103 selects, for the pixel of interest, the minimum difference degree from among the difference degrees of the reference pixels within a corresponding search range, and specifies the disparity value of the reference pixel corresponding to the difference degree. Subsequently, disparity selector 103 determines the specified disparity value as the disparity value of the pixel of interest with integer accuracy, that is, the disparity value with integer pixel accuracy. Disparity selector 103 determines the disparity value of each pixel of the base image with integer accuracy by sequentially scanning all the pixels of the base image as the pixel of interest. Disparity selector 103 may generate a disparity image with integer accuracy for the base image. The disparity image includes the disparity value with integer accuracy as the pixel value of each pixel and results from replacing the pixel value of each pixel of the base image that includes the luminance value by the disparity value.

Figure 22:
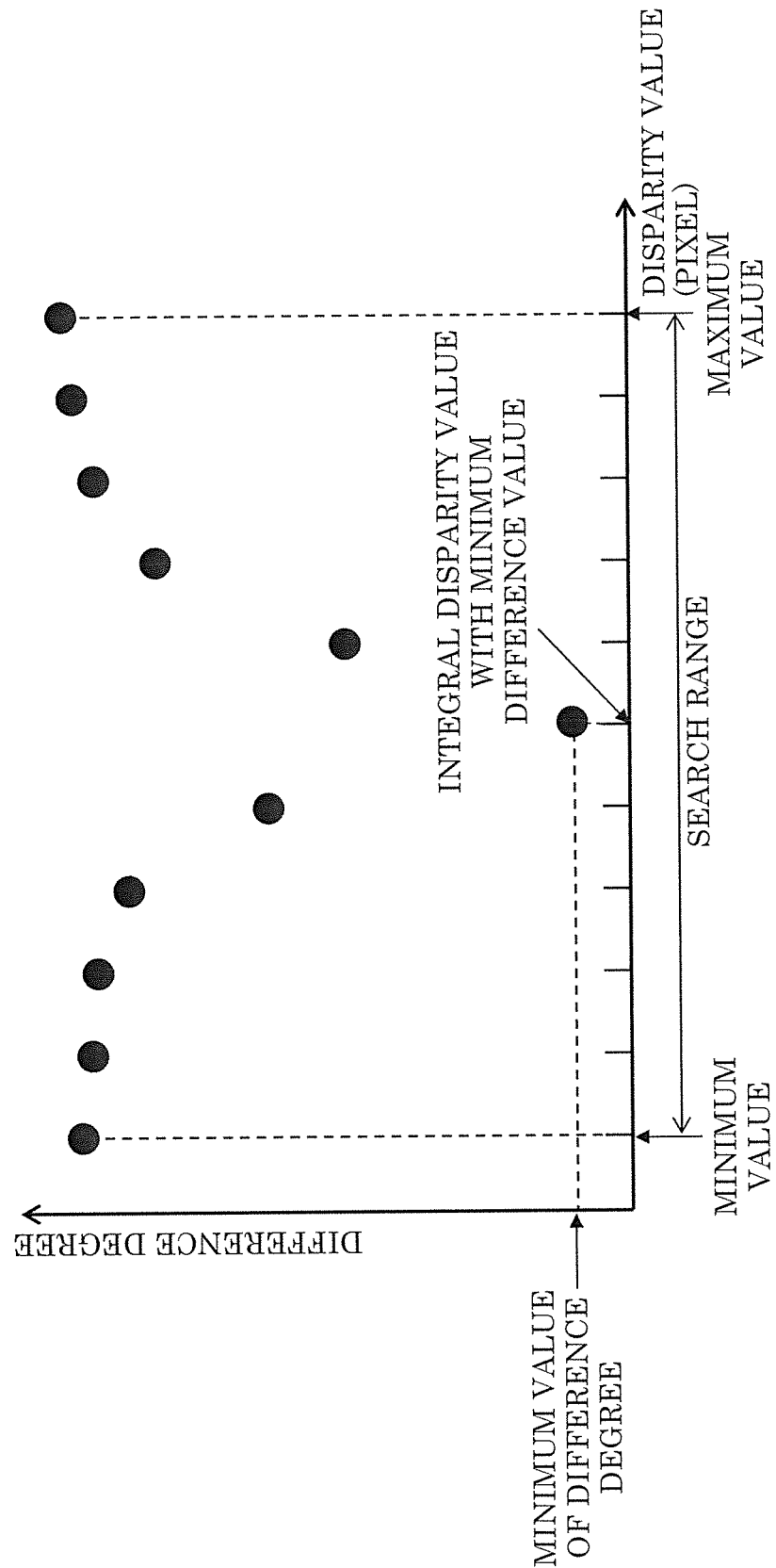
FIG. 22 shows an example of the relationship between a difference degree calculated for one pixel of interest and the disparity value of a reference pixel corresponding to the difference degree.

Specifically, determination of the disparity value of the pixel of interest with integer accuracy is processed as described below. For example, FIG. 22 is an illustration of an example of the relationship between the difference degree calculated for a single pixel of interest and the disparity value of a reference pixel within the search range corresponding to the difference degree. As illustrated, the difference degree is calculated at an interval of a single pixel within a search range determined according to the minimum value and the maximum value of the preset disparity value. Disparity selector 103 selects the lowest difference degree from among the difference degrees included in the search range, and determines a disparity value corresponding to the lowest difference degree as the disparity value of the pixel of interest with integer accuracy. In this way, disparity selector 103 determines the disparity value of each pixel of the base image with integer accuracy by sequentially scanning all the pixels of the base image as the pixel of interest.

For captured images I1 and I2, sub-pixel disparity estimator 104 sets window regions around the pixel of interest of the base image and the reference pixel of the reference image, and calculates a sub-pixel evaluation value which is an evaluation value based on the luminance difference between the window regions. Furthermore, sub-pixel disparity estimator 104 estimates the disparity of the pixel of interest with sub-pixel accuracy by the equiangular fitting method in which the sub-pixel evaluation value is used.

For example, in the conventional technique such as that disclosed in Japanese Patent No. 4168125, for each pixel of each of two input images, the census transform is performed on the pixel of interest and a neighboring pixel such as those exemplified in FIG. 18A and FIG. 18B, and calculates the Hamming distance of the census feature amounts between the pixels of the two input images to calculate a difference degree for the disparity value at an interval of a single pixel. Furthermore, in the conventional technique, the disparity value corresponding to the minimum difference degree among the difference degrees calculated between the pixel of the base image which is one of the input images and the pixels of the reference image which is the other input image is determined as the disparity value of the pixel of the base image with integer accuracy. Moreover, in the conventional technique, the disparity value of the pixel of the base image with sub-pixel accuracy is estimated using the equiangular fitting method on the basis of the relationship between the difference degrees corresponding to the disparity values of ±1 pixel from the disparity value corresponding to the minimum difference degree, the minimum difference degree, and the disparity values corresponding to these difference degrees.

In contrast, sub-pixel disparity estimator 104 according to the present embodiment sets, for the pixel of interest of the base image which is captured image I1 or I2, a window region which is the same as the region of neighboring pixels in the census transform such as those exemplified in FIG. 18A and FIG. 18B.

Furthermore, sub-pixel disparity estimator 104 specifies the first reference pixel of the reference image which is located corresponding to the disparity value of the pixel of interest on the basis of the disparity value of the pixel of interest with integer accuracy determined by disparity selector 103. Since the search range for calculating a difference degree is a range in the pixel coordinates which extends along the X-axis, when the disparity value of the pixel of interest with integer accuracy is d pixels, the first reference pixel is a pixel located offset by d pixels in the positive direction along the X-axis relative to a co-located pixel which is in the reference image and has the same pixel coordinates as the pixel of interest. Subsequently, sub-pixel disparity estimator 104 sets, for the first reference pixel and a pixel having a disparity value near the disparity value of the first reference pixel of the reference image, the same window regions as that for the base pixel. In the present embodiment, the pixel having a near disparity value is a pixel having a ±1-pixel different disparity value along the X-axis relative to the first reference pixel, that is, a pixel having d−1 and d+1 disparity values along the X-axis. The pixels having d−1 and d+1 disparity values are located offset in the pixel coordinates from the first reference pixel by −1 pixel and +1 pixel in the positive direction along the X-axis. Such two pixels are referred to as the second reference pixel and the third reference pixel. Note that the second reference pixel corresponds to the pixel having a disparity value of d−1, and the third reference pixel corresponds to the pixel having a disparity value of d+1.

Figure 23:
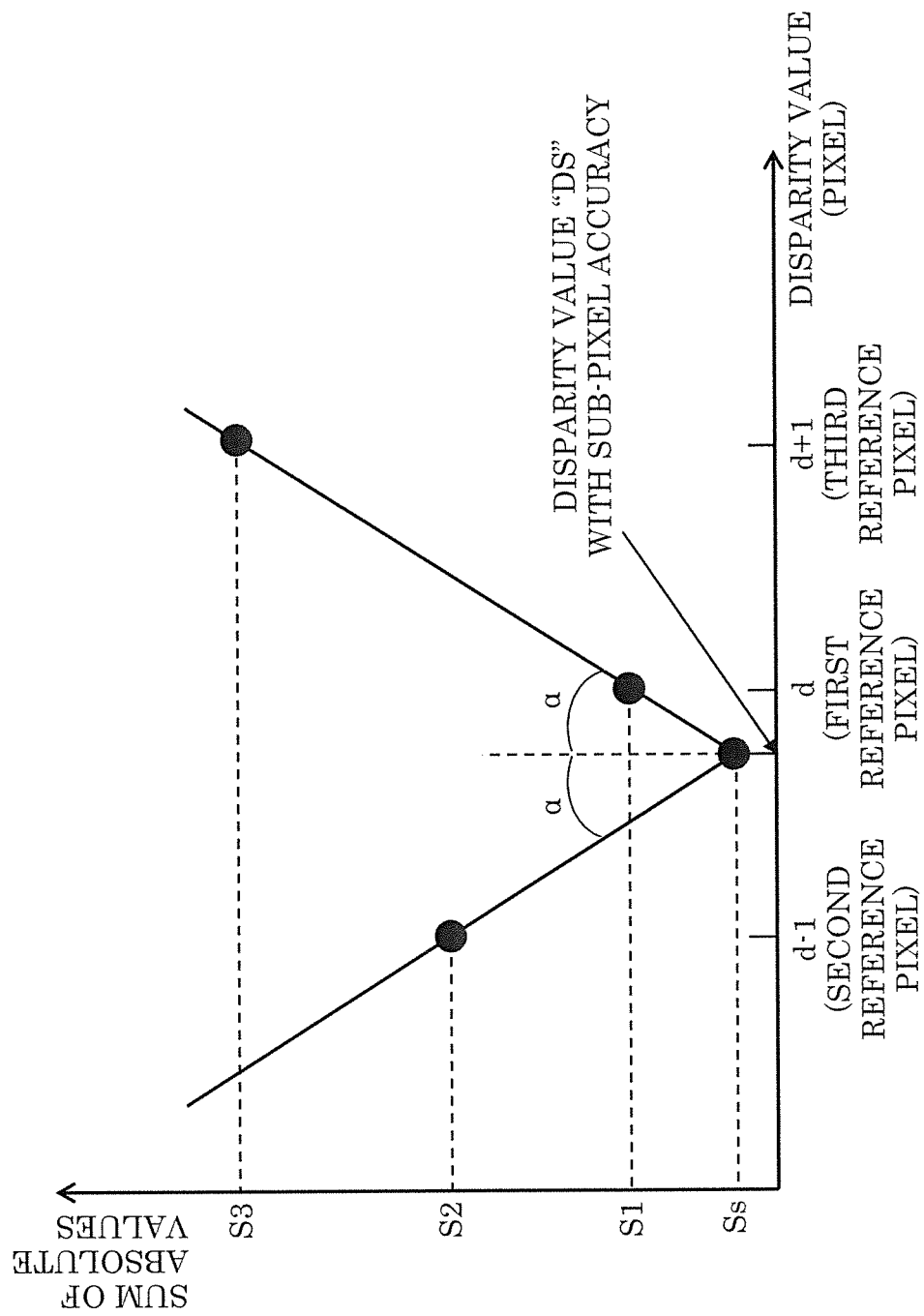
FIG. 23 shows an example in which a disparity value with sub-pixel accuracy is estimated by the equiangular fitting method.

Sub-pixel disparity estimator 104 calculates, as the sub-pixel evaluation value, the SAD, that is, the sum of the absolute values of the luminance differences, between pixels in the window regions in the base image and the reference image, and calculates the optimal value of the sub-pixel evaluation value by the equiangular fitting method based on the relationship between the sum of the absolute values and the disparity value. Sub-pixel disparity estimator 104 determines, as the disparity value of the pixel of interest of the base image with sub-pixel accuracy, the disparity value corresponding to the optimal value of the sub-pixel evaluation value. Specifically, sum S1 of the absolute values of differences between the pixel values, i.e., the luminance values, of the pixels in the window region for the pixel of interest and the luminance values of the pixels in the window region for the first reference pixel is calculated. The disparity value corresponding to sum S1 of the absolute values is d. Furthermore, sum S2 of the absolute values of differences between the luminance values of the pixels in the window region for the pixel of interest and the luminance values of the pixels in the window region for the second reference pixel is calculated. The disparity value corresponding to sum S2 of the absolute values is d−1. Furthermore, sum S3 of the absolute values of differences between the luminance values of the pixels in the window region for the pixel of interest and the luminance values of the pixels in the window region for the third reference pixel is calculated. The disparity value corresponding to sum S3 of the absolute values is d+1. As shown in FIG. 23, sub-pixel disparity estimator 104 estimates disparity value ds with sub-pixel accuracy corresponding to extremism Ss of the sum of absolute values by the equiangular fitting method on the basis of the relationship between sums S1, S2, and S3 of the absolute values and corresponding disparity values d−1, d, and d+1. In the equiangular fitting method in FIG. 23, the V-shaped function is applied. Sub-pixel disparity estimator 104 determines disparity value ds as the disparity value of the pixel of interest with sub-pixel accuracy. Note that FIG. 23 shows an example in which the disparity value with sub-pixel accuracy is estimated by the equiangular fitting method.

Figure 24:
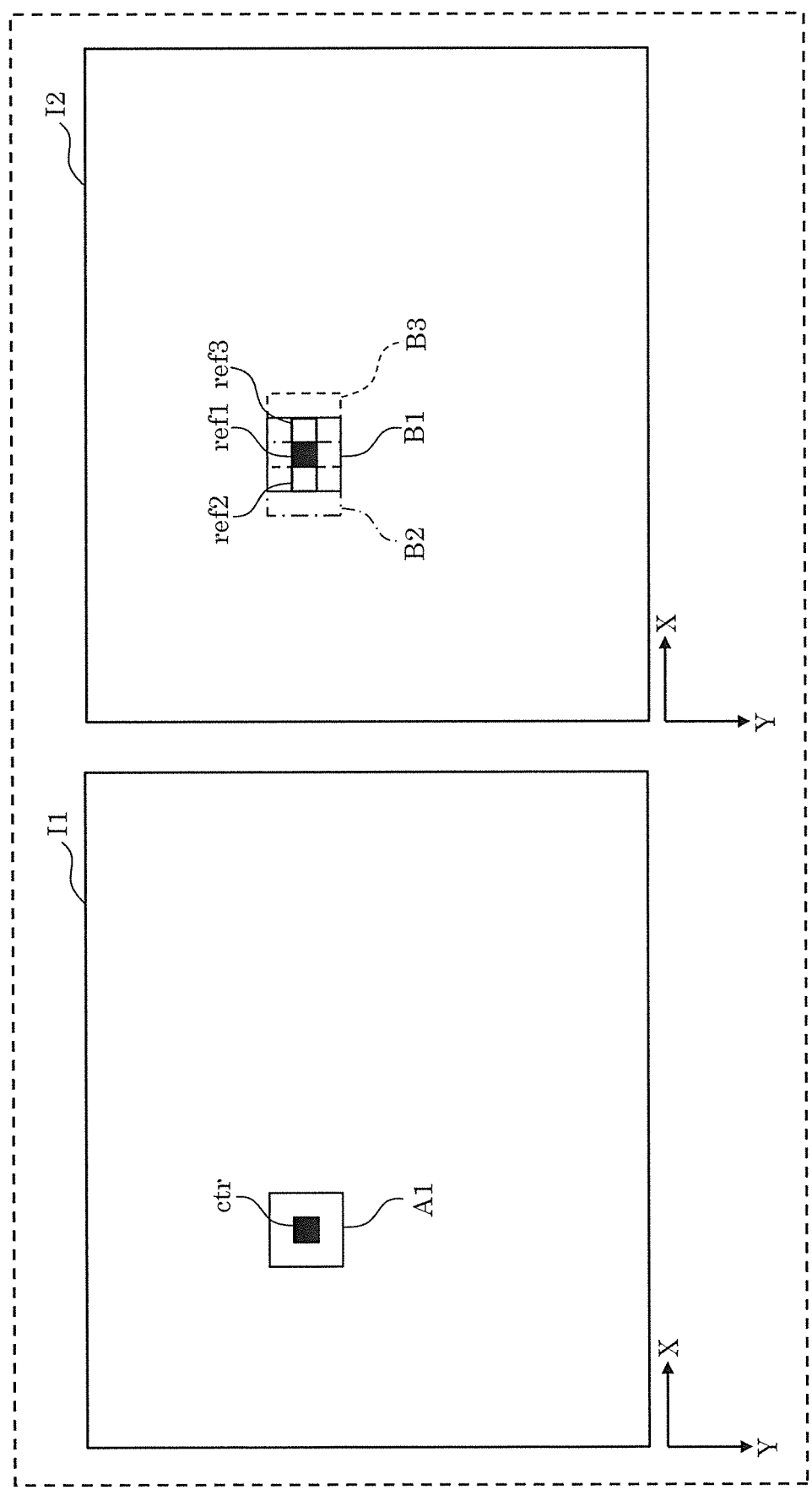
FIG. 24 shows an example of window regions for a pixel of interest, a first reference pixel, a second reference pixel, and a third reference pixel.
Figure 25:
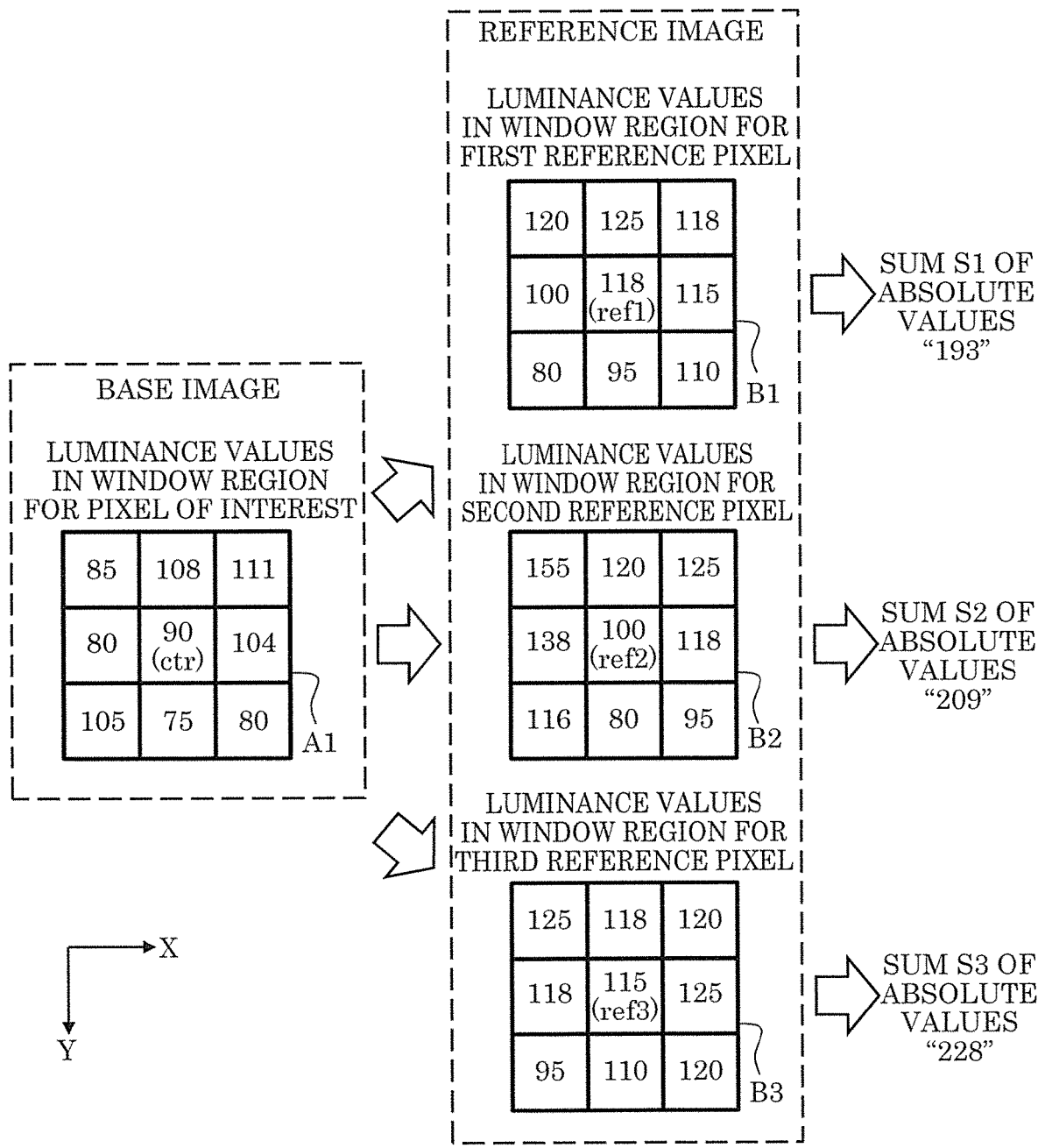
FIG. 25 shows an example of the relationship of luminance values of pixels in window regions between a pixel of interest and first to third reference pixels.

A specific example of estimation of the disparity value with sub-pixel accuracy will be described. For example, FIG. 24 shows an example of the window regions for the pixel of interest, the first reference pixel, the second reference pixel, and the third reference pixel. FIG. 25 shows an example of the relationship of luminance values of the pixels in the window regions between the pixel of interest and the first to third reference pixels. FIG. 24 and FIG. 25 show the case where the window region includes eight neighboring pixels. This means that the window region includes nine pixels. In the example of FIG. 24 and FIG. 25, sub-pixel disparity estimator 104 uses captured image I1 as the base image and captured image I2 as the reference image in the processing. Sub-pixel disparity estimator 104 obtains, from captured image I1, the luminance values of all the pixels in window region A1 for pixel of interest ctr in the base image. Furthermore, sub-pixel disparity estimator 104 obtains, from captured image I2, the luminance values of all the pixels in window region B1 for first reference pixel ref1 corresponding to disparity value d, the luminance values of all the pixels in window region B2 for second reference pixel ref2 corresponding to disparity value d−1, and the luminance values of all the pixels in window region B3 for third reference pixel ref3 corresponding to disparity value d+1 in the reference image.

Sub-pixel disparity estimator 104 calculates, for all the pixels in window regions A1 and B1, the absolute values of the differences between the luminance values of co-located pixels which are in the same position in the window regions. Specifically, nine absolute values are calculated. Furthermore, sub-pixel disparity estimator 104 calculates sum S1 of the absolute values which is the sum of the nine absolute values. For example, sub-pixel disparity estimator 104 calculates absolute value "35" of the differences between the luminance value of a pixel having luminance value "85" in window region A1 and the luminance value of a pixel having luminance value "120" in window region B1.

Likewise, sub-pixel disparity estimator 104 calculates the absolute value of a difference between the luminance values of the co-located pixels in window region A1 and window region B2, and calculates sum S2 of nine absolute values. Furthermore, sub-pixel disparity estimator 104 calculates the absolute value of a difference between the luminance values of the co-located pixels in window region A1 and window region B3, and calculates sum S3 of nine absolute values. Subsequently, as shown in FIG. 23, sub-pixel disparity estimator 104 determines, as the optimal value, extremum Ss of the sub-pixel evaluation value, and estimates disparity value ds corresponding to optimal value Ss by the equiangular fitting method. Sub-pixel disparity estimator 104 determines disparity value ds as the disparity value of pixel of interest ctr with sub-pixel accuracy.

Note that window regions A1, B1, B2, and B3 are disposed so that the pixel of interest, the first reference pixel, the second reference pixel, and the third reference pixel are each located at the center of the corresponding window region, but this is not limiting; window regions A1, B1, B2, and B3 may be disposed in any positions as long as the pixel of interest, the first reference pixel, the second reference pixel, and the third reference pixel are included therein. The number of neighboring pixels and the region of the neighboring pixels included in window regions A1, B1, B2, and B3 may be different from the number of neighboring pixels and the region of the neighboring pixels in the census transform.

Sub-pixel disparity estimator 104 may use, as the sub-pixel evaluation value, the SSD, that is, the sum of squares of luminance differences, instead of the SAD. Furthermore, sub-pixel disparity estimator 104 may estimate the disparity value of the pixel of interest with sub-pixel accuracy by the parabola fitting method using the SAD obtained for the pixel of interest, the first reference pixel, the second reference pixel, and the third reference pixel, and the disparity values thereof. Regarding the combination of the sub-pixel evaluation value and the method for estimating the disparity value with sub-pixel accuracy, in the case of the SAD, the equiangular fitting method makes errors in disparity estimation less than those with other combinations, and in the case of SSD, the parabola fitting method makes errors in disparity estimation less than those with other combinations, according to the disclosure of Masao Shimizu and Masatoshi Okutomi (December, 2002) "*Significance and Attributes of Sub-Pixel Estimation on Area-Based Matching*", the Institute of Electronics, Information and Communication Engineers of Japan, the Journal of the Institute of Electronics, Information and Communication Engineers of Japan (D-II, Vol. J85-D-II, No. 12, pp. 1791-1800).

Note that the present embodiment assumes the case where left and right cameras 11a and 11b are appropriately arranged. Specifically, the case is assumed where optical axis centers OAa and OAb of cameras 11a and 11b are perpendicular to the baseline BL direction, optical axis centers OAa and OAb are parallel to each other, the horizontal scanning direction and the baseline BL direction of cameras 11a and 11b are parallel, and cameras 11a and 11b exhibit no image distortion, as shown in FIG. 15. A co-located point in the reference image which corresponds to a point of interest in the base image exists on a horizontal line extending along the X-axis and having the same y-coordinate as that of the point of interest in the pixel coordinates. Capturing a stereo image by cameras 11a and 11b arranged as described above is called parallel imaging. In the case where camera 11a and 11b are arranged offset from the arrangement for parallel imaging or distortion in a captured image is of a magnitude that cannot be disregarded, distortion correction and an image parallelization process may be performed before image transformation, and thus the image may be corrected so that an image resulting from parallel imaging and having no distortion is obtained. Furthermore, in the case where cameras 11a and 11b are arranged vertically spaced apart as shown in FIG. 17, a co-located point in the reference image which corresponds to a point of interest in the base image exists in a vertical column extending along the Y-axis and having the same x-coordinate as that of the point of interest in the pixel coordinates.

Figure 26:
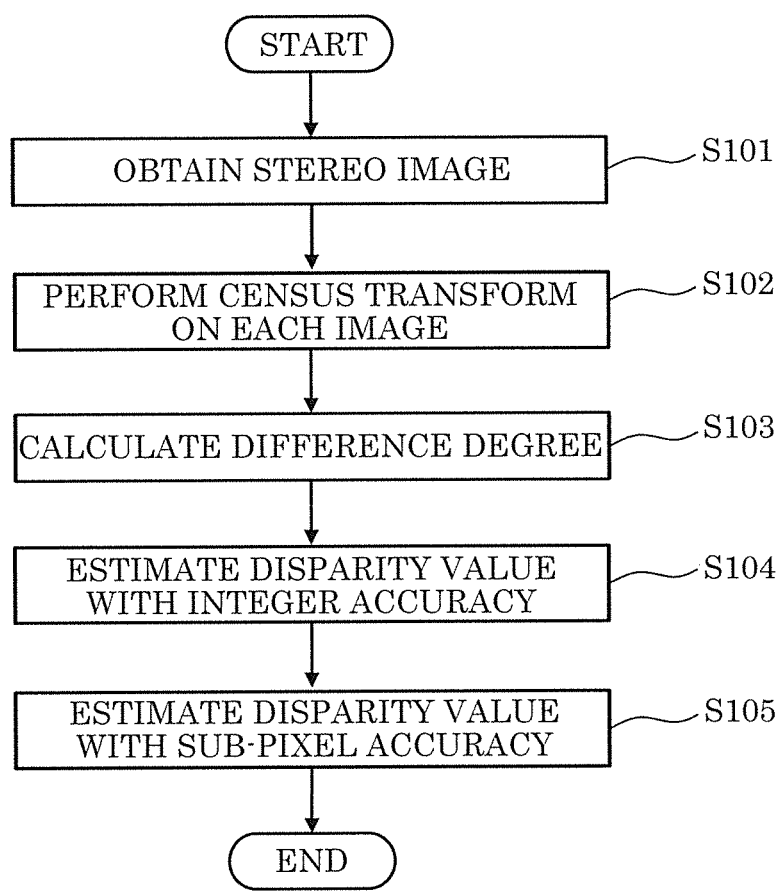
FIG. 26 is a flowchart showing an example of operations of a disparity estimation device according to Embodiment 1.

Furthermore, operations of disparity estimation device 100 according to Embodiment 1 will be described. FIG. 26 is a flowchart showing an example of operations of disparity estimation device 100 according to Embodiment 1. First, in Step S101, census transformer 101 obtains, from storage 20, images I1 and I2 respectively captured by cameras 11a and 11b. Captured images I1 and I2 are images in which the same subject appear and which are captured by cameras 11a and 11b at the same point in time. Specifically, captured images I1 and I2 are stereo images.

Next, in Step S102, census transformer 101 performs the census transform on each of captured images I1 and I2. Census transformer 101 performs the census transform on all the pixels of each of captured images I1 and I2, calculates the census feature amount of each pixel, and outputs the census feature amount to difference degree calculator 102. The census feature amount is a bit sequence corresponding to neighboring pixels of the pixel of interest subject to the census transform as shown in FIG. 18A, FIG. 18B, FIG. 19A, and FIG. 19B, for example, and is also called a "census vector".

Next, in Step S103, difference degree calculator 102 calculates the difference degree of each pixel of one of captured images I1 and I2 which serves as the base image with respect to the other of captured images I1 and I2 which serves as the reference image, and outputs the calculated difference degree to disparity selector 103. In the present embodiment, difference degree calculator 102 determines, as the base image, image I1 captured by camera 11a located on the left side as shown in FIG. 15, and determines captured image I2 as the reference image, but this is not limiting. The base image and the reference image may be determined in accordance with a predetermined rule or may be determined in accordance with an instruction from a user via an input device not shown in the drawings. Different degree calculator 102 calculates, for the pixel of interest of base image I1, the difference degree of the census feature amount between the pixel of interest and each of the reference pixels in the search range in reference image I2 such as that shown in FIG. 20 which corresponds to the pixel of interest, for example. Difference degree calculator 102 calculates the difference degree of every pixel of base image I1 by using the pixel as the pixel of interest. In the present embodiment, the difference degree is the Hamming distance between the census feature amounts of the pixel of interest and the reference pixel. For example, when the number of reference pixels included in the search range is k+1, k+1 difference degrees are calculated for a single pixel of interest.

Next, in Step S104, disparity selector 103 determines, for each pixel of base image I1, the disparity value of the pixel with integer accuracy on the basis of the calculated difference degree, and outputs the disparity value to sub-pixel disparity estimator 104. Disparity selector 103 extracts the minimum difference degree from the difference degrees corresponding to the pixel of interest of base image I1, and specifies the disparity value of the reference pixel and the pixel of interest which corresponds to the minimum difference degree, as shown in FIG. 22, for example. The difference degree can be calculated from the position of the reference pixel with respect to co-located pixel I2$p_m$ in reference image I2 which corresponds to pixel of interest I1$p$, as shown in FIG. 20, for example. Disparity selector 103 determines the disparity value of every pixel of base image I1 with integer accuracy by sequentially scanning all the pixels of base image I1 as the pixel of interest.

Next, in Step S105, sub-pixel disparity estimator 104 estimates the disparity value with sub-pixel accuracy for each pixel of the base image which is one of captured images I1 and I2. Specifically, sub-pixel disparity estimator 104 obtains captured images I1 and I2 from storage 20, and estimates, by using captured images I1 and I2 and the disparity value of each pixel of captured image I1, i.e., the base image, with integer accuracy, the disparity value of each pixel of the base image with sub-pixel accuracy. Sub-pixel disparity estimator 104 sets, for the pixel of interest of the base image, a window region around the pixel of interest. Furthermore, sub-pixel disparity estimator 104 sets a window region for each of the first reference pixel of the reference image which is in the position corresponding to the disparity value of the pixel of interest, and the second reference pixel and the third reference pixel of the reference image which have disparity values near the disparity value of the first reference pixel. Sub-pixel disparity estimator 104 calculates the sum of the absolute values of luminance differences which is the sub-pixel evaluation value based on the luminance differences between all the pixels within the window region for the pixel of interest and all the pixels within the window region for each of the first to third reference pixels. Sub-pixel disparity estimator 104 estimates the disparity value of the pixel of interest with sub-pixel accuracy by the equiangular fitting method on the basis of the relationship between three sums of the absolute values and the disparity values corresponding to the respective sums of the absolute values. Sub-pixel disparity estimator 104 estimates, by using each pixel of the base image as the pixel of interest, the disparity value of the pixel with sub-pixel accuracy. Subsequently, sub-pixel disparity estimator 104 generates a disparity image resulting from replacing the pixel value of each pixel of the base image that includes the luminance value by the disparity value with sub-pixel accuracy.

Note that when left and right cameras 11a and 11b are not appropriately arranged, the image distortion correction, the image parallelization process, and the like may be performed before Step S102. Furthermore, at this time, the initial disparity value in the initial disparity image may be set to a value other than 0 in consideration of the movement of the image centers (the positions, in the image, of optical axis centers OAa and OAb shown in FIG. 15 and FIG. 17) along with the parallelization.

As described above, disparity estimation device 100 according to Embodiment 1 obtains, from storage 20, image I1 captured by camera 11a and image I2 captured by camera 11b. Disparity estimation device 100 calculates the first census feature amount of each of the plurality of first pixels of captured image I1, calculates the second census feature amount of each of the plurality of second pixels of captured image I2, and calculates, for each of the plurality of first pixels, by using the first census feature amount and the second census feature amount of at least one of the second pixels, a difference degree corresponding to the disparity value in the position of the second pixel with respect to the first pixel. Disparity estimation device 100 selects, for each of the plurality of first pixels, the disparity degree corresponding to the lowest difference degree, by using the difference degrees, and thus obtains the first disparity value of the first pixel of captured image I1 with integer pixel accuracy. Furthermore, for each of the plurality of first pixels, disparity estimation device 100 extracts, from captured image I2, a plurality of reference pixels located in positions corresponding to the first disparity value of the first pixel and a near disparity value close to the first disparity value. Disparity estimation device 100 calculates the sub-pixel evaluation value based on the relationship between the pixel values of the first pixel and neighboring pixels thereof and the pixel values of each of the reference pixels and neighboring pixels thereof, and estimates the second disparity value of the first pixel with sub-pixel accuracy by the equiangular fitting in which the sub-pixel evaluation value is used. Subsequently, disparity estimation device 100 obtains the disparity value of each pixel of the disparity image for captured image I1 with respect to captured image I2 using the second disparity value of each of the plurality of first pixels.

With the above-described configuration, disparity estimation device 100 estimates the disparity value of each pixel of captured image I1 serving as the base image using captured images I1 and I2 on the basis of the census feature amounts and the difference degree. Furthermore, disparity estimation device 100 estimates the disparity value of the pixel of interest with sub-pixel accuracy using the sub-pixel evaluation value based on the relationship of pixel values between the pixel of interest which is the first pixel of captured image I1 and the plurality of reference pixels of captured image I1 serving as a reference image, where neighboring pixels of each of the pixel of interest and the plurality of reference pixels are included. Such a disparity value reflects the distribution of the luminance values around the pixel of interest of captured image I1 and the distribution of the luminance values around the reference pixel of captured image I2. For example, even when there is a luminance difference between captured images I1 and I2, it is possible to obtain a disparity value less affected by the luminance difference. Furthermore, the disparity image composed of such disparity values can be kept from streak artifacts that are generated due to the disparity values being different across lines such as edges and boundaries of a subject. Thus, disparity estimation device 100 is capable of estimating the disparity value between the plurality of images with a high level of accuracy. Note that the same applies in the case where captured image I2 serves as the base image.

Embodiment 2

With disparity estimation device 100 according to Embodiment 1, the accuracy in estimating the disparity value with sub-pixel accuracy increases as the difference between the luminance values of corresponding pixels of images I1 and I2 captured by cameras 11a and 11b decreases. Disparity estimation device 200 according to Embodiment 2 further includes an element that reduces the differences between the luminance values of corresponding pixels of images I1 and I2 captured by cameras 11a and 11b. In Embodiment 2, structural elements that are substantially the same as those in Embodiment 1 will be given the same reference numerals as those in Embodiment 1, and description thereof will be omitted. The following description will focus on differences from Embodiment 1 while omitting details that are substantially the same as those in Embodiment 1.

Figure 27:
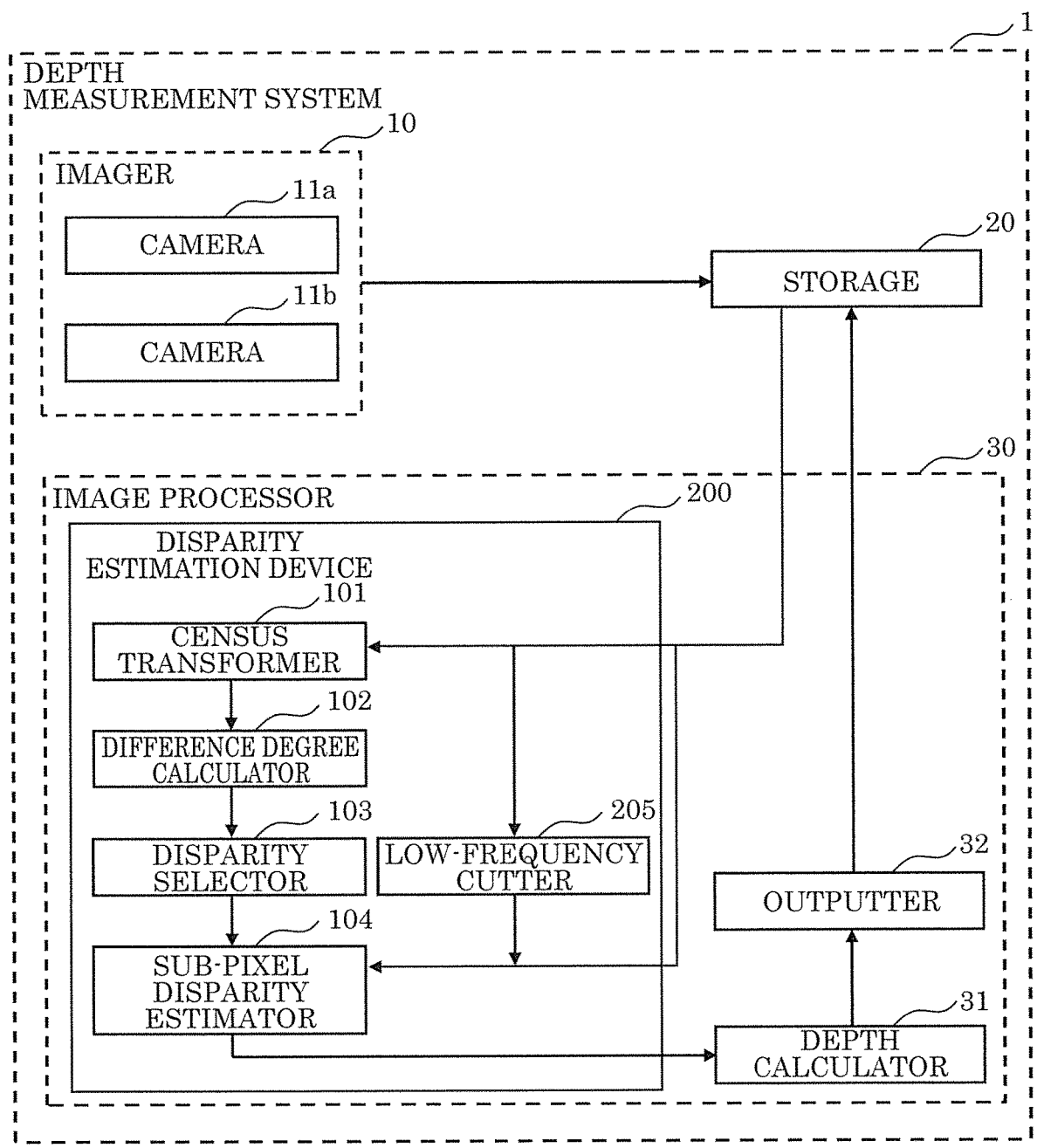
FIG. 27 is a block diagram showing an example of a functional configuration of a disparity estimation device according to Embodiment 2.

FIG. 27 is a block diagram showing an example of a functional configuration of disparity estimation device 200 according to Embodiment 2. As shown in FIG. 27, disparity estimation device 200 includes census transformer 101, difference degree calculator 102, disparity selector 103, sub-pixel disparity estimator 104, and low-frequency cutter 205.

Low-frequency cutter 205 constitutes a low-frequency cutoff filter for images and removes or reduces low-frequency components of an image. Low-frequency cutter 205 outputs an image in which the edge, boundary, etc., of a subject are emphasized. Low-frequency cutter 205 transforms the captured image obtained from storage 20 and outputs the transformed image to sub-pixel disparity estimator 104. Sub-pixel disparity estimator 104 estimates the disparity value with sub-pixel accuracy based on the sub-pixel evaluation value using the transformed image obtained from low-frequency cutter 205. As a result of using the transformed image obtained from low-frequency cuter 205, sub-pixel disparity estimator 104 can estimate the disparity value with sub-pixel accuracy which is less affected by the difference in luminance between images I1 and I2 captured by cameras 11a and 11b that is due to vignetting, the difference in gain characteristics between the left and right cameras, or the like. Furthermore, low-frequency cutter 205 may output the transformed image to census transformer 101, and census transformer 101 may perform the census transform on the transformed image obtained from low-frequency cutter 205 and output the resultant image to difference degree calculator 102. Even in this case, the disparity value with sub-pixel accuracy estimated by sub-pixel disparity estimator 104 can produce advantageous effects that are the same as or similar to those described above.

With disparity estimation device 200 according to Embodiment 2 described above, it is possible to obtain advantageous effects that are the same as or similar to those produced in Embodiment 1. Furthermore, disparity estimation device 200 can estimate the disparity value with sub-pixel accuracy which is less affected by the difference between the luminance values of corresponding pixels of the captured images.

Embodiment 3

Disparity estimation device 100 according to Embodiment 1 determines one of images I1 and I2 captured by cameras 11a and 11b as the base image and the other as the reference image, and estimates the disparity values of the pixels of the base image. Disparity estimation device 300 according to Embodiment 3 determines each of captured images I1 and I2 as the base image, and compares disparity values in the base images to check the consistency of the disparity values. Specifically, disparity estimation device 300 according to Embodiment 3 estimates bidirectional disparity values and checks the consistency by comparing the estimation results of disparity values in order to improve the reliability of estimation results of disparity values, thus improving the accuracy in estimating a disparity value. In Embodiment 3, structural elements that are substantially the same as those in Embodiment 1 or 2 will be given the same reference numerals as those in Embodiment 1 or 2, and description thereof will be omitted. The following description will focus on differences from Embodiments 1 and 2 while omitting details that are substantially the same as those in Embodiment 1 or 2.

Figure 28:
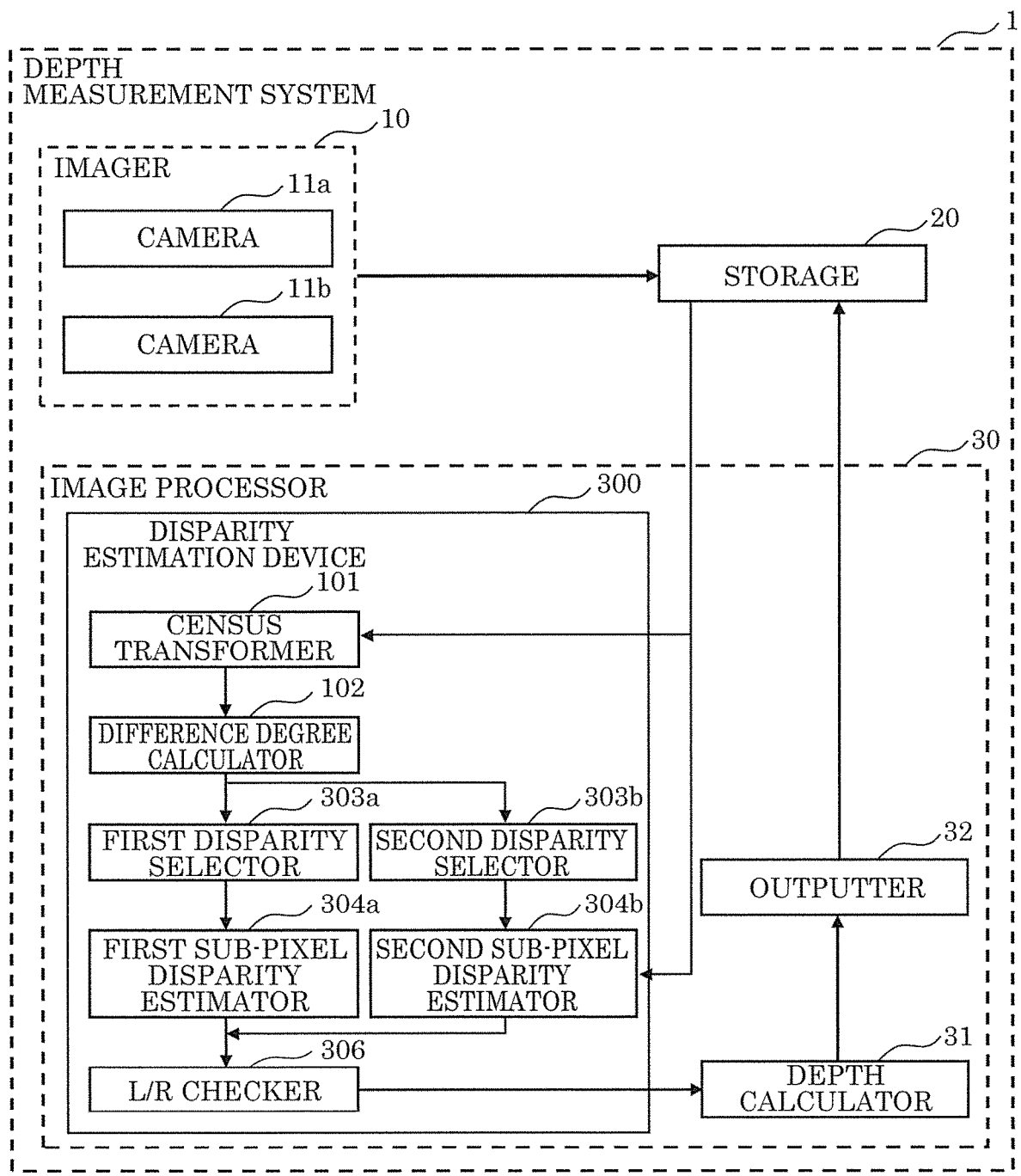
FIG. 28 is a block diagram showing an example of a functional configuration of a disparity estimation device according to Embodiment 3.

FIG. 28 is a block diagram showing an example of a functional configuration of disparity estimation device 300 according to Embodiment 3. As shown in FIG. 28, disparity estimation device 300 includes census transformer 101, difference degree calculator 102, first disparity selector 303a, second difference selector 303b, first sub-pixel disparity estimator 304a, second sub-pixel disparity estimator 304b, and L/R checker (also referred to as a "left-right checker") 306.

Difference degree calculator 102 sets each of images I1 and I2 captured by cameras 11a and 11b as the base image, and calculates the difference degree of each pixel of the base image. Specifically, difference degree calculator 102 calculates the difference degree of the census feature amount for each pixel of captured image I1 which is the first base image with respect to each of the pixels within the search range, that is, each disparity value within the search range, in captured image I2 which is the first reference image. Likewise, difference degree calculator 102 calculates the difference degree of the census feature amount for each pixel of captured image I2 which is the second base image with respect to each of the pixels within the search range within the search range in captured image I1 which is the second reference image.

First disparity selector 303a extracts the minimum difference degree among the difference degrees calculated for each pixel of captured image I1, and specifies, as the disparity value of the pixel of captured image I1 with integer accuracy, the disparity value of a pixel of captured image I2 resulting in the minimum difference degree. First disparity selector 303a estimates the disparity value of each pixel of captured image I1 with integer accuracy as the disparity value of each pixel of the first base image with integer accuracy.

Second disparity selector 303b extracts the minimum difference degree among the difference degrees calculated for each pixel of captured image I2, and specifies, as the disparity value of the pixel of captured image I2 with integer accuracy, the disparity value of a pixel of captured image I1 resulting in the minimum difference degree. Second disparity selector 303b estimates the disparity value of each pixel of captured image I2 with integer accuracy as the disparity value of each pixel of the second base image with integer accuracy.

As with sub-pixel disparity estimator 104 according to Embodiment 1, first sub-pixel disparity estimator 304a calculates, by using each pixel of captured image I1 which is the first base image, the sum of the absolute values of luminance differences which is the sub-pixel evaluation value between all the pixels within the window region for the pixel of interest and all the pixels within the window region for each of the first to third reference pixels of captured image I2 which corresponds to the pixel of interest. First sub-pixel disparity estimator 304a estimates the disparity value of the pixel of interest with sub-pixel accuracy by the equiangular fitting method on the basis of the relationship between three sums of the absolute values and the disparity values corresponding to the respective sums of the absolute values. First sub-pixel disparity estimator 304a estimates the disparity values of all the pixels of captured image I1 with sub-pixel accuracy, and generates the disparity image for captured image I1 with sub-pixel accuracy.

As with sub-pixel disparity estimator 104 according to Embodiment 1, second sub-pixel disparity estimator 304b calculates, by using each pixel of captured image I2 which is the second base image, the sum of the absolute values of luminance differences which is the sub-pixel evaluation value between all the pixels within the window region for the pixel of interest and all the pixels within the window region for each of the first to third reference pixels of captured image I1 which corresponds to the pixel of interest. Second sub-pixel disparity estimator 304b estimates the disparity value of the pixel of interest with sub-pixel accuracy by the equiangular fitting method on the basis of the relationship between three sums of the absolute values and the disparity values corresponding to the respective sums of the absolute values. Second sub-pixel disparity estimator 304b estimates the disparity values of all the pixels of captured image I2 with sub-pixel accuracy, and generates the disparity image for captured image I2 with sub-pixel accuracy.

L/R checker 306 checks the consistency between the disparity image for the first base image and the disparity image for the second base image. Specifically, L/R checker 306 checks the consistency between the disparity image for captured image I1 and the disparity image for captured image I2. L/R checker 306 uses Expression 2 below for the consistency check.

[Math. 2]

$$|x-(x+d_1(x,y)+d_2(x+d_1(x,y),y))| \quad \text{(Expression 2)}$$

In Expression 2 above, d1 is the disparity value of the pixel of interest of captured image I1 with sub-pixel accuracy, x represents the x-coordinate of a pixel of captured image I1, (x, y) is the pixel coordinates of the pixel of interest, x+d1(x, y) represents the x-coordinate of a disparity corresponding pixel which is a pixel of captured image I2 located in a position corresponding to disparity value d1 of the pixel of interest of captured image I1; d2 is the disparity value of the aforementioned disparity corresponding pixel of captured image I2 with sub-pixel accuracy, and x+d1(x, y)+d2(x+d1(x, y), y) represents the x-coordinate of a pixel of captured image I1 located in a position corresponding to disparity value d2 of the aforementioned disparity corresponding pixel of captured image I2. Such Expression 2 represents the difference between the disparity value based on captured image I1 and the disparity value based on captured image I2. When the value of Expression 2 above is less than or equal to a predetermined threshold value, it is possible to deduce that the reliability of the disparity value of the pixel of interest of captured image I1 is high, and there is consistency between the disparity value based on captured image I2 and the disparity value based on captured image I2. When the value of Expression 2 above is greater than the predetermined threshold value, it is possible to deduce that the reliability of the disparity value of the pixel of interest of captured image I1 is low, and the aforementioned consistency is lacking. The aforementioned threshold value is predetermined in accordance with the degree of required consistency. As an example, the aforementioned threshold value is a single pixel.

When the value of Expression 2 above is less than or equal to the predetermined threshold value, L/R checker 306 determines disparity value d1 as the disparity value of the pixel of interest of captured image I1, and outputs disparity value d1 without change. On the other hand, when the value of Expression 2 above is greater than the predetermined threshold value, L/R checker 306 changes the disparity value of the pixel of interest of captured image I1 into a specific value other than the disparity values included in the search range, for example, and outputs the specific value. This specific value indicates that there is no consistency between the disparity values. For example, as shown in FIG. 20, when the search range is between the 0 pixel and the −k pixel, the aforementioned specific value is smaller than −k pixel. As described above, L/R checker 306 generates a new disparity image by maintaining or changing the disparity value of each pixel of the disparity image for captured image I1 according to the presence or absence of consistency. In the new disparity image, a pixel having a consistent disparity value has, as the pixel value thereof, the estimated disparity value with sub-pixel accuracy, and a pixel lacking a consistent disparity value has, as the pixel value thereof, an exception value indicating low consistency, that is, low reliability.

Figure 29:
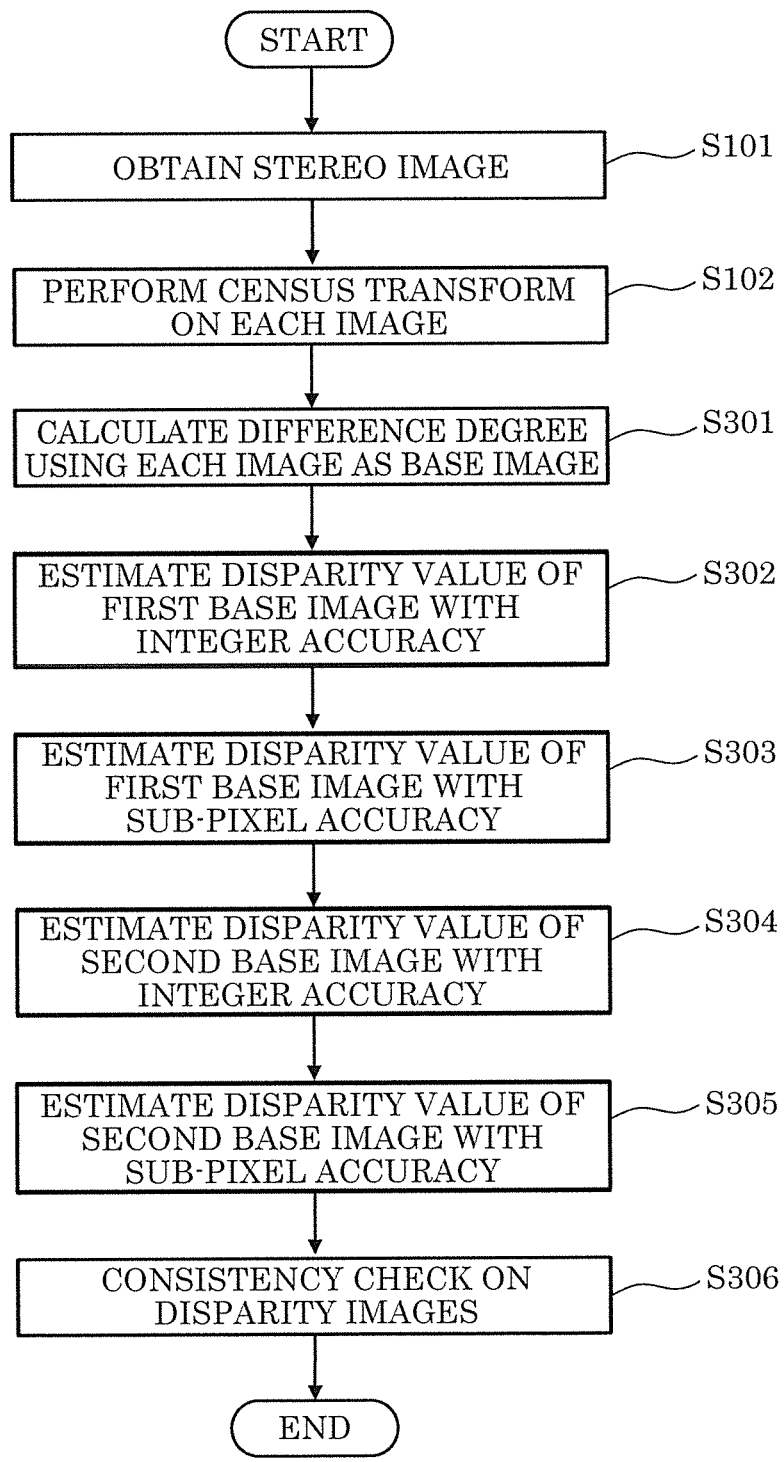
FIG. 29 is a flowchart showing an example of operations of a disparity estimation device according to Embodiment 3.

With reference to FIG. 29, operations of disparity estimation device 300 will be described. FIG. 29 is a flowchart showing an example of operations of disparity estimation device 300 according to Embodiment 3. Disparity estimation device 300 performs the processes in Steps S101 and S102 as in Embodiment 1.

Next, in Step S301, difference degree calculator 102 sets captured image I1 as the first base image, and calculates the difference degree of each pixel of captured image I1 with respect to captured image I2 which is the first reference image. Furthermore, difference degree calculator 102 sets captured image I2 as the second base image, and calculates the difference degree of each pixel of captured image I2 with respect to captured image I1 which is the second reference image.

Next, in Step S302, first disparity selector 303a determines, on the basis of the calculated difference degree, the disparity value of each pixel of captured image I1 which is the first base image.

Next, in Step S303, first sub-pixel disparity estimator 304a calculates the sum of the absolute values of luminance differences which is the sub-pixel evaluation value between all the pixels within the window region for the pixel of interest of captured image I1 and all the pixels within the window region for each of the first to third reference pixels of captured image I2 which corresponds to the pixel of interest. First sub-pixel disparity estimator 304a estimates the disparity value of the pixel of interest with sub-pixel accuracy by the equiangular fitting method in which the sum of absolute values is used. First sub-pixel disparity estimator 304a estimates the disparity value with sub-pixel accuracy by using each pixel of captured image I1 as the pixel of interest, and generates the disparity image including the estimated disparity value as the pixel value.

Next, in Step S304, second disparity selector 303b determines, on the basis of the calculated difference degree, the disparity value of each pixel of captured image I2 which is the second base image.

Next, in Step S305, second sub-pixel disparity estimator 304b calculates the sum of the absolute values of luminance differences between all the pixels within the window region for the pixel of interest of captured image I2 and all the pixels within the window region for each of the first to third reference pixels of captured image I1, and estimates the disparity value of the pixel of interest with sub-pixel accuracy by the equiangular fitting method in which the sum of absolute values is used. Second sub-pixel disparity estimator 304b estimates the disparity value with sub-pixel accuracy by using each pixel of captured image I2 as the pixel of interest, and generates the disparity image including the estimated disparity value as the pixel value. Note that the order of Steps S302 to S305 is not limited to the above-described order and may be changed.

Next, in Step S306, L/R checker 306 checks, for each pixel of the disparity image for captured image I1, the consistency of disparity values between the disparity image for captured image I1 and the disparity image for captured image I2. L/R checker 306 maintains the disparity value of each pixel of the disparity image for captured image I1 when there is consistency, and changes the disparity value of each pixel of the disparity image for captured image I1 into an exceptional disparity value when there is no consistency, and generates and outputs a new disparity image.

With disparity estimation device 300 according to Embodiment 3 described above, it is possible to obtain advantageous effects that are the same as or similar to those produced in Embodiment 1. Furthermore, using image I1 captured by camera 11a as the base image and image I2 captured by camera 11b as the reference image, disparity estimation device 300 estimates the disparity value of each pixel of captured image I1. Moreover, using captured image I2 as the base image and captured image I1 as the reference image, disparity estimation device 300 estimates the disparity value of each pixel of captured image I2. Disparity estimation device 300 determines the consistency of disparity values on the basis of the difference between the disparity value based on captured image I1 and the disparity value based on captured image I2, applies a consistent disparity value to a pixel, replaces an inconsistent disparity value with a value indicating low consistency, and applies the values to a pixel. Subsequently, disparity estimation device 300 generates a disparity image in which the presence or absence of the consistency of each pixel between the disparity values is easy to determine. Thus, disparity estimation device 300 is capable of estimating the disparity value between the plurality of images with a high level of accuracy and reliability.

In the present embodiment, L/R checker 306 generates a new disparity image by changing the disparity value of each pixel of the disparity image for captured image I1 according to the presence or absence of the consistency of disparity values between the disparity image for captured image I1 and the disparity image for captured image I2, but this is not limiting. L/R checker 306 may generate a new disparity image by changing the disparity value of each pixel of the disparity image for captured image I2 according to the presence or absence of the aforementioned consistency.

Alternatively, L/R checker 306 may determine, for each pixel of the disparity image for captured image I1, the presence or absence of the consistency of disparity values between the disparity image for captured image I1 and the disparity image for captured image I2, and may determine, for each pixel of the disparity image for captured image I2, the presence or absence of the consistency of disparity values between the disparity image for captured image I1 and the disparity image for captured image I2. Furthermore, L/R checker 306 may determine the presence or absence of the consistency of disparity values between two corresponding pixels of the disparity image for captured image I1 and the disparity image for captured image I2. In this case, when both of the corresponding two pixels have the consistency of disparity values, L/R checker 306 uses the disparity value of each of the pixels without change, and when neither of the corresponding two pixels has the consistency of disparity values, L/R checker 306 changes the disparity value of each of the pixels into the aforementioned specific value. Furthermore, when one of the corresponding two pixels has the consistency of disparity values and the other does not have the consistency of disparity values, L/R checker 306 may use the disparity value of the pixel having the consistency as the disparity value of each of the pixels or may use the aforementioned specific value as the disparity value of each of the pixels.

Embodiment 4

Disparity estimation device 400 according to Embodiment 4 will be described. Compared to disparity estimation device 300 according to Embodiment 3, disparity estimation device 400 according to Embodiment 4 further performs processes of scaling an image down and scaling an image up. In Embodiment 4, structural elements that are substantially the same as those in Embodiments 1 to 3 will be given the same reference numerals as those in Embodiments 1 to 3, and description thereof will be omitted. The following description will focus on differences from Embodiments 1 to 3 while omitting details that are substantially the same as those in Embodiments 1 to 3.

Figure 30:
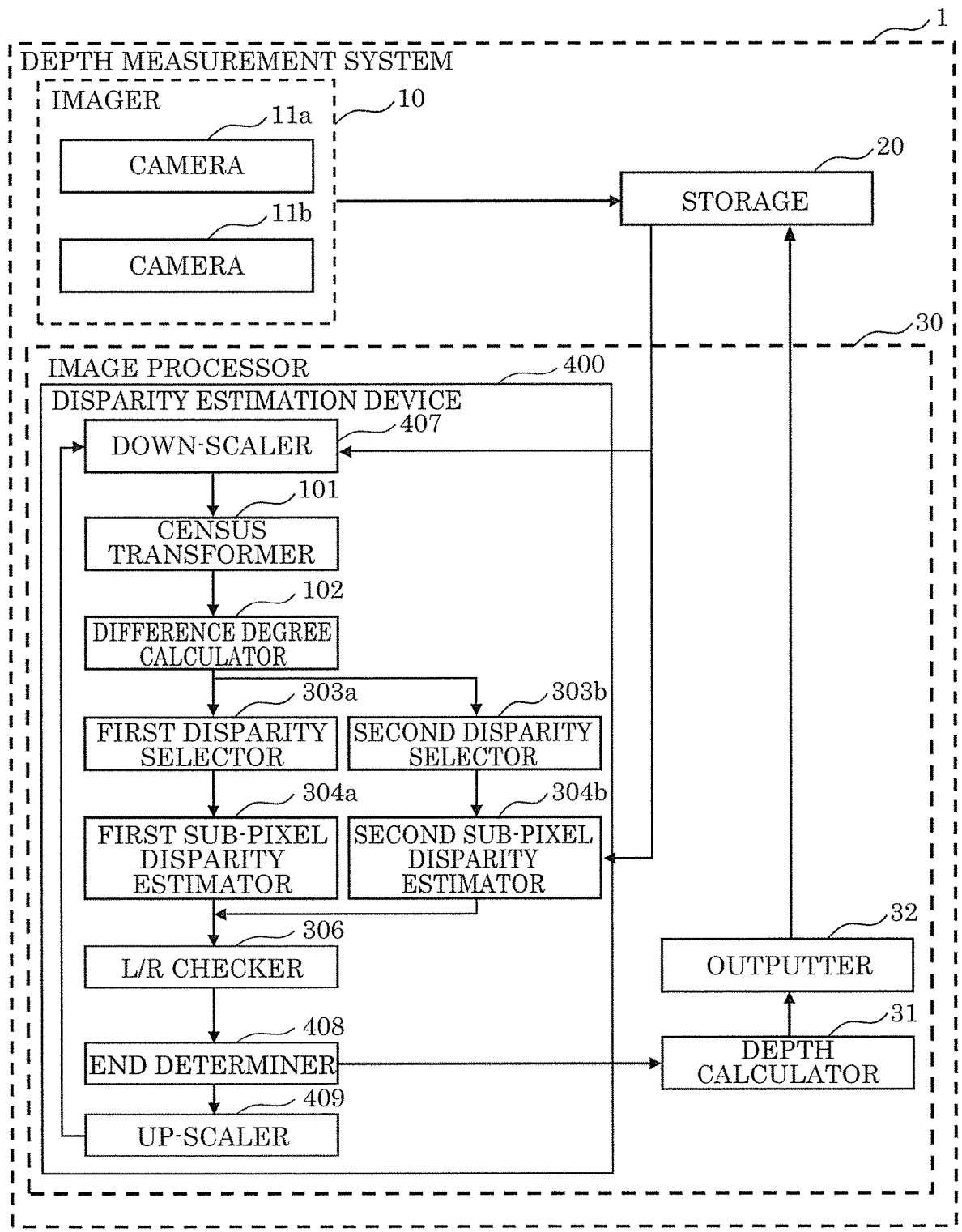
FIG. 30 is a block diagram showing an example of a functional configuration of a disparity estimation device according to Embodiment 4.

FIG. 30 is a block diagram showing an example of a functional configuration of disparity estimation device 400 according to Embodiment 4. As shown in FIG. 30, disparity estimation device 400 includes down-scaler 407, census transformer 101, difference degree calculator 102, first disparity selector 303a, second disparity selector 303b, first sub-pixel disparity estimator 304a, second sub-pixel disparity estimator 304b, L/R checker 306, end determiner 408, and up-scaler 409.

Down-scaler 407 scales down images I1 and I2 captured by cameras 11a and 11b with a predetermined scale-down factor, and outputs the scaled-down images to census transformer 101, first sub-pixel disparity estimator 304a, and second sub-pixel disparity estimator 304b. Down-scaler 407 obtains an initial disparity image from storage 20 or obtains a disparity image from up-scaler 409, scales down the disparity image with the predetermined scale-down factor, and outputs the scaled-down image to difference degree calculator 102.

Down-scaler 407 performs a normal isotropic down-scaling process on captured images I1 and I2, meaning that down-scaler 407 performs the same down-scaling process on captured images I1 and I2 along the X-axis and the Y-axis which are the horizontal direction and the vertical direction, respectively. For example, when the scale-down factor is a half, each of captured images I1 and I2 is converted by interpolative down-scaling into an image having pixels reduced in number by one-half along the X-axis and the Y-axis. More than one interpolative down-scaling method has been known, but, in the present embodiment, bilinear interpolation may be performed rather than bicubic interpolation, which is known for high quality of a reconstructed image. This is because an overshoot component superimposed by the bicubic interpolation may cause error in calculating a difference degree using the census feature amount.

Down-scaler 407 reduces the disparity value, which is the pixel value, of the disparity image according to the scale-down factor (which is also referred to as "gain down") in addition to a normal down-scaling process. This is because, for example, when the width of the disparity image is horizontally reduced by one-half with a scale-down factor of ½, the disparity value of each pixel accordingly becomes half compared to that of the disparity image that has not yet been scaled down.

The down-scaling process by down-scaler 407 is performed more than one time according to the number of times a repeating process to be described later is performed. For example, when the number of the repeating process is three, an example of the scale-down factor is a scale-down factor of ¼ for the first round, a scale-down factor of ½ for the second round, and an equal scale-down factor (that is, output of the input signal without change) for the third round. Down-scaler 407 scales down the initial disparity image in the first round of the repeating process and scales down the disparity image obtained from up-scaler 409 in the second and following rounds of the repeating process. In the initial disparity image, the disparity value, which is the pixel value, of every pixel is zero.

End determiner 408 determines, on the basis of the scale-down factor used by down-scaler 407 for calculating the disparity image, whether to continue or end the estimation of the disparity value. When the aforementioned scale-down factor is less than 1, that is, less than an equal scale, end determiner 408 determines that the estimation of the disparity value is to be continued, and when the aforementioned scale-down factor is an equal scale, determines that the estimation of the disparity value is to be ended, and outputs the above-described disparity image.

Up-scaler 409 performs an up-scaling process on the disparity image generated by L/R checker 306 with an up-scale factor corresponding to the scale-down factor used by down-scaler 407, and outputs the resultant disparity image to down-scaler 407. Up-scaler 409 magnifies the disparity value, which is the pixel value, according to the scale-up factor in addition to a normal up-scaling process. For example, when the scale-down factor is ½, up-scaler 409 performs, on the disparity image, a normal interpolative up-scaling process and a process of magnifying the disparity value of each pixel with a scale-up factor of 2. The disparity image is converted by interpolative up-scaling into an image having pixels doubled in number along the X-axis and the Y-axis. In the present embodiment, bilinear interpolation is used as the interpolative up-scaling method.

Figure 31:
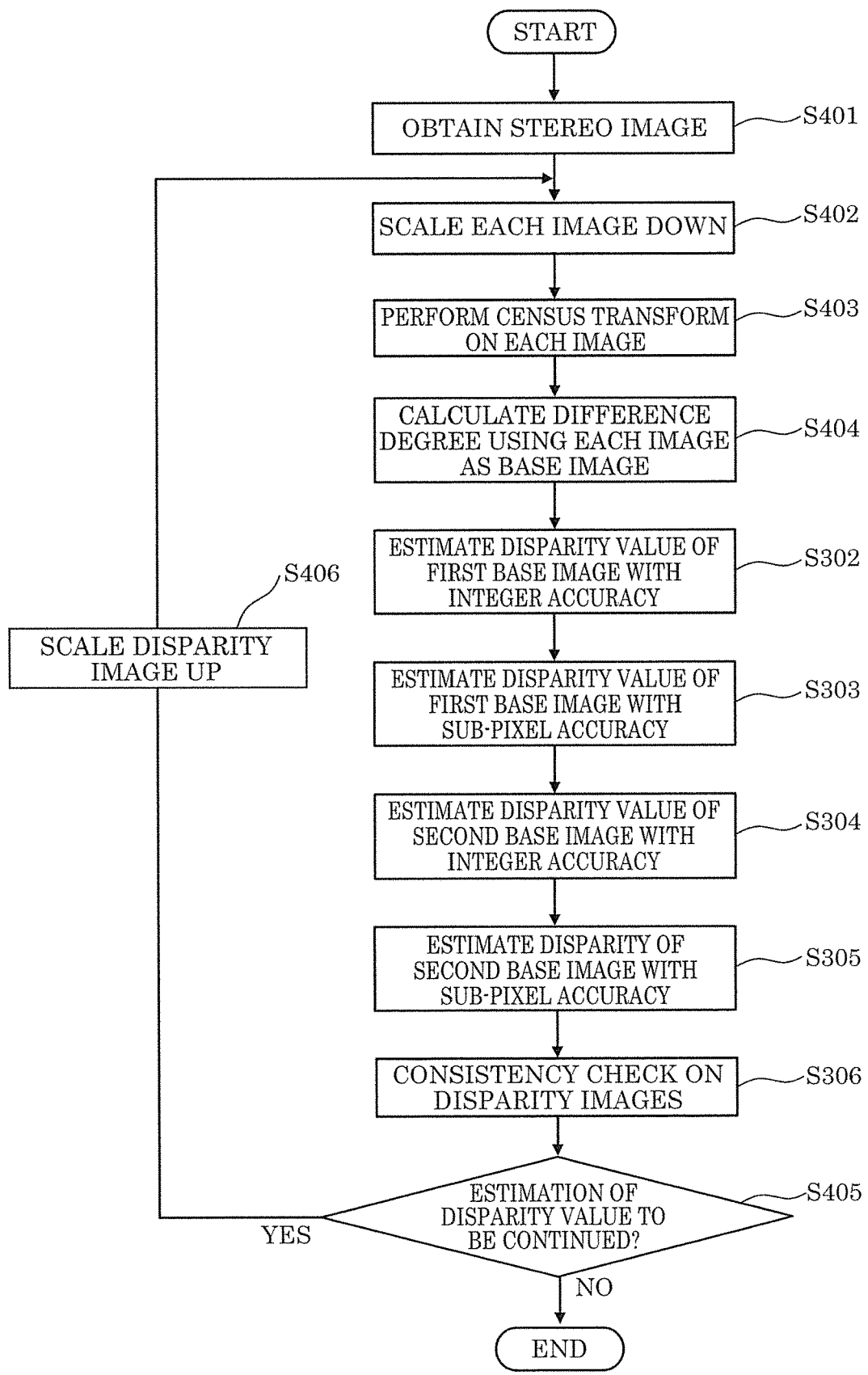
FIG. 31 is a flowchart showing an example of operations of a disparity estimation device according to Embodiment 4.

With reference to FIG. 31, operations of disparity estimation device 400 will be described. FIG. 31 is a flowchart showing an example of operations of disparity estimation device 400 according to Embodiment 4. First, in Step S401, down-scaler 407 obtains, from storage 20, initial disparity images Ii1 and Ii2 and captured images I1 and I2 which are stereo images respectively captured by cameras 11a and 11b. Initial disparity images Ii1 and Ii2 are disparity images which are preset corresponding to camera 11a and 11b, and the disparity value of every pixel of initial disparity images Ii1 and Ii2 is zero.

Next, in Step S402, down-scaler 407 generates scaled-down images I1s and I2s by performing a normal down-scaling process on each of captured images I1 and I2 with a predetermined scale-down factor. Down-scaler 407 outputs scaled-down images I1s and I2s to census transformer 101, first sub-pixel disparity estimator 304a, and second sub-pixel disparity estimator 304b. Furthermore, down-scaler 407 generates scaled-down disparity images Id1s and Id2s by scaling down each of initial disparity images Ii1 and Ii2 or disparity images Id1 and Id2 obtained from up-scaler 409 with the same scale-down factor as that for captured images I1 and I2. At this time, down-scaler 407 reduces the disparity value of each pixel of each of the disparity images with said scale-down factor. Down-scaler 407 outputs scaled-down disparity images Id1s and Id2s to difference degree calculator 102. Disparity images Id1 and Id2 are the disparity images for captured images I1 and I2, respectively.

Note that the number of times a series of processes in Step S401 to S406 is repeated is preset, and furthermore the scale-down factor for each round is preset and stored in storage 20. The scale-down factor increases as the number of repetitions increases. In the present embodiment, the number of rounds of the repeating processes is set to three, and the scale-down factors in the first, second, and third rounds are set to ¼, ½, and an equal scale, respectively. Down-scaler 407 counts the number of down-scaling processes, regards the counted number as the number of rounds of the repeating processes, and scales down captured images I1 and I2 and initial disparity images Ii1 and Ii2 or disparity images Id1 and Id2 with the scale-down factor corresponding to the number of rounds of the repeating processes. Note that down-scaler 407 scales down initial disparity images Ii1 and Ii2 in the first round and scales down disparity images Id1 and Id2 in the second and following rounds. When the scale-down factor is an equal scale, down-scaler 407 refrains from scaling down and outputs captured image I1 and I2 and disparity images Id1 and Id2 without change. The disparity value of each pixel of initial disparity images Ii1 and Ii2 is zero.

Next, in Step S403, census transformer 101 performs the census transform on each of scaled-down images I1s and I2s as in Step S102 according to Embodiment 1.

Next, in Step S404, as in Step S301 according to Embodiment 3, difference degree calculator 102 sets scaled-down image I1s as the first base image, and calculates the difference degree of each pixel of scaled-down image I1s with respect to scaled-down image I2s which is the first reference image. Furthermore, difference degree calculator 102 sets scaled-down image I2s as the second base image, and calculates the difference degree of each pixel of scaled-down image I2s with respect to scaled-down image I1s which is the second reference image.

Note that in the first round of the repeating processes, difference degree calculator 102 calculates the difference degree in accordance with the predetermined search range. Specifically, difference degree calculator 102 determines the search range on the basis of the scale-down factor and the preset disparity search range at the same scale as the captured image. For example, in the case where the scale-down factor in the first round of the repeating processes is ¼ and the disparity search range at the same scale as the captured image covers ±64 pixels along the X-axis, the search range is determined as covering ±64 pixels×¼=±16 pixels along the X-axis and centering on the co-located pixel of the reference image that corresponds to the pixel of interest of the base image. Note that when the positional relationship between the base image and the reference image is already known, that is, when to which of images I1 and I2 captured by cameras 11a and 11b the base image corresponds is already known, the search range may be set to either pixels in the positive direction along the X-axis or pixels in the negative direction along the X-axis relative to the co-located pixel. Specifically, when the base image corresponds to captured image I1, the case in FIG. 20 where k=16 applies, and the search range extends between −16 pixels and 0 pixels relative to the co-located pixel. When the base image corresponds to captured image I2, the case in FIG. 21 where k=16 applies, and the search range extends between 0 pixels and 16 pixels relative to the co-located pixel.

In the second and following rounds of the repeating processes, difference degree calculator 102 calculates the difference degree using, as the search range, a range in the vicinity of the disparity value obtained by the last repeating process. Specifically, on the basis of scaled-down disparity images Id1s and Id2s obtained by the last repeating process, difference degree calculator 102 determines, as the pixel co-located with the pixel of interest, a pixel of the reference image that is in the position corresponding to the disparity value of the pixel of interest, and determines, as the search range, a range in the vicinity of the co-located pixel along the X-axis. For example, difference degree calculator 102 determines, as the search range, the ±2 pixel range centering on the co-located pixel and extending along the X-axis. Such a search range may be smaller than that for the first round of the repeating processes.

The scale-down factor in Step S402 increases with an increase in the number of times the processes have been repeated. Thus, as the repeating processes proceed, the search transitions from the search with low pixel density to the search with high pixel density. In other words, the searches are conducted with low density and high density through the repeating processes. In the first round of the repeating processes, after fully conducting the search with low density on a low-capacity, low-resolution image, difference degree calculator 102 gradually conducts, according to an increase in the number of rounds of the repeating processes, the search with higher density using a higher-resolution image, only for the neighborhood of the result of the last search, that is, the disparity value estimated in the last process. Thus, the whole amount of calculations performed to estimate the disparity value is reduced while the accuracy in estimating the disparity value is maintained high.

Next, in Steps S302 to S306, on the basis of the difference degree of each pixel of scaled-down images I1s and I2s calculated in Step S404, disparity estimation device 400 performs processes that are the same as or similar to those in Embodiment 3 to generate the disparity image with sub-pixel accuracy for each of scaled-down images I1s and I2s.

Next, in Step S405, end determiner 408 determines whether to continue the process of estimating the disparity value. When end determiner 408 determines that the process of estimating the disparity value is to be continued (YES in Step S405), the processing proceeds to Step S406, and when end determiner 408 determines that the process of estimating the disparity value is not to be continued (NO in Step S405), the processing is ended. Specifically, end determiner 408 obtains, for down-scaler 407, the scale-down factor for Step S402, and obtains, from L/R checker 306, the disparity image generated in Step S306. Subsequently, when the scale-down factor is less than 1, end determiner 408 causes the process of estimating the disparity value to be continued, and outputs the obtained disparity value to up-scaler 409. When the scale-down factor is an equal scale, end determiner 408 brings the estimation process to the end, and outputs the obtained disparity image to depth calculator 31, storage 20, and the like. Note that when the scale-down factor is an equal scale, the scale of the disparity image obtained from L/R checker 306 is the same as those of captured images I1 and I2.

Next, in Step S406, up-scaler 409 performs, on the disparity image obtained from end determiner 408, a normal up-scaling process and the process of magnifying the disparity value of each pixel with the scale-up factor corresponding to the scale-down factor for Step S402, and outputs the resultant disparity image to down-scaler 407. In the present embodiment, the scale-up factors in the first, second, and third rounds are set to 4, 2, and an equal scale, respectively, which correspond to the scale-down factors ¼, ½, and an equal scale. Note that when the scale-down factor is an equal scale, up-scaler 409 does not obtain the disparity image, as described above in Step S405.

In Step S402 following Step S406, down-scaler 407 generates scaled-down images I1sa and I2sa and scaled-down disparity images Id1sa and Id2sa by scaling down captured images I1 and I2 and disparity images Id1 and Id2 with a scale-down factor greater than that used in the last round of the repeating processes. In Step S403, census transformer 101 performs the census transform on scaled-down images I1*sa* and I2*sa*. In Step S404, when scaled-down image I1*sa* is the base image, difference degree calculator 102 obtains the disparity value of the pixel of interest of scaled-down image I1*sa* on the basis of scaled-down disparity image Id1*sa*. Furthermore, difference degree calculator 102 determines, as the co-located pixel for the pixel of interest, the pixel located in scaled-down image I2*sa*, which is the reference image, in the position specified by adding the aforementioned disparity value to the same position as the pixel of the interest, and determines, as the search range, a range near the co-located pixel. Difference degree calculator 102 calculates the difference degree of the pixel of interest on the basis of the aforementioned search range. Furthermore, when scaled-down image I2*sa* is the base image, difference degree calculator 102 performs processes in substantially the same manner as described above on the basis of scaled-down disparity image Id2*sa*. Moreover, disparity estimation device 400 repeats the processes in Steps S302 to S306 in substantially the same manner as in the last round of the repeating processes.

With disparity estimation device 400 according to Embodiment 4 described above, it is possible to obtain advantageous effects that are the same as or similar to those produced in Embodiment 3. Furthermore, disparity estimation device 400 performs the process of repeating the estimation of the disparity value while changing the captured images in such a manner as to increase the scale-down factor. In the repeating processes, disparity estimation device 400 limits the search range for calculating the difference degree using the disparity image obtained in the last round of the repeating processes. In the first round of the repeating processes, disparity estimation device 400 calculates the difference degree and the disparity value by fully conducting the search with low density on the scaled-down low-resolution image, and then calculates the difference degree and the disparity value by conducting, using the limited search range obtained from the last disparity image, the search with high density on a high-resolution image gradually scaled-down with a scale-down factor increasing with an increase in the number of rounds of the repeating processes. Thus, disparity estimation device 400 can reduce the whole amount of calculations for estimating the disparity value while maintaining the accuracy in estimating the disparity value at the sub-pixel accuracy.

Figure 32:
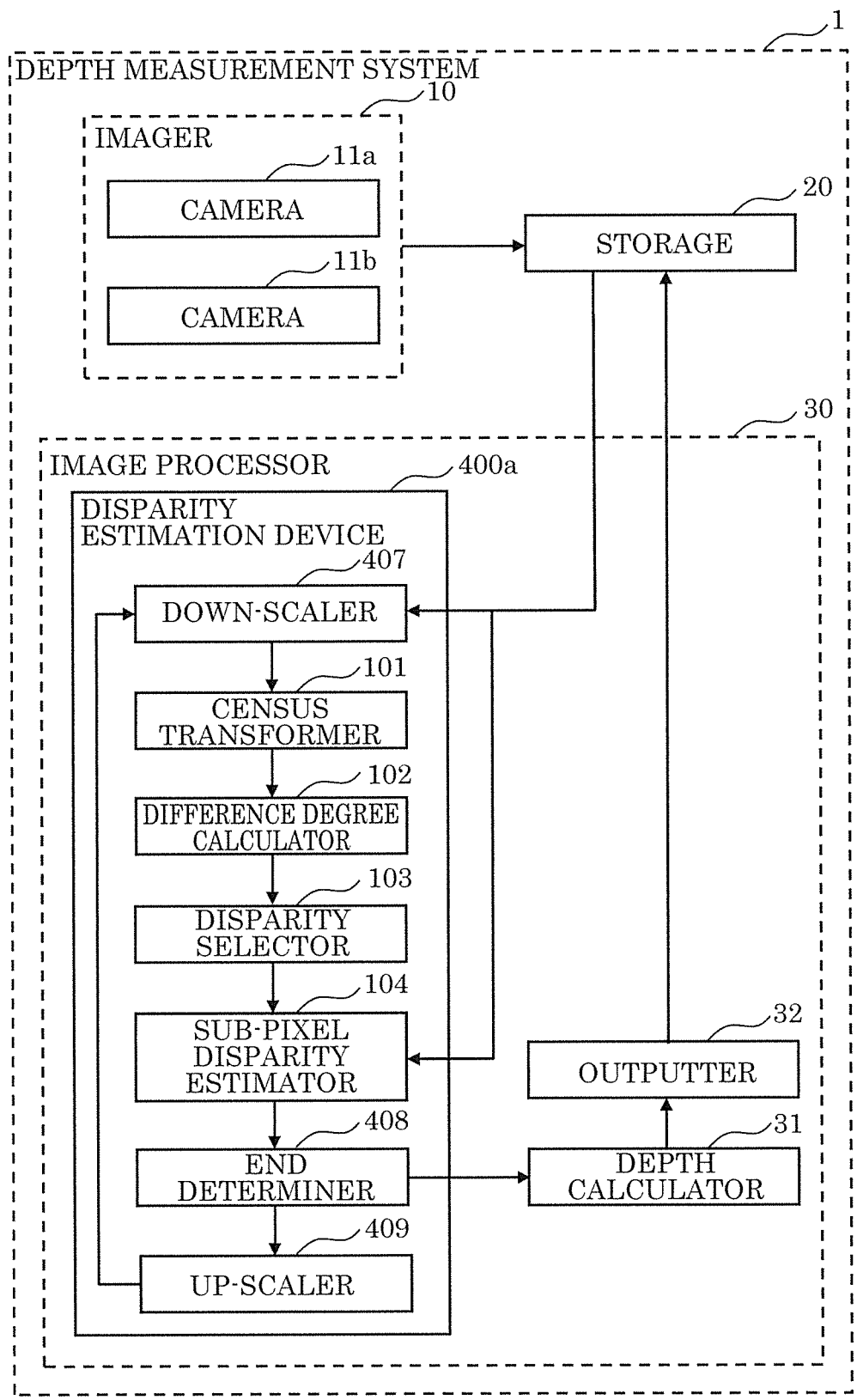
FIG. 32 is a block diagram showing an example of a functional configuration of a disparity estimation device according to a variation of Embodiment 4.

Disparity estimation device 400 according to Embodiment 4 is configured by adding down-scaler 407, end determiner 408, and up-scaler 409 to disparity estimation device 300 according to Embodiment 3, but may be configured by adding down-scaler 407, end determiner 408, and up-scaler 409 to the disparity estimation device according to Embodiment 1 or 2. For example, disparity estimation device 400*a* according to a variation of Embodiment 4 shown in FIG. 32 is configured by adding down-scaler 407, end determiner 408, and up-scaler 409 to disparity estimation device 100 according to Embodiment 1. Using one of captured images I1 and I2 as the base image, disparity estimation device 400*a* generates the disparity image for the base image with sub-pixel accuracy, and repeats the process of estimating the disparity value without determining the consistency. Note that FIG. 32 is a block diagram showing an example of a functional configuration of disparity estimation device 400*a* according to a variation of Embodiment 4.

Embodiment 5

Disparity estimation device 500 according to Embodiment 5 will be described. Disparity estimation device 500 according to Embodiment 5 is configured by modifying disparity estimation device 100 according to Embodiment 1 to weight the difference degree and determine the disparity value on the basis of the weighted difference degree. In Embodiment 5, structural elements that are substantially the same as those in Embodiments 1 to 4 will be given the same reference numerals as those in Embodiments 1 to 4, and description thereof will be omitted. The following description will focus on differences from Embodiments 1 to 4 while omitting details that are substantially the same as those in Embodiments 1 to 4.

Figure 33:
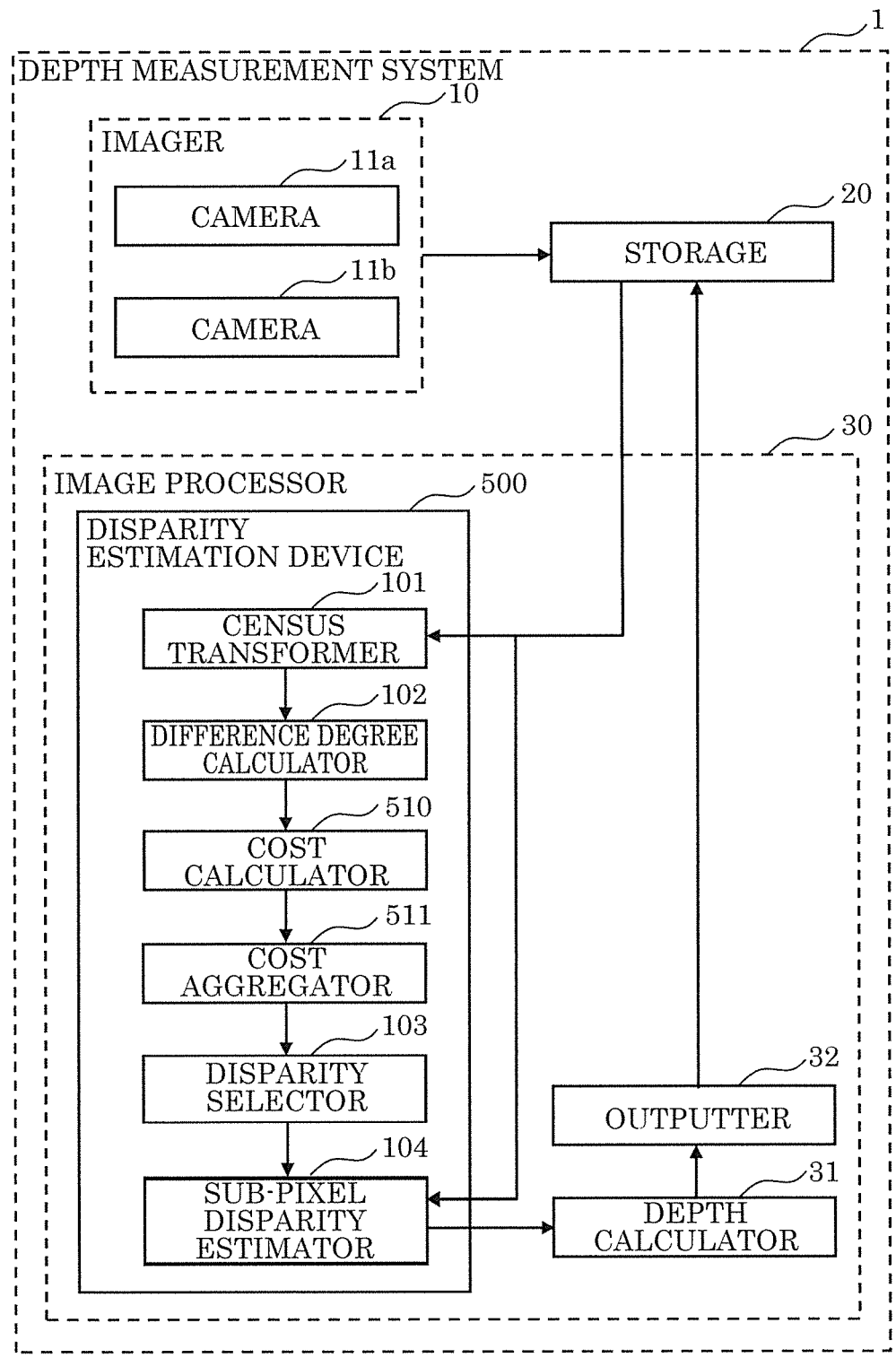
FIG. 33 is a block diagram showing an example of a functional configuration of a disparity estimation device according to Embodiment 5.

FIG. 33 is a block diagram showing an example of a functional configuration of disparity estimation device 500 according to Embodiment 5. As shown in FIG. 33, disparity estimation device 500 includes census transformer 101, difference degree calculator 102, cost calculator 510, cost aggregator 511, disparity selector 103, and sub-pixel disparity estimator 104. Disparity estimation device 500 is configured by adding cost calculator 510 and cost aggregator 511 to disparity estimation device 100 according to Embodiment 1.

Cost calculator 510 calculates, for the pixel of interest of the base image, costs associated with the distribution of disparity values of pixels along each of a plurality of scanning directions from the pixel of interest. Specifically, cost calculator 510 calculates costs associated with the distribution of disparity values on each of a plurality of straight lines passing through the pixel of interest. As an example, the plurality of straight lines are radial half-lines starting from the pixel of interest. In the present embodiment, the plurality of straight lines are half-lines extending at equal intervals in 8 or 16 directions from the pixel of interest; the 8 half-lines form 4 straight lines passing through the pixel of interest, and the 16 half-lines form 8 straight lines passing through the pixel of interest. Here, the scanning direction, that is, the direction of the half-line is an example of the predetermined direction.

Regarding the costs calculated by cost calculator 510 which are associated with the distribution of the disparity values on the plurality of half-lines extending from the pixel of interest, cost aggregator 511 adds up and aggregates the costs on the plurality of half-lines for each disparity value in the search range for calculating the difference degree.

Disparity selector 103 determines, as the disparity value of the pixel of interest with integer accuracy, the disparity value resulting in the minimum cost among the costs of the respective disparity values for the pixel of interest aggregated by cost aggregator 511.

Figure 34:
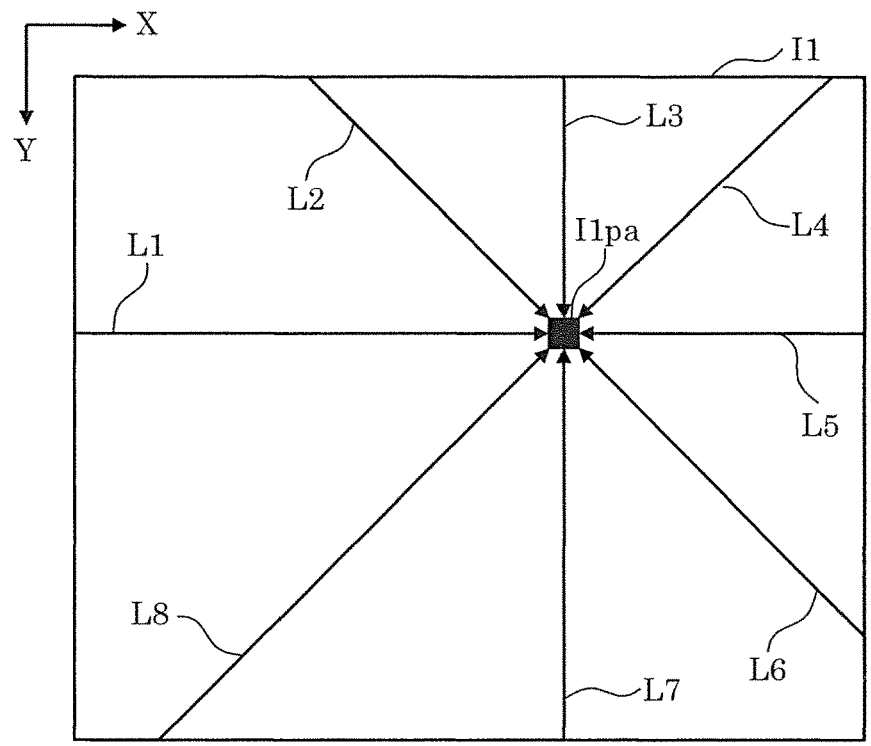
FIG. 34 shows an example of a plurality of scanning directions from a pixel of interest upon cost calculation.

Details of the cost calculation process and the cost aggregation process will be described below. The following will describe a processing example about the costs of the distribution of the disparity values on the half-line extending in the negative direction along the X-axis among the 8 directions in the case where captured image I1 serves as the base image and captured image I2 serves as the reference image. As shown in FIG. 34, cost calculator 510 sets, on captured image I1, half-lines L1 to L8 centering on pixel of interest I1*pa* of captured image I1. Subsequently, cost calculator 510 calculates the costs of the distribution of the disparity values of the pixels on each of half-lines L1 to L8. Note that FIG. 34 shows an example of the plurality of scanning directions from the pixel of interest upon cost calculation.

Figure 35:
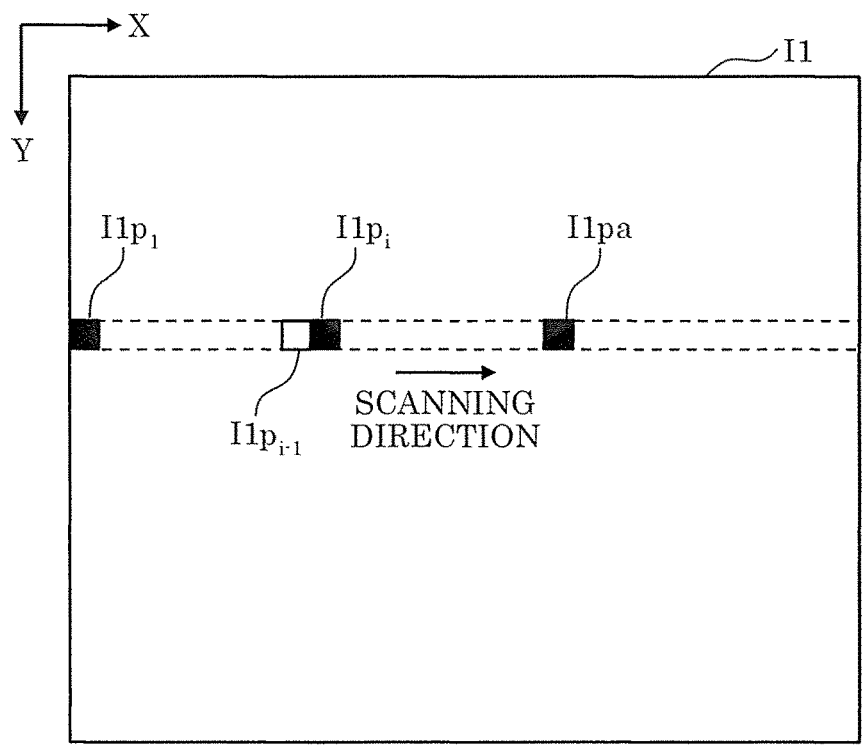
FIG. 35 shows an example of a scanning direction for a pixel on a straight line passing through a pixel of interest upon cost calculation.

As shown in FIG. 35, cost calculator 510 calculates costs for each pixel on half-line L1 extending in the positive direction along the X-axis on the basis of the search range corresponding to pixel and the difference degree corresponding to the disparity value within the search range. Cost calculator 510 calculates costs for the pixels on half-line L1 in sequence from an edge of captured image I1 toward pixel of interest I1pa, that is, in sequence from pixel I1$p_1$ having an x-coordinate of 1 in the pixel coordinates toward pixel of interest I1pa. Note that FIG. 35 shows an example of a scanning direction for a pixel on a straight line passing through a pixel of interest upon cost calculation.

For example, FIG. 36 shows an example of costs for pixel I1$p_i$ (i is a positive integer) located between pixel I1$p_1$ and pixel of interest I1pa. As shown in FIG. 36, cost calculator 510 obtains, for pixel I1$p_i$, the difference degree calculated by difference degree calculator 102 which corresponds to each disparity value within the search range. Note that FIG. 36 shows an example of costs for a single pixel on a scanning line for cost calculation. In the present example, the search range covers from 0 to −k pixels. Furthermore, on the basis of each disparity value within the search range and the disparity value of neighboring pixel I1$p_{i-1}$, cost calculator 510 determines the penalty value for the disparity value. When the disparity value within the search range and the disparity value of pixel I1$p_{i-1}$ are the same, the penalty value is P1, and when the disparity value within the search range and the disparity value of pixel I1$p_{i-1}$ are different, the penalty value is P2. In the present embodiment, P2 is greater than P1. Pixel I1$p_{i-1}$ is a pixel which is adjacent to pixel I1$p_i$ in the positive direction along the X-axis and on which the cost calculation has been performed immediately before that on pixel I1$p_i$ along half-line L1. Cost calculator 510 calculates, for each disparity value within the search range, a cost obtained by adding the penalty value to the difference degree. Thus, the cost of each disparity value within the search range for pixel I1$p_i$ is determined. Here, pixel I1$p_i$ on half-line L1 is an example of the first evaluation pixel, pixel I1$p_{i-1}$ is an example of the second evaluation pixel, the penalty value is an example of the first evaluation value, and the cost is an example of the second evaluation value.

Cost calculator 510 calculates, for every pixel on half-line L1, the cost of each disparity value within the search range. Note that for pixel I1$p_1$, no neighboring pixel is present, and thus there is no penalty value, resulting in the difference degree of each disparity value becoming a cost. Furthermore, cost calculator 510 calculates, for every pixel on each of the other half-lines L2 to L8, the cost of each disparity value within the search range. Thus, for every pixel on half-lines L1 to L8, the cost of each disparity value of 0 to −k pixels is calculated. Cost aggregator 511 calculates the sum of the costs of the same disparity value of all the pixels on half-lines L1 to L8. Subsequently, disparity selector 103 determines, as the disparity value of pixel I1pa of interest with integer accuracy, the disparity value having the minimum sum of the costs among the sums of the costs of the disparity values of the 0 to −k pixels. Cost calculator 510 and cost aggregator 511 perform the above-described processes using every pixel of captured image I1 as the pixel of interest, and thus the disparity value of each pixel with integer accuracy is determined. Here, the sum of the costs is an example of the addition evaluation value.

As described above, for example, for each pixel I1$p_i$ serving as an evaluation pixel located in a predetermined direction from pixel of interest I1pa serving as the first pixel having a disparity value to be estimated in captured image I1 serving as the first image, cost calculator 510 calculates the penalty value serving as the first evaluation value of each of the pixels within the search range on the basis of the comparison between the disparity value of pixel I1$p_{i-1}$ adjacent to pixel I1$p_i$ in a predetermined direction and the disparity value of each of the pixels within the search range for calculating the difference value, for the co-located pixel included in captured image I2 serving as the second image, in a position corresponding to pixel I1$p_i$. Furthermore, cost calculator 510 calculates the cost serving as the second evaluation value for the disparity value of each of the pixels within the search range on the basis of the penalty value of the pixel within the search range and the difference degree between pixel I1$p_i$ and the pixel within the search range. Cost aggregator 511 calculates the sum of the costs which serves as the addition evaluation value by adding up the costs of all the evaluation pixels corresponding to the disparity value of each pixel within the search range. Disparity selector 103 determines, as the disparity value of pixel of interest I1pa, the disparity value corresponding to the minimum sum of the costs.

Figure 37:
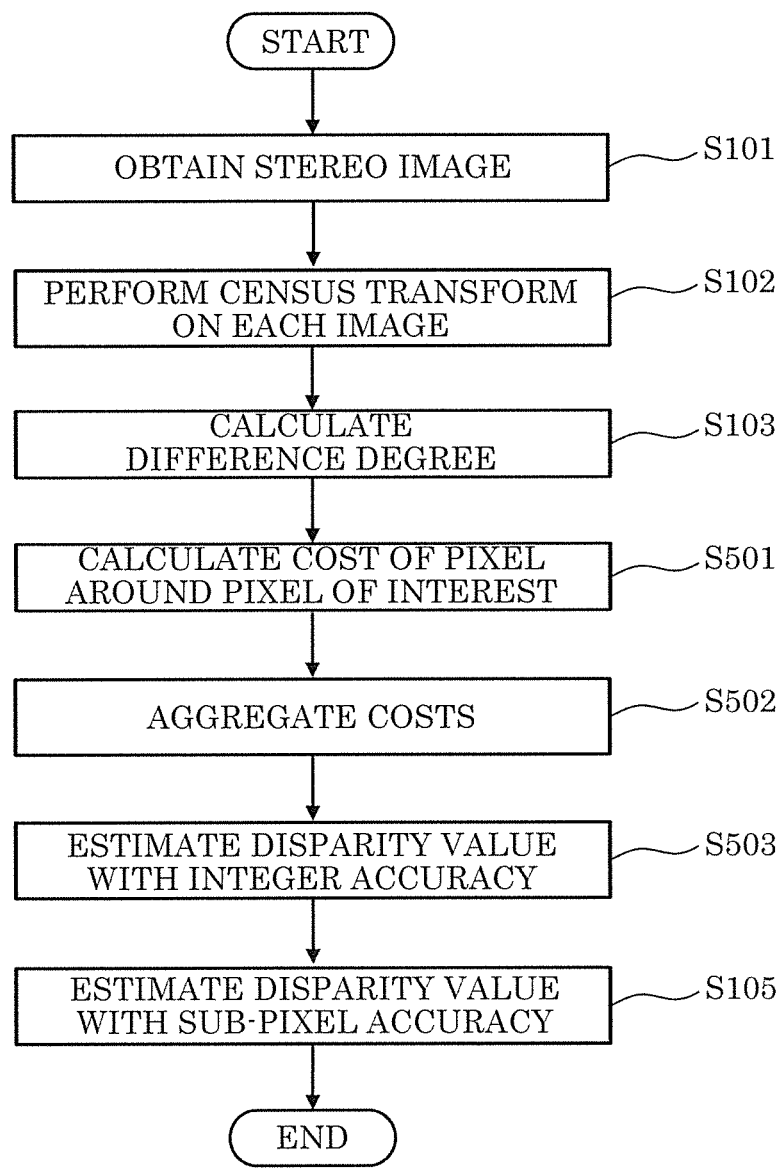
FIG. 37 is a flowchart showing an example of operations of a disparity estimation device according to Embodiment 5.

With reference to FIG. 37, operations of disparity estimation device 500 will be described. FIG. 37 is a flowchart showing an example of operations of disparity estimation device 500 according to Embodiment 5. As in Embodiment 1, disparity estimation device 500 performs the processes in Steps S101 to S103 to obtain captured images I1 and I2 from storage 20 and calculate the census feature amount of each pixel of captured images I1 and I2. Furthermore, disparity estimation device 500 sets captured image I1 as the base image, and calculates the difference degree of each pixel of captured image I1 with respect to each of the pixels within the search range in captured image I2.

Next, in Step S501, cost calculator 510 calculates, for the pixel of interest of captured image I1 serving as the base image, costs associated with the distribution of disparity values on each of the plurality of straight lines passing through the pixel of interest. Cost calculator 510 calculates, for each pixel on each of the straight lines, a cost which is a value obtained by weighting the difference degree corresponding to each disparity value within the search range for calculating the difference degree on the basis of the difference between the disparity value within the search range and the disparity value of a pixel adjacent to said pixel. Cost calculator 510 calculates a cost using every pixel of captured image I1 as the pixel of interest.

Next, in Step S502, for the pixel of interest of captured image I1, cost aggregator 511 adds up and aggregates, for each disparity value within the search range, the costs calculated for the pixels on the plurality of straight lines, in other words, adds up all the costs of the same disparity values. Thus, the sum of the costs is calculated for each disparity value within the search range. Cost aggregator 511 aggregates the costs of the pixels using every pixel of captured image I1 as the pixel of interest.

Next, in Step S503, for the pixel of interest of captured image I1, disparity selector 103 determines, as the disparity value of the pixel of interest with integer accuracy, the disparity value resulting in the minimum sum of the costs among the sums of the costs of the disparity values within the search range. Disparity selector 103 determines the disparity value of each pixel with integer accuracy using every pixel of captured image I1 as the pixel of interest.

Next, in Step S105, as in Embodiment 1, sub-pixel disparity estimator 104 estimates, using captured images I1 and I2, the disparity value of each pixel of captured image I1 with integer accuracy and the disparity value of each pixel of captured image I1 with sub-pixel accuracy. Furthermore, sub-pixel disparity estimator 104 generates the disparity image for captured image I1 which includes the disparity value with sub-pixel accuracy as the pixel value.

With disparity estimation device 500 according to Embodiment 5 described above, it is possible to obtain advantageous effects that are the same as or similar to those produced in Embodiment 1. Furthermore, disparity estimation device 500 estimates the disparity value of the pixel of interest with integer accuracy on the basis of the cost in which a change in the disparity value of a pixel around the pixel of interest of the base image is reflected to the difference degree. Furthermore, disparity estimation device 500 estimates the disparity value with sub-pixel accuracy using the disparity value with integer accuracy based on the cost. This allows disparity estimation device 500 to increase the likelihood that the disparity value of the pixel of interest with sub-pixel accuracy has a value equal or close to the disparity value of a pixel around the pixel of interest, reducing the streaking artifacts, i.e., streak artifacts which are generated due to the disparity values being different across lines such as edges and boundaries of a subject. Thus, disparity estimation device 500 can estimate the disparity value with high accuracy. In the above description, disparity estimation device 500 uses captured image I1 as the base image, but may use captured image I2 as the base image.

Figure 38:
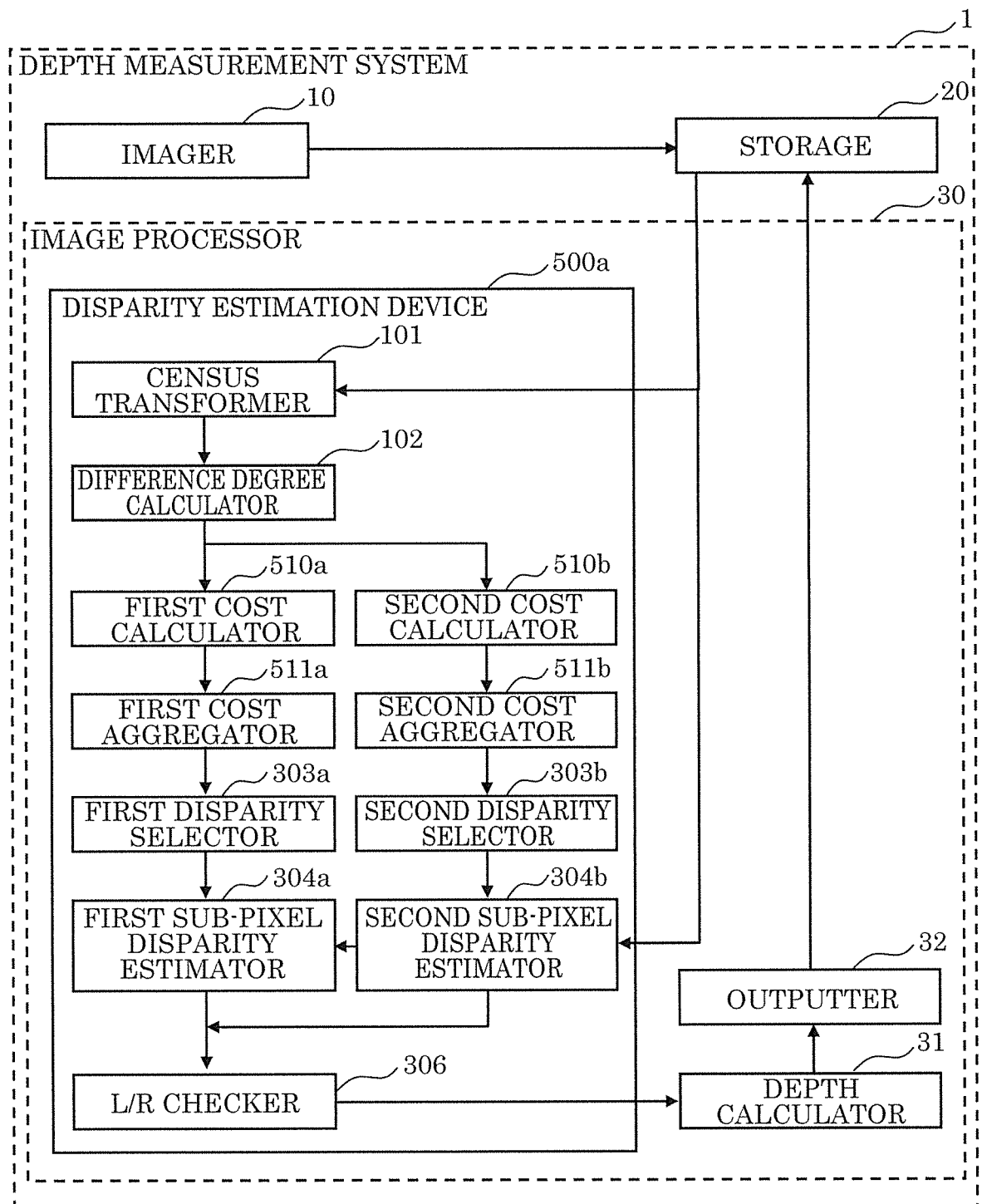
FIG. 38 is a block diagram showing an example of a functional configuration of a disparity estimation device according to Variation 1 of Embodiment 5.
Figure 39:
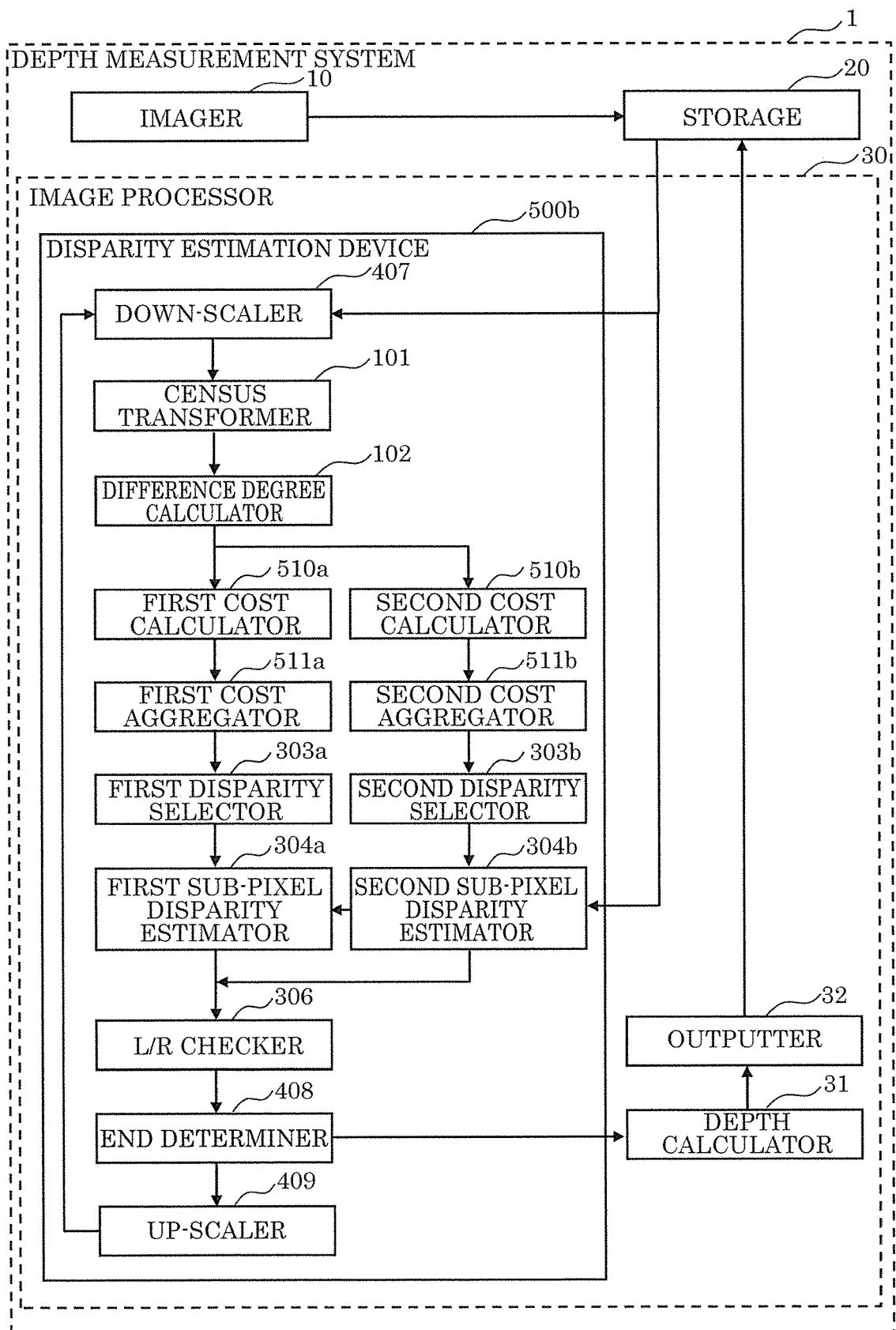
FIG. 39 is a block diagram showing an example of a functional configuration of a disparity estimation device according to Variation 2 of Embodiment 5.
Figure 40:
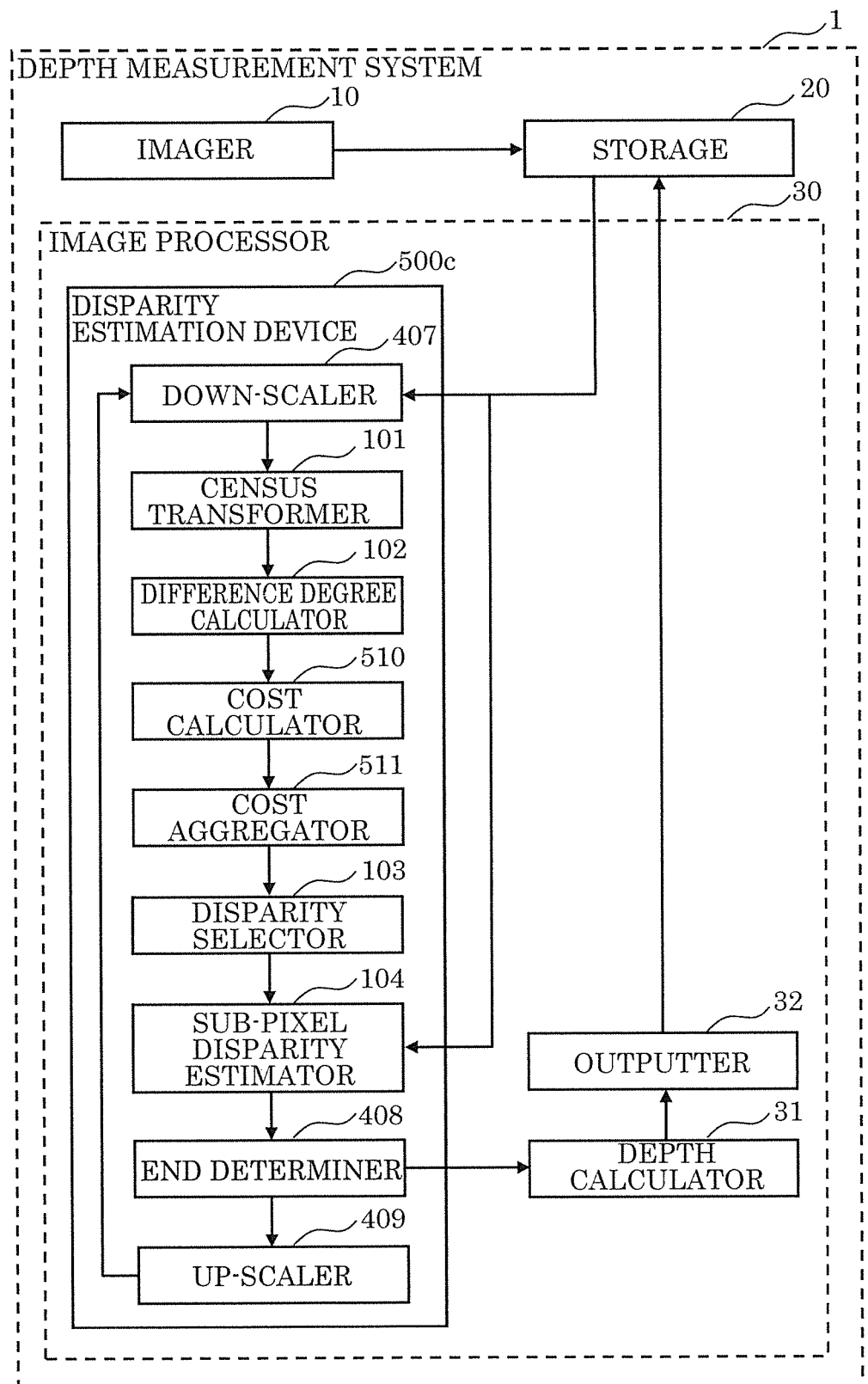
FIG. 40 is a block diagram showing an example of a functional configuration of a disparity estimation device according to Variation 3 of Embodiment 5.

Disparity estimation device 500 according to Embodiment 5 is configured using, as a base, disparity estimation device 100 according to Embodiment 1, but may be configured using, as a base, those according to Embodiments 2 to 4 and variations thereof. For example, disparity estimation device 500a according to Variation 1 of Embodiment 5 which is based on Embodiment 3 is configured as shown in FIG. 38. Furthermore, disparity estimation device 500b according to Variation 2 of Embodiment 5 which is based on Embodiment 4 is configured as shown in FIG. 39. Furthermore, disparity estimation device 500c according to Variation 3 of Embodiment 5 which is based on a variation of Embodiment 4 is configured as shown in FIG. 40.

In disparity estimation devices 500a and 500b according to Variations 1 and 2, first cost calculator 510a obtains the difference degree of each pixel of captured image I1 from difference degree calculator 102, and calculates the cost of each pixel of captured image I1. First cost aggregator 511a calculates, for each pixel of captured image I1, a cost sum which is aggregation of the costs of the disparity values within the search range. First disparity selector 303a determines, as the disparity value of each pixel of captured image I1 with integer accuracy, the disparity value resulting in the minimum cost sum, and first sub-pixel disparity estimator 304a estimates the disparity value of each pixel of captured image I1 with sub-pixel accuracy and outputs the disparity value to L/R checker 306. Second cost calculator 510b obtains the difference degree of each pixel of captured image I2 from difference degree calculator 102, and calculates the cost of each pixel of captured image I2. Second cost aggregator 511b calculates, for each pixel of captured image I2, a cost sum which is aggregation of the costs of the disparity values within the search range. Second disparity selector 303b determines, as the disparity value of each pixel of captured image I2 with integer accuracy, the disparity value resulting in the minimum cost sum, and second sub-pixel disparity estimator 304b estimates the disparity value of each pixel of captured image I2 with sub-pixel accuracy and outputs the disparity value to L/R checker 306.

In disparity estimation device 500c according to Variation 3, cost calculator 510 obtains, from difference degree calculator 102, the difference degree of each pixel of a base scaled-down images among scaled-down images I1s and I2s for captured images I1 and I2, and calculates the cost of each pixel of the base scaled-down image. Cost aggregator 511 calculates, for each pixel of the base scaled-down image, a cost sum which is aggregation of the costs of the disparity values within the search range. Disparity selector 103 determines, as the disparity value of each pixel of the base scaled-down image with integer accuracy, the disparity value resulting in the minimum cost sum, and sub-pixel disparity estimator 104 estimates the disparity value of each pixel of the base scaled-down image with sub-pixel accuracy and outputs the disparity value to end determiner 408.

Embodiment 6

Disparity estimation device 600 according to Embodiment 6 will be described. In disparity estimation device 100 according to Embodiment 1, at the time of the census transform, the comparison region which is a region of neighboring pixels of the pixel of interest is fixed, for example, as shown in FIG. 18A and FIG. 18B. Disparity estimation device 600 according to Embodiment 6 calculates the census feature amount of the pixel of interest on the basis of various comparison regions for the pixel of interest. In Embodiment 6, structural elements that are substantially the same as those in Embodiments 1 to 5 will be given the same reference numerals as those in Embodiments 1 to 5, and description thereof will be omitted. The following description will focus on differences from Embodiments 1 to 5 while omitting details that are substantially the same as those in Embodiments 1 to 5.

When the comparison region includes an occlusion region in which a rear subject is not visible due to a front subject or a region in which the disparity significantly changes, there are cases where the contour of a subject such as the boundary between the foreground and the background in the captured image and the boundary line in the disparity image formed using the differences between the disparity values do not match in a region on the disparity image having disparity values estimated on the basis of such a comparison region. In the present embodiment, disparity estimation device 600 uses at least one comparison region in which the pixel of interest is located offset from the center, aside from a normal comparison region in which the pixel of interest is located at the center as in Embodiments 1 to 5. Disparity estimation device 600 determines a disparity value corresponding to the minimum difference degree among those calculated for these comparison regions, and thus generates a disparity image in which the boundary between different disparity values more accurately matches the actual contour of the subject.

Figure 41:
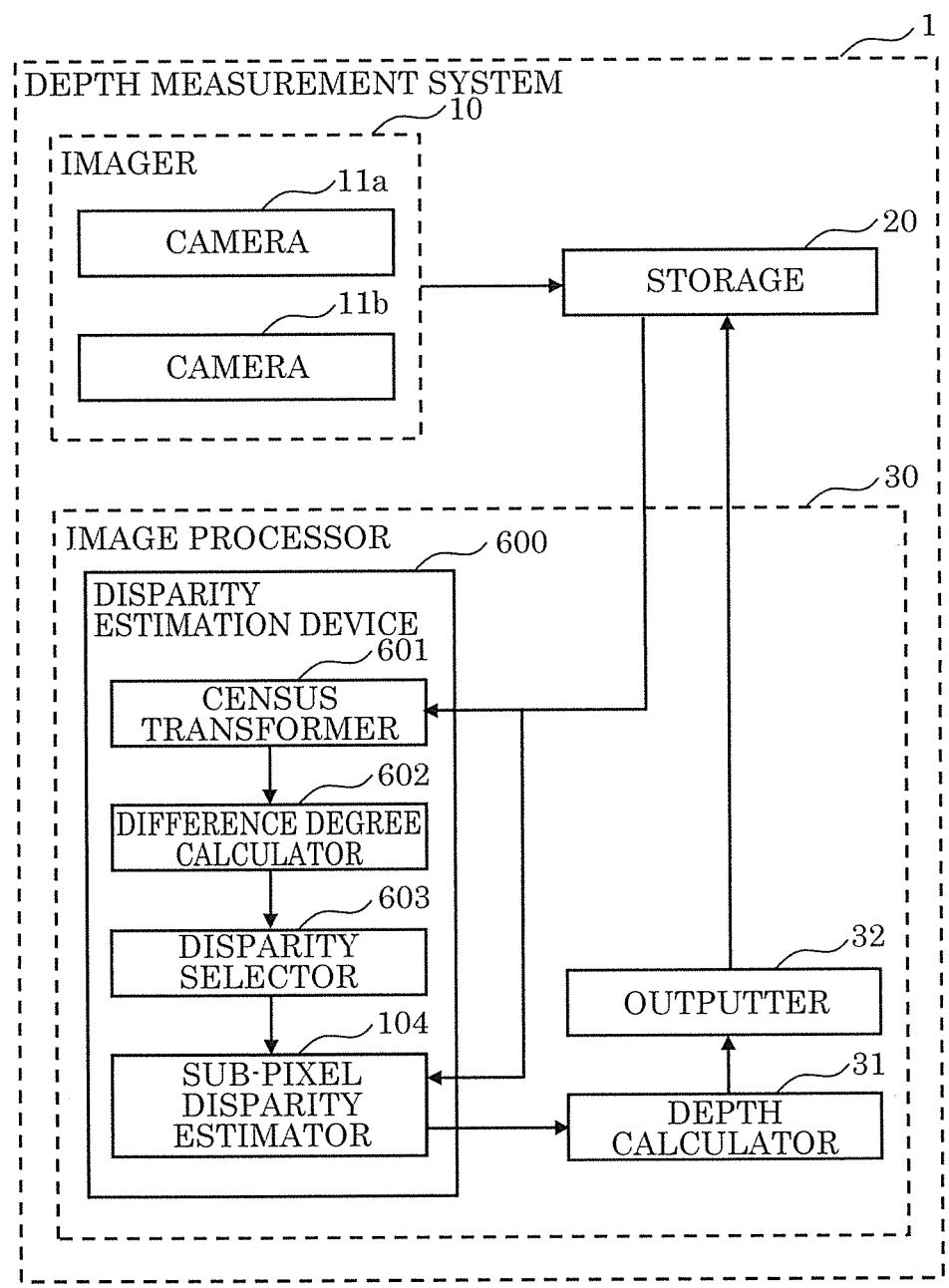
FIG. 41 is a block diagram showing an example of a functional configuration of a disparity estimation device according to Embodiment 6.

FIG. 41 is a block diagram showing an example of a functional configuration of disparity estimation device 600 according to Embodiment 6. As shown in FIG. 41, disparity estimation device 600 includes census transformer 601, difference degree calculator 602, disparity selector 603, and sub-pixel disparity estimator 104, similar to Embodiment 1. Sub-pixel disparity estimator 104 is substantially the same as that in Embodiment 1.

Census transformer 601 sets a plurality of comparison regions for the pixel of interest of the base image which is one of captured images I1 and I2. For each comparison region, census transformer 601 calculates the census feature amount by performing the census transform on the pixel of interest and a neighboring pixel included in the comparison region. Census transformer 601 calculates the census feature amount of every pixel of captured images I1 and I2 for each of the plurality of comparison regions.

Figure 42:
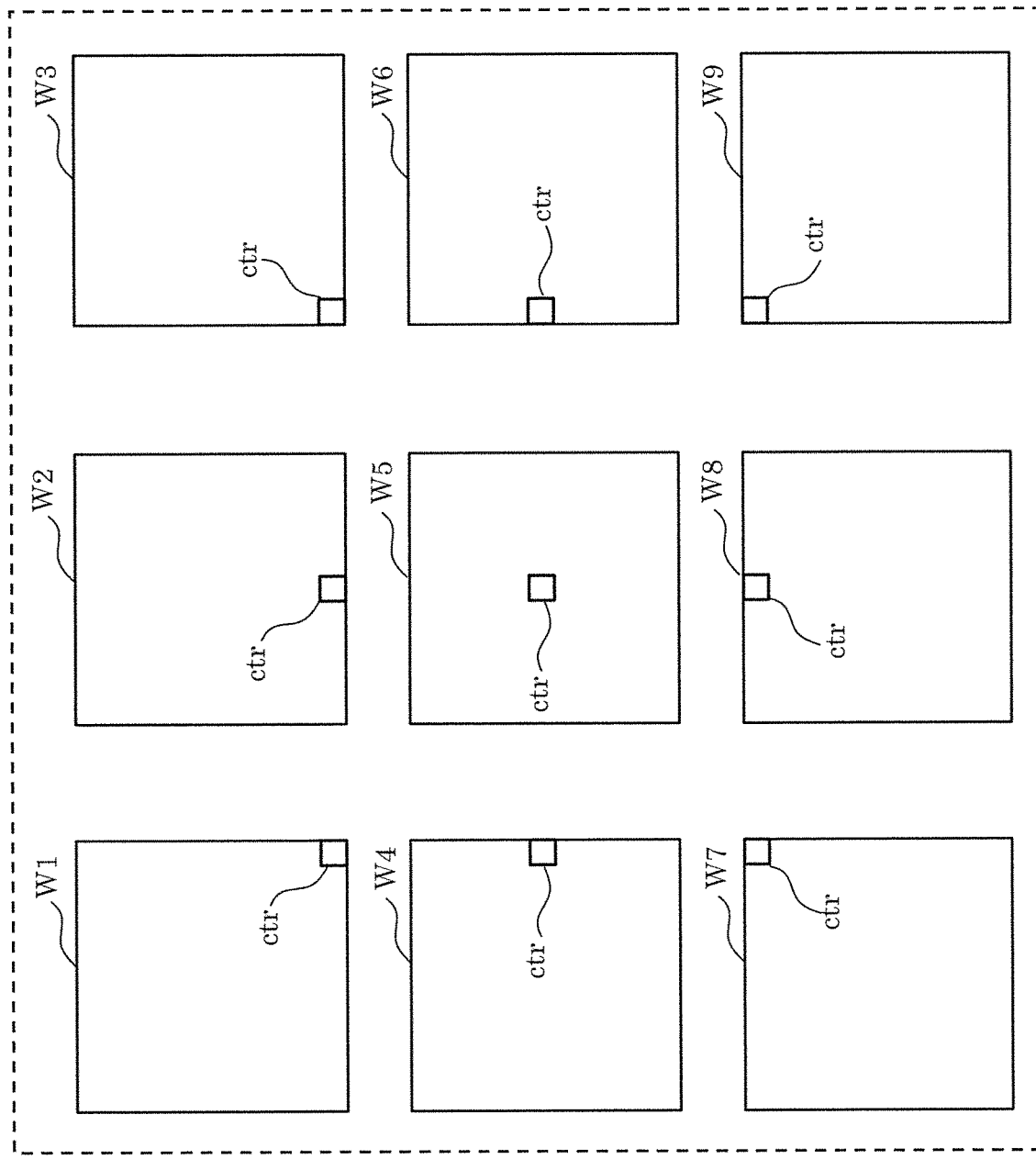
FIG. 42 shows an example of a plurality of comparison regions for a pixel of interest.

For example, in the present embodiment, census transformer 601 sets nine comparison regions W1 to W9 for single pixel of interest ctr, as shown in FIG. 42. Note that FIG. 42 shows an example of the plurality of comparison regions for the pixel of interest. Comparison region W5 is a normal comparison region in which pixel of interest ctr is located at the center. In each of comparison regions W1 to W4 and W6 to W9, pixel of interest ctr is located in a position different from the center of the comparison region. Census transformer 601 calculates nine census feature amounts by performing the census transform on pixel of interest ctr and a neighboring pixel in each of comparison regions W1 to W9.

Difference degree calculator 602 calculates, for each comparison region, the difference degree of each pixel of the base image with respect to the reference image. At the time of calculating the difference degree of the pixel of interest of the base image, difference degree calculator 602 calculates the difference degree between the census feature amount of the pixel of interest and the census feature amount of each pixel of the reference image calculated using the same comparison region as the comparison region used to calculate the census feature amount of the pixel of interest. This means that upon calculation of the difference degree, the positional relationship of the pixel of interest and the reference pixel with the comparison region used to calculate the census feature amount is the same in the base image and the reference image. Specifically, for example, when comparison region W1 is used to calculate the census feature amount of the base image, the census feature amount of the reference image used to calculate the difference degree of the pixel of interest of the base image is that calculated using comparison region W1. Thus, in the example of FIG. 42, difference degree calculator 602 calculates the difference degree corresponding to each of comparison regions W1 to W9 for a single pixel of interest of the base image.

On the basis of the difference degrees of the pixels of the base image for each comparison region which have been calculated by difference degree calculator 602, disparity selector 603 extracts, for the comparison region, the minimum difference degree from the difference degrees of the pixel of interest of the base image, and extracts the disparity value resulting in said minimum difference degree. Furthermore, disparity selector 603 extracts the minimum difference degree from the difference degrees of the disparity values extracted in all the comparison regions, and determines, as the disparity value of the pixel of interest with integer accuracy, the disparity value resulting in said minimum difference degree. In other words, disparity selector 603 extracts, from the difference degrees of the pixel of interest for all the comparison regions, the minimum difference degree and the comparison region thereof, and determines, as the disparity value of the pixel of interest with integer accuracy, the disparity value resulting in said minimum difference degree. Furthermore, using every pixel of the base image as the pixel of interest, disparity selector 603 determines the disparity value of said pixel with integer accuracy.

Using the disparity value of each pixel of captured image I1 or I2 serving as the base image with integer accuracy and captured images I1 and I2, sub-pixel disparity estimator 104 estimates the disparity value of each pixel of the base image with sub-pixel accuracy. Furthermore, sub-pixel disparity estimator 104 generates the disparity image for the base image which includes the disparity value with sub-pixel accuracy as the pixel value. At this time, the window region for calculating the sub-pixel evaluation value of a luminance difference may be in a fixed position such as a central position with respect to the pixel of interest and the first to third reference pixels or may be in the same position as the comparison region resulting in the minimum difference degree extracted at the time of estimating the disparity value of the pixel of interest with integer accuracy.

Figure 43:
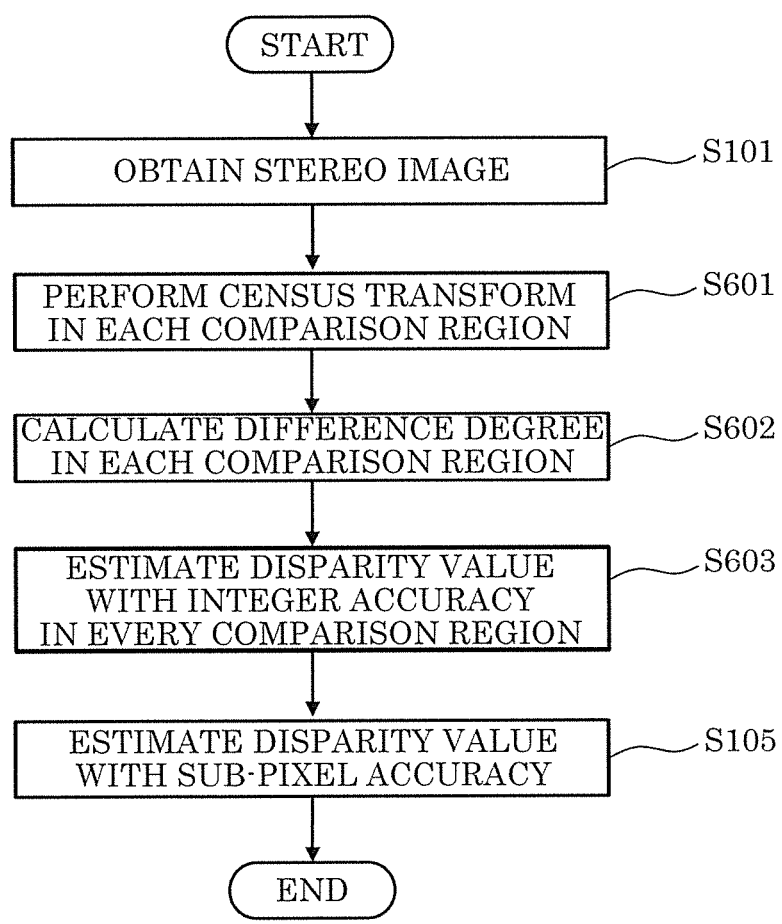
FIG. 43 is a flowchart showing an example of operations of a disparity estimation device according to Embodiment 6.

With reference to FIG. 43, operations of disparity estimation device 600 will be described. FIG. 43 is a flowchart showing an example of operations of disparity estimation device 600 according to Embodiment 6. In Step S101, as in Embodiment 1, census transformer 601 obtains, from storage 20, captured images I1 and I2 which are stereo images respectively captured by cameras 11a and 11b. In the following description, it is assumed that disparity estimation device 600 treats captured image I1 as the base image and captured image I2 as the reference image.

Next, in Step S601, census transformer 601 calculates, for each pixel of the base image, the census feature amount of each of the plurality of comparison regions, and calculates, for each pixel of the reference image, the census feature amount of each of the plurality of comparison regions. Census transformer 601 outputs, to difference degree calculator 602, the census feature amount of each of the plurality of comparison regions for each pixel of the base image and the reference image.

Next, in Step S602, difference degree calculator 602 calculates, for each comparison region, the difference degree of each pixel of the base image with respect to the reference image. Difference degree calculator 602 calculates the difference degree between the census feature amount of a pixel of the base image and the census feature amount of a pixel of the reference image calculated using the comparison regions identically positioned with respect to the pixels. Difference degree calculator 602 calculates the difference degree of each pixel of the base image and outputs the calculated difference degree to disparity selector 103.

Next, in Step S603, disparity selector 603 extracts, for the pixel of interest of the base image, the minimum difference degree from the difference degrees corresponding to all the comparison regions, and determines, as the disparity value of the pixel of interest with integer accuracy, the disparity value resulting in said minimum difference degree. Disparity selector 603 determines, by using each pixel of the base image as the pixel of interest, the disparity value of the pixel with integer accuracy, and outputs the determined disparity value to sub-pixel disparity estimator 104.

Next, in Step S105, as in Embodiment 1, sub-pixel disparity estimator 104 obtains captured images I1 and I2 from storage 20, and estimates, by using captured images I1 and I2 and the disparity value of each pixel of captured image I1, that is, the base image, with integer accuracy, the disparity value of the pixel of the base image with sub-pixel accuracy.

With disparity estimation device 600 according to Embodiment 6 described above, it is possible to obtain advantageous effects that are the same as or similar to those produced in Embodiment 1. Furthermore, disparity estimation device 600 determines the disparity value with integer accuracy on the basis of the difference degree calculated using the comparison region resulting in the minimum difference degree among the plurality of comparison regions in each of which the pixel of interest is in a different position with respect to the comparison region. Subsequently, disparity estimation device 600 estimates the disparity value with sub-pixel accuracy using the disparity value with integer accuracy. Such a disparity value with sub-pixel accuracy leads to a reduction in errors of the disparity value attributed to the position of the comparison region with respect to the pixel of interest. Thus, disparity estimation device 600 can accurately match the position of the boundary generated due to a difference in the disparity value in the disparity image and the position of the contour of a subject for pixels located close to the boundary of occlusion or the boundary between the foreground and the background at which the disparity value changes.

Note that the position of the comparison region with respect to the pixel of interest is not limited to the example shown in FIG. 42; the pixel of interest may be located in any position in the comparison region. Furthermore, the plurality of comparison regions are rectangular in the example of FIG. 42, but may have any shape.

Disparity estimation device 600 according to Embodiment 6 is configured using, as a base, disparity estimation device 100 according to Embodiment 1, but may be configured using, as a base, those according to Embodiments 2 to 5 and variations thereof.

Figure 44:
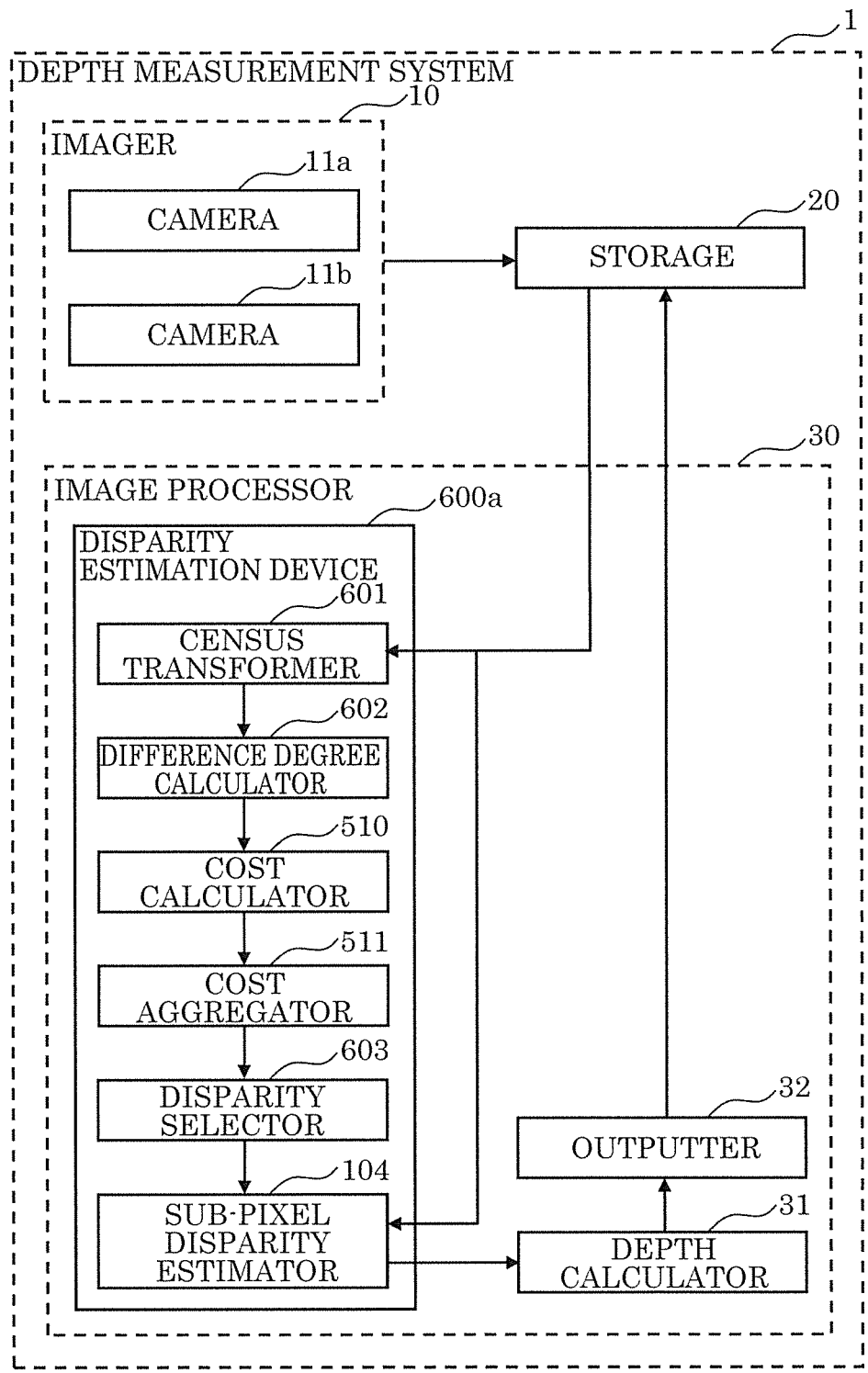
FIG. 44 is a block diagram showing an example of a functional configuration of a disparity estimation device according to a variation of Embodiment 6.

For example, disparity estimation device 600a according to a variation of Embodiment 6 which is based on Embodiment 5 is configured as shown in FIG. 44. In disparity estimation device 600a according to the variation, as in Embodiment 6 described above, census transformer 601 calculates the census feature amount of every pixel of captured images I1 and I2 for each of the plurality of comparison regions. Difference degree calculator 602 calculates, for each comparison region, the difference degree of each pixel of the base image with respect to the reference image.

Using every pixel of the base image as the pixel of interest, cost calculator 510 calculates, for each comparison region, costs of the pixel of interest which are associated with the distribution of disparity values on each of the plurality of straight lines passing through the pixel of interest. For each pixel on each of the straight lines, cost calculator 510 calculates, as the cost of the pixel of interest, a value obtained by weighting the difference degree corresponding to each disparity value within the search range for calculating the difference degree on the basis of the difference between the disparity value within the search range and the disparity value of a pixel adjacent to said pixel. For each comparison region, cost aggregator 511 aggregates the costs of the pixel of interest by adding up, for each disparity value within the search range, the costs calculated for the respective pixels on the plurality of straight lines passing through the pixel of interest, that is, by calculating the sum of costs for each disparity value. Disparity selector 603 extracts the minimum sum of the costs of the pixel of interest from the sums of the costs in all the comparison regions which have been calculated for the respective disparity values within the search ranges, specifies the comparison region and the disparity value that result in the minimum sum of the costs, and determines the specified disparity value as the disparity value of the pixel of interest with integer accuracy. Furthermore, using every pixel of the base image as the pixel of interest, disparity selector 603 determines the disparity value of said pixel with integer accuracy. Sub-pixel disparity estimator 104 estimates the disparity value with sub-pixel accuracy on the basis of the disparity value with integer accuracy.

Embodiment 7

Disparity estimation device 700 according to Embodiment 7 will be described. In order to match the boundary line generated due to a difference in the disparity value in the disparity image and the contour of a subject such as the boundary between the foreground and the background, disparity estimation device 600 according to Embodiment 6 calculates the difference degree or the cost for the plurality of comparison regions set for a single pixel of interest, and thus determines the disparity value of the pixel of interest with integer accuracy. Disparity estimation device 700 according to Embodiment 7 weights, at the time of calculating the Hamming distance which is a difference degree between the pixel of interest of the base image and the reference pixel of the reference image, the difference between bits between the bit sequences of the census feature amounts of the two pixels with the luminance difference which is a difference between the pixel values of corresponding pixels in the census transform. In Embodiment 7, structural elements that are substantially the same as those in Embodiments 1 to 6 will be given the same reference numerals as those in Embodiments 1 to 6, and description thereof will be omitted. The following description will focus on differences from Embodiments 1 to 6 while omitting details that are substantially the same as those in Embodiments 1 to 6.

Figure 45:
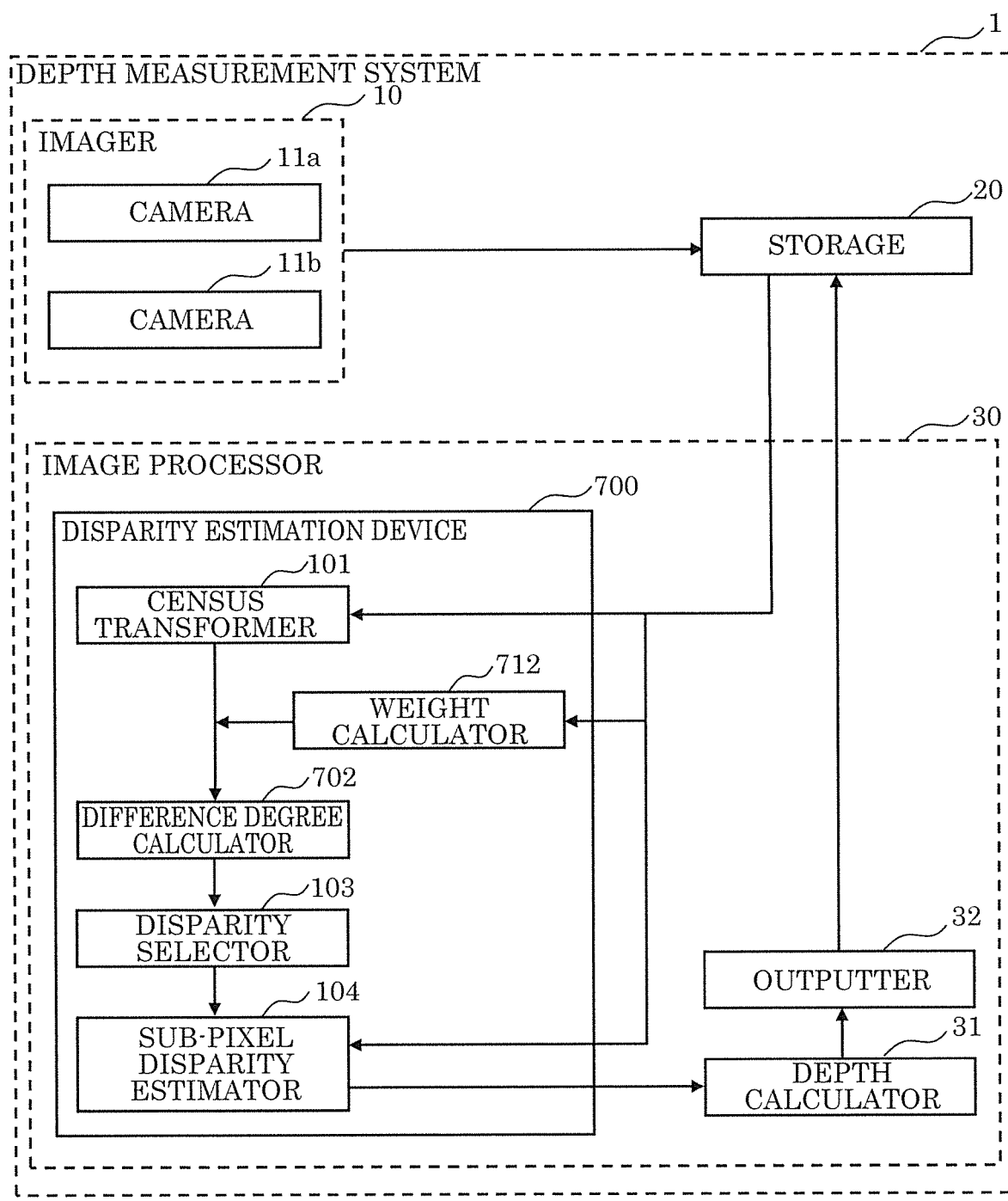
FIG. 45 is a block diagram showing an example of a functional configuration of a disparity estimation device according to Embodiment 7.

FIG. 45 is a block diagram showing an example of a functional configuration of disparity estimation device 700 according to Embodiment 7. As shown in FIG. 45, disparity estimation device 700 includes census transformer 101, difference degree calculator 702, disparity selector 103, and sub-pixel disparity estimator 104, similar to Embodiment 1, and further includes weight calculator 712. Census transformer 101, disparity selector 103, and sub-pixel disparity estimator 104 are substantially the same as those in Embodiment 1.

For the pixel of interest of the base image among captured images I1 and I2, weight calculator 712 calculates a weight corresponding to the luminance difference between the pixel of interest and the reference pixel of the reference image which corresponds to the position of the disparity value within the search range in the calculation of the difference degree. Weight calculator 712 calculates, using each pixel of the base image as the pixel of interest, a weight between the pixel of interest and the reference pixel. Weight calculator 712 outputs the calculated weight to difference degree calculator 702. The weight can be represented by Expressions 3 and 4 below.

[Math. 3]

$$\Delta I(x,y,d)=|I_1(x,y)-I_2(x+d,y)| \quad \text{(Expression 3)}$$

[Math. 4]

$$w(x,y,d)=f(\Delta I) \quad \text{(Expression 4)}$$

In Expressions 3 and 4 above, captured image I1 is used as the base image. In these expressions, d is a disparity value within the search range, $I_1(x, y)$ is a luminance value relevant to the pixel of interest having pixel coordinates (x, y) in captured image I1, and $I_2(x+d, y)$ is a luminance value relevant to the reference pixel. The reference pixel is located offset by disparity value d in the positive direction along the X-axis relative to the co-located pixel of the reference image which has the same pixel coordinates as the pixel of interest. In the expressions, $\Delta I(x, y, d)$ is a difference between the aforementioned luminance values of the pixel of interest and the reference pixel, w(x, y, d) is a weight corresponding to $\Delta I(x, y, d)$, and f is a transformation such as a polynomial expression. Weight w has a large value when $\Delta I$ is 0, and has a small value when $\Delta I$ has a large value. In the present embodiment, weight w is reduced as $\Delta I$ increases. Although details will be described later, $I_1(x, y)$ includes a plurality of luminance values of the pixel of interest and pixels around the pixel of interest and $I_2(x+d, y)$ includes a plurality of luminance values of the reference pixel and pixels around the reference pixel in the present embodiment. ΔI(x, y, d) includes differences between the plurality of luminance values of corresponding pixels. w(x, y, d) includes a plurality of weights corresponding to the number or amount of pairs of corresponding pixels.

Difference degree calculator 702 performs weighting according to the luminance difference between co-located pixels at the time of calculating the Hamming distance which is difference degree corresponding to the disparity value between the census feature amounts in captured images I1 and I2. Specifically, for example, in the case where captured image I1 is the base image, at the time of calculating the difference degree of the pixel of interest of the base image, difference degree calculator 702 weights, with weight w calculated by weight calculator 712, the difference between bits which is a difference in value at the same digit between the bit sequence of the census feature amount of the pixel of interest and the bit sequence of the census feature amount of the reference pixel of captured image I2 serving as the reference image. As described above, weight w is small when the luminance difference between the co-located pixels is large, and is large when the luminance difference between the co-located pixels is small. Thus, the difference between bits of the Hamming distance in the case where the luminance difference between the co-located pixels is small is extensively reflected to the Hamming distance, and the difference between bits of the Hamming distance in the case where the luminance difference between the co-located pixels is large has small effects on the Hamming distance.

Figure 46:
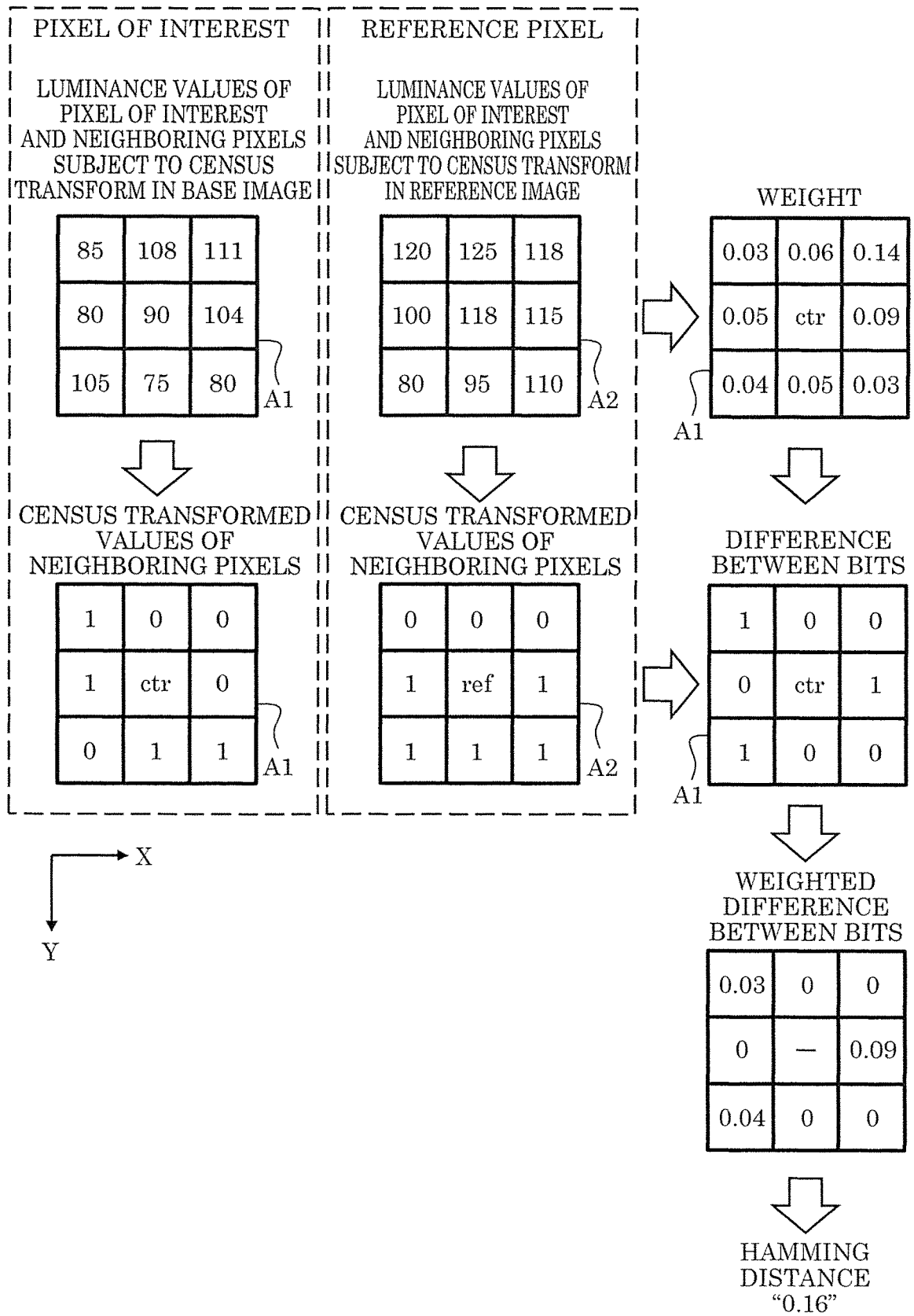
FIG. 46 shows an example of the relationship of a weight based on a luminance difference and a difference between bits for a pixel of interest and a reference pixel.

For example, FIG. 46 shows an example of the relationship of the weight based on the luminance difference and the difference between bits for the pixel of interest and the reference pixel. FIG. 46 shows the case where eight neighboring pixels are referred to at the time of the census transform. In FIG. 46, weight calculator 712 performs processing using captured image I1 as the base image and captured image I2 as the reference image. Weight calculator 712 obtains, from captured image I1, the luminance values of neighboring pixels of pixel of interest ctr in the comparison region in the base image on the basis of the comparison region in the census transform. The neighboring pixels are eight pixels that are referred to in the census transform for pixel of interest ctr. Furthermore, weight calculator 712 obtains, from captured image I2, the luminance values of neighboring pixels of reference pixel ref in the comparison region in the reference image on the basis of the comparison region in the census transform. Reference pixel ref is included in the search range and used to calculate the difference degree for pixel of interest ctr, and the neighboring pixels of reference pixel ref are eight pixels that are referred to in the census transform for reference pixel ref.

According to Expression 3 above, weight calculator 712 calculates the difference between the luminance values of co-located neighboring pixels, which are neighboring pixels located in the same position with respect to the comparison region, specifically, the absolute value of the difference between the luminance values, in comparison region A1 for pixel of interest ctr and comparison region A2 for reference pixel ref. Furthermore, weight calculator 712 calculates, for each of the eight pairs of co-located neighboring pixels, the weight based on the difference between the luminance values according to Expression 4 above. In the present embodiment, weight calculator 712 calculates, as the weight, the reciprocal of the difference between the luminance values. Note that the weight is not limited to this example and may be anything that is small when the difference between the luminance values is large and is large when the difference between the luminance values is small, such as the square of the reciprocal of the difference between the luminance values. For example, weight calculator 712 calculates weight "0.03" based on the difference between the luminance values for a neighboring pixel having luminance value "85" in comparison region A1 and a neighboring pixel having luminance value "120" in comparison region A2. Weight calculator 712 calculates the weight for each of the eight neighboring pixels in comparison region A1.

Difference degree calculator 702 calculates, from the census feature amount of the pixel of interest and the census feature amount of the reference pixel, the difference between bits in the bit sequences of the census feature amounts. Difference degree calculator 702 compares the census transformed values of the neighboring pixels in comparison region A1 with respect to pixel of interest ctr and the census transformed values of the neighboring pixels in comparison region A2 with respect to reference pixel ref, and calculates the differences between bits based on whether or not the census transformed values of the co-located pixels located in the same position with respect to the comparison regions are the same. For example, difference degree calculator 702 calculates difference between bits "1" for census transformed value "1" at the upper left corner of comparison region A1 and census transformed value "0" at the upper left corner of comparison region A2. Difference degree calculator 702 calculates the difference between bits for each of the eight neighboring pixels in comparison region A1.

Furthermore, difference degree calculator 702 calculates, from the weights on the neighboring pixels in comparison region A1 and the differences between bits for the neighboring pixels in comparison region A1, the weighted difference between bits which is a difference between bits after weighting on the neighboring pixels in comparison region A1. Difference degree calculator 702 calculates the weighted difference between bits by multiplying the weight and the difference between bits that correspond to the same neighboring pixel in comparison region A1. For example, difference degree calculator 702 calculates weighted difference between bits "0.03" by multiplying weight "0.03" and difference between bits "1" for the neighboring pixel at the upper left corner of comparison region A1.

Furthermore, difference degree calculator 702 calculates, as the difference degree of pixel of interest ctr, the sum of the weighted differences between bits for the neighboring pixels of pixel of interest ctr. In the example of FIG. 45, difference degree calculator 702 calculates, as the difference degree of pixel of interest ctr, sum of weighted differences between bits "0.03+0.09+0.04=0.16" for the neighboring pixels in comparison region A1.

Disparity selector 103 extracts the minimum difference degree among the difference degrees calculated by difference degree calculator 702 between the pixel of interest and each reference pixel within the search range in the reference image, and determines, as the disparity value of the pixel of interest with integer accuracy, the disparity value corresponding the extracted difference degree.

Figure 47:
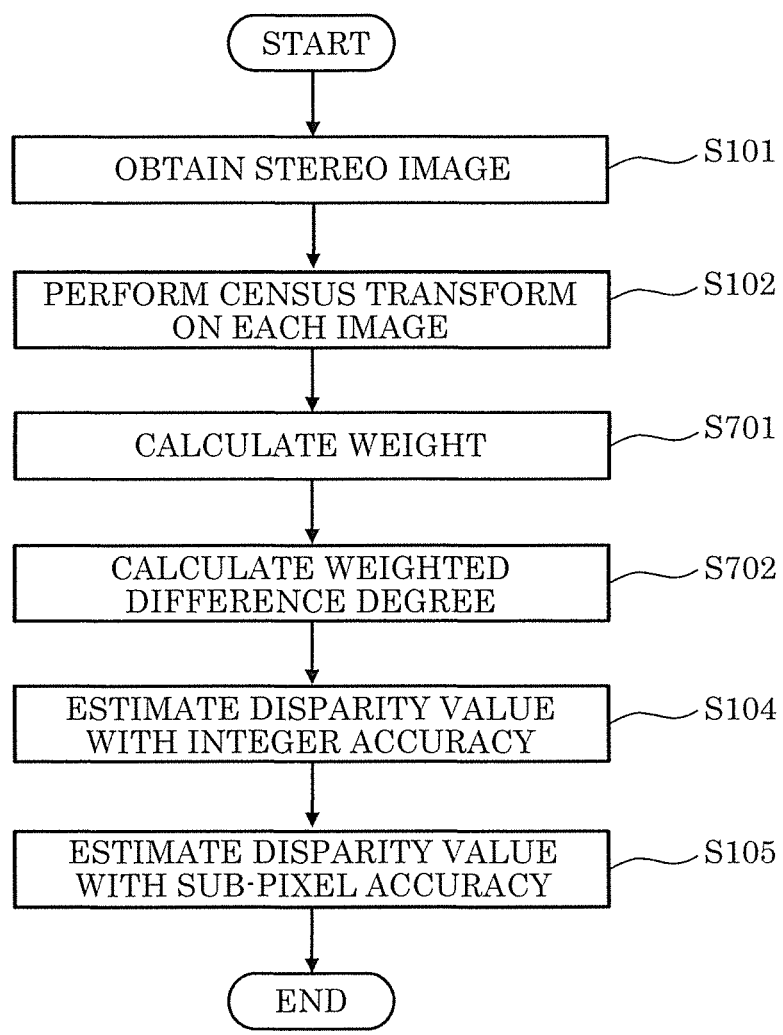
FIG. 47 is a flowchart showing an example of operations of a disparity estimation device according to Embodiment 7.

With reference to FIG. 47, operations of disparity estimation device 700 will be described. FIG. 47 is a flowchart showing an example of operations of disparity estimation device 700 according to Embodiment 7. In Step S101, as in Embodiment 1, census transformer 101 obtains, from storage 20, captured images I1 and I2 which are stereo images respectively captured by cameras 11a and 11b. In the following description, it is assumed that disparity estimation device 700 treats captured image I1 as the base image and captured image I2 as the reference image.

Next, in Step S102, census transformer 101 calculates the census feature amounts of each pixel of the base image and each pixel of the reference image and outputs the census feature amounts to difference degree calculator 702.

Next, in Step S701, weight calculator 712 obtains captured images I1 and I2 from storage 20 and calculates, for the pixel of interest of captured image I1 serving as the base image, a weight corresponding to the luminance difference between the pixel of interest and the reference pixel of the reference image which corresponds to the position of the disparity value within the search range in the calculation of the difference degree. Weight calculator 712 calculates only the weight corresponding to the luminance difference between a neighboring pixel of the pixel of interest and a neighboring pixel of the reference pixel. Weight calculator 712 calculates, using each pixel of the base image as the pixel of interest, the weight for the pixel, and outputs the calculated weight to difference degree calculator 702. Note that the order of Steps S102 and S701 may be reversed.

Next, in Step S702, difference degree calculator 702 calculates, using each pixel of the base image as the pixel of interest, the difference degree of the pixel of interest with respect to the reference pixel within the search range in the reference image from the weight of the pixel of interest, the census feature amount of the pixel of interest, and the census feature amount of the reference pixel. In other words, difference degree calculator 702 calculates the weighted difference degree. Difference degree calculator 702 calculates the weighted difference degree using the weighted difference between bits obtained by adding a weight to the difference between bits in the bit sequences of the census feature amounts of the pixel of interest and the reference pixel. Difference degree calculator 702 calculates, using each pixel of the base image as the pixel of interest, the weighted difference degree of the pixel, and outputs the calculated difference degree to disparity selector 103.

Next, in Step S104, as in Embodiment 1, disparity selector 103 determines the disparity value of each pixel of the base image with integer accuracy on the basis of the weighted difference degree of the pixel of the base image, and outputs the determined disparity value to sub-pixel disparity estimator 104.

Next, in Step S105, as in Embodiment 1, sub-pixel disparity estimator 104 obtains captured images I1 and I2 from storage 20, and estimates, by using captured images I1 and I2 and the disparity value of each pixel of captured image I1, that is, the base image, with integer accuracy, the disparity value of the pixel of the base image with sub-pixel accuracy.

With disparity estimation device 700 according to Embodiment 7 described above, it is possible to obtain advantageous effects that are the same as or similar to those produced in Embodiment 1. Furthermore, disparity estimation device 700 performs, on the difference degree between the pixel of interest of the base image and the reference pixel of the reference image, weighting based on the difference between the luminance value of a neighboring pixel which is referred to in the census transform on the pixel of interest and the luminance value of a neighboring pixel which is referred to in the census transform on the reference pixel. This weighting increases as the difference between the luminance values becomes smaller, and decreases as the difference between the luminance values becomes greater. A constituent of the difference degree having a small luminance difference is extensively reflected to the difference degree, and a constituent of the difference degree having a large luminance difference has small effects on the difference degree. In such weighting, the inside of the comparison region can be spatially weighted even when the position of the comparison region with respect to the pixel of interest is only the center of the comparison region, for example, meaning that the position of the center of gravity with respect to the comparison region can be adaptively changed. This means that it is possible to obtain advantageous effects that are the same as or similar to those virtually produced by adaptive movement of the comparison region with respect to the pixel of interest. Accordingly, the difference degree reflects a change in the pixel value. Thus, only by using a single comparison region for the pixel of interest, disparity estimation device 700 is capable of accurately matching the position of the contour of a subject and the position of the boundary generated due to a difference in the disparity value in the disparity image for pixels located close to the boundary of occlusion or the boundary between the foreground and the background at which the disparity value changes.

Note that the weighting on the difference between bits is not limited to the weighting associated with the luminance difference between the co-located pixels in the comparison regions for the pixel of interest and the reference pixel, but may be associated with the difference between the luminance gradients at the co-located pixels, or as a further simplified example, may be the luminance gradient of the pixel of interest or the co-located pixel. Yet alternatively, the above-described weighting may be modified to use a combination of at least two of the luminance difference between the co-located pixels, the difference between the luminance gradients at the co-located pixels, and the luminance gradient of the pixel of interest or the co-located pixel. The above-described weighting is set to increase as the luminance difference, the difference between the luminance gradients, or the luminance gradient of the pixel of interest or the co-located pixel becomes greater, and decrease as the luminance difference, the difference between the luminance gradients, or the luminance gradient of the pixel of interest or the co-located pixel becomes smaller. Such weighting also produces advantageous effects that are the same as or similar to those produced in the case of the weighting in which the luminance difference between the co-located pixels is used. The luminance gradient may be a gradient along the X-axis of the pixel coordinates, may be a gradient along the Y-axis of the pixel coordinates, may be a gradient in consideration of both the gradients along the X-axis and the Y-axis of the pixel coordinates, or may be a gradient in any other direction.

As described above, for the pixel of interest of the base image and the reference pixel of the reference image which are used to calculate the difference degree, disparity estimation device 700 may add, to the difference degree, a weight based on at least one of the difference between the luminance value of a pixel around the pixel of interest and the luminance value of a pixel around the reference pixel, the difference between the luminance gradient of a pixel around the pixel of interest and the luminance gradient of a pixel around the reference pixel, and the luminance gradient of the pixel of interest, the reference pixel, or a pixel around the pixel of interest or the reference pixel.

Disparity estimation device 700 according to Embodiment 7 is configured using, as a base, disparity estimation device 100 according to Embodiment 1, but may be configured using, as a base, those according to Embodiments 2 to 6 and variations thereof.

Figure 48:
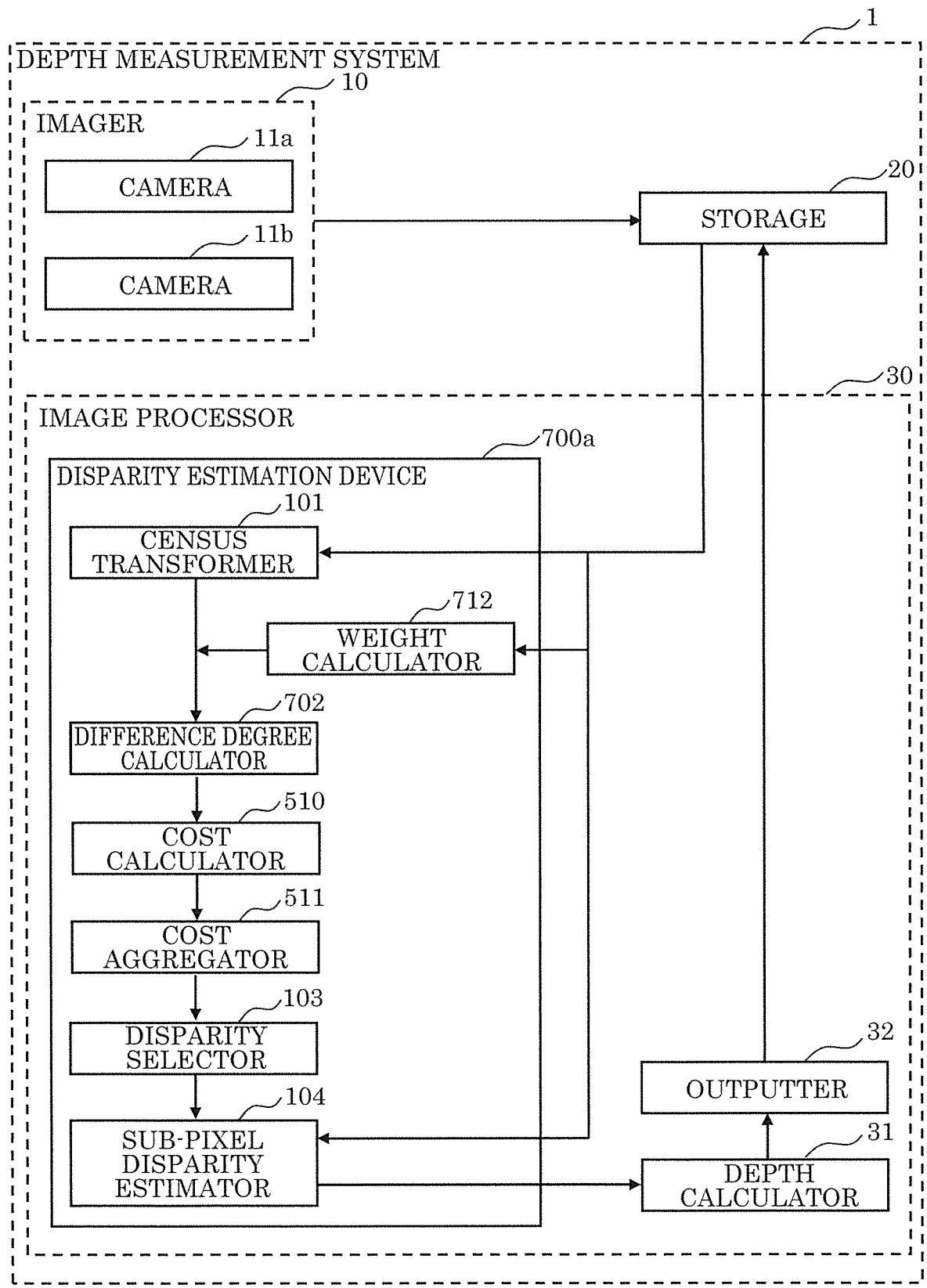
FIG. 48 is a block diagram showing an example of a functional configuration of a disparity estimation device according to a variation of Embodiment 7.

For example, disparity estimation device 700a according to a variation of Embodiment 7 which is based on Embodiment 5 is configured as shown in FIG. 48. In disparity estimation device 700a according to the variation, as in Embodiment 7, weight calculator 712 calculates, for every pixel of captured image I1 serving as the base image, the weight between the pixel and the reference pixel of captured image I2 serving as the reference image. Difference degree calculator 702 calculates the weighted difference degree for every pixel of the base image.

Using every pixel of the base image as the pixel of interest, cost calculator 510 calculates costs of the pixel of interest which are associated with the distribution of disparity values on each of the plurality of straight lines passing through the pixel of interest. For each pixel on each of the straight lines, cost calculator 510 calculates, as the cost of the pixel of interest, a value obtained by further weighting the weighted difference degree corresponding to each disparity value within the search range for calculating the difference degree on the basis of the difference between the disparity value within the search range and the disparity value of a pixel adjacent to said pixel. Cost aggregator 511 aggregates the costs of the pixel of interest by adding up, for each disparity value within the search range, the costs calculated for the respective pixels on the plurality of straight lines passing through the pixel of interest, that is, by calculating the sum of costs for each disparity value. Disparity selector 103 extracts the minimum sum of the costs of the pixel of interest from the sums of the costs which have been calculated for the respective disparity values within the search ranges, specifies the disparity value resulting in the minimum sum of the costs, and determines the specified disparity value as the disparity value of the pixel of interest with integer accuracy. Furthermore, using every pixel of the base image as the pixel of interest, disparity selector 103 determines the disparity value of said pixel with integer accuracy. Sub-pixel disparity estimator 104 estimates the disparity value with sub-pixel accuracy on the basis of the disparity value with integer accuracy.

Note that although disparity estimation device 700a according to the variation performs the weighting on the difference degree, this is not the only example; the same or similar weighting may be performed on each pixel at the time of cost calculation or cost aggregation. Even in such a case, it is possible to obtain the same or similar advantageous effects.

Specifically, in the case of the cost of pixel of interest $I1p_i$ shown in FIG. 34, the values of penalty values P1 an P2 are weighted according to the luminance difference between the pixel of interest and the co-located pixel, the difference between the luminance gradients at the pixel of interest and the co-located pixels, or a combination thereof. As a further simplified example, penalty values P1 and P2 may be weighted according to the luminance gradient of the pixel of interest or the co-located pixel. In the case where the disparity value is 0, the co-located pixel is a pixel of the reference image that has, as an x-coordinate, xb−0=xb where xb represents the value of the x-coordinate of pixel of interest $I1p_i$ of the base image. Likewise, in the case where the disparity value is −1, the co-located pixel is a pixel of the reference image that has, as an x-coordinate, xb−1, and in the case where the disparity value is −k, the co-located pixel is a pixel of the reference image that has, as an x-coordinate, xb−k. Note that the y-coordinate of each of the co-located pixels of the reference image is equal to the y-coordinate of pixel of interest $I1p_i$ of the base image.

The above-described weighting is set to increase as the luminance difference, the difference between the luminance gradients, or the luminance gradient of the pixel of interest or the co-located pixel becomes greater, and decrease as the luminance difference, the difference between the luminance gradients, or the luminance gradient of the pixel of interest or the co-located pixel becomes smaller. The luminance gradient may be a gradient along the X-axis of the pixel coordinates, may be a gradient along the Y-axis of the pixel coordinates, may be a gradient in consideration of both the gradients along the X-axis and the Y-axis of the pixel coordinates, or may be a gradient in any other direction.

As described above, the disparity estimation device may add, to the penalty value which is the first evaluation value, a weight based on at least one of the difference between the luminance value of pixel of interest $I1p_i$ which is the first evaluation pixel and the luminance value of a pixel within the search range for the co-located pixel for pixel of interest $I1p_i$, the difference between the luminance gradient of pixel of interest $I1p_i$ and the luminance gradient of a pixel within the above search range, and the luminance gradient of the pixel of interest $I1p_i$ or a pixel within the above search range.

Other Embodiments

Although the disparity estimation devices according to one or more aspects have been described thus far based on the above embodiments and variations thereof, the present disclosure is not limited to these embodiments and variations. Various modifications to the embodiments and variations that can be conceived by those skilled in the art, and forms configured by combining structural elements in different embodiments and variations without departing from the teachings in the present disclosure may be included in the scope of the one or more aspects.

For example, in the disparity estimation devices according to the embodiments and the variations, the disparity selector determines, as the disparity value with integer pixel accuracy, the disparity value resulting in the minimum difference degree or cost (also referred to as the "disparity value based on the census feature amount"). The sub-pixel disparity estimator calculates, using the disparity value with integer pixel accuracy, the optimal value of the sub-pixel evaluation value based on the luminance difference for the first to third reference pixels. In this case, the disparity value based on the census feature amount with integer pixel accuracy and the disparity value of a pixel having the smallest or largest sub-pixel evaluation value among the first to third reference pixels with integer pixel accuracy (also referred to as the "disparity value based on the luminance difference) are treated as matching each other. For example, in the example of FIG. 23, the disparity value of the first reference pixel having the smallest sub-pixel evaluation value with integer pixel accuracy corresponds to the disparity value based on the luminance difference.

However, these do not need to match each other. In this case, the disparity value corresponding to the disparity value based on the census feature amount and the disparity value based on the luminance difference may be determined by selecting −0.5 or 0.5 as a decimal disparity value in consideration of the continuity with neighboring disparity values. Specifically, among the pixels at which the disparity values based on the census feature amount and based on the luminance difference with integer pixel accuracy do not match each other, a pixel adjacent to the pixel at which the two disparity values with integer pixel accuracy match each other selectively has a decimal disparity value with a sign given in the case where the difference between the disparity value of the pixel adjacent to the pixel of interest and the disparity value of the pixel of interest is smaller between when the decimal disparity value of the pixel of interest which is said pixel is set to +0.5 and when the decimal disparity value of the pixel of interest is set to −0.5. The selected disparity value +0.5 or −0.5 can be the decimal disparity value of the pixel of interest. Note that the disparity value based on the census feature amount is used as the integer value of the disparity value of the pixel of interest. In other words, a disparity value obtained by adding the selected disparity value +0.5 or −0.5 to the disparity value based on the census feature amount is used instead of the disparity value of the pixel of interest with integer pixel accuracy. By repeating the above-described process, disparity values in a region where the disparity values based on the census feature amount and based on the luminance difference with integer pixel accuracy do not match can be sequentially determined using neighboring disparity values. Note that the selected disparity value is not limited to +0.5 or −0.5 and may be any value between −1.0 and +1.0.

As described above, when the disparity value based on the census feature amount which is the first disparity value and the disparity value based on the luminance difference which is the third disparity value corresponding to the reference pixel resulting in the maximum value or the minimum value of the plurality of sub-pixel evaluation values do not match each other for the pixel of interest which is the first pixel, the disparity estimation device determines the disparity value of −0.5 or 0.5 as the decimal disparity value on the basis of the continuity of the disparity values between the pixel of interest and a neighboring pixel, and uses, instead of the disparity value based on the census feature amount, a disparity value obtained by adding the determined disparity value to the disparity value based on the census feature amount.

Figure 49:
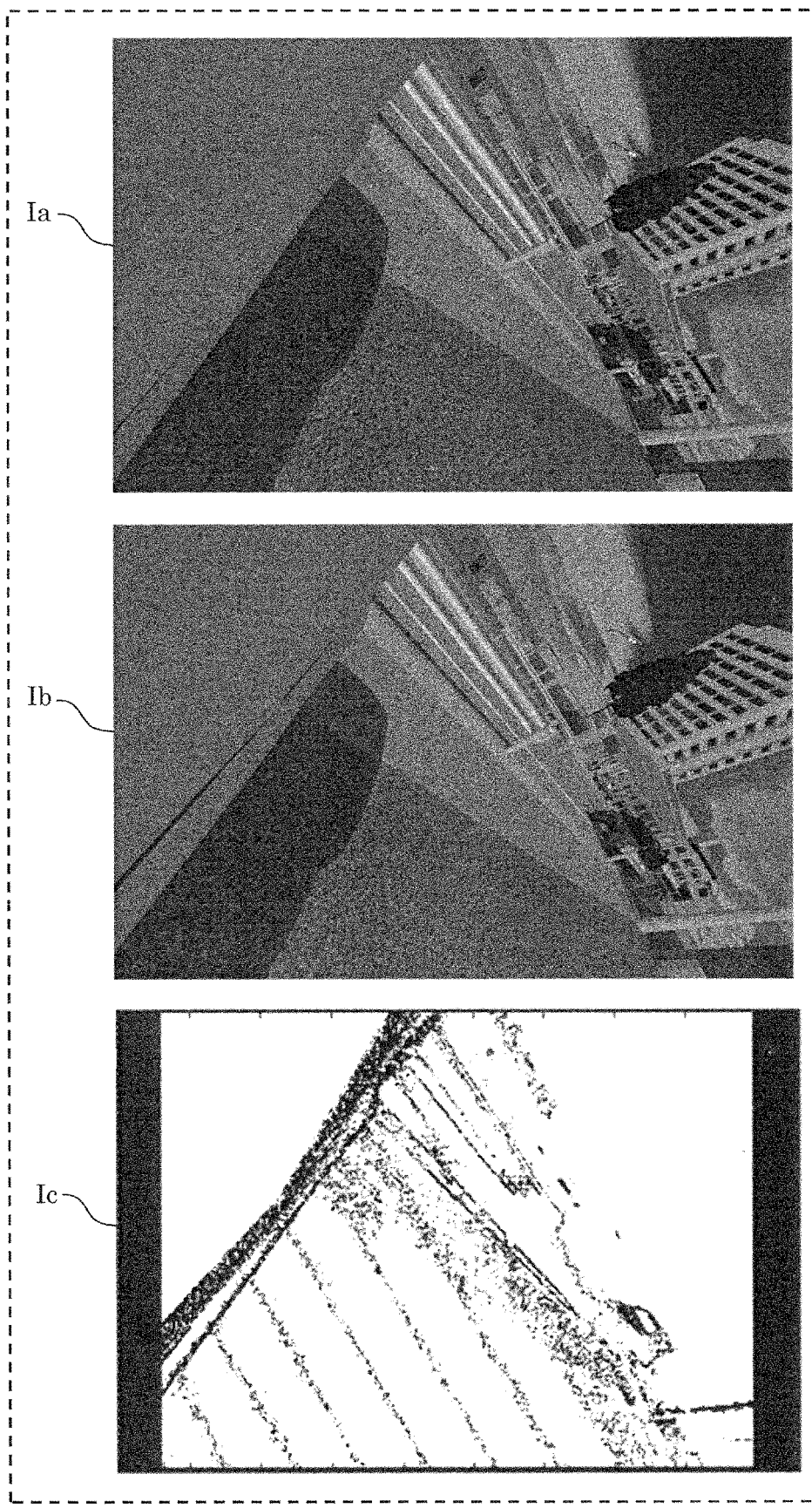
FIG. 49 shows an example of the matching level of disparity values with integer pixel accuracy that result in the minimum value or the maximum value of each of a difference degree or cost based on a census transformed value and a sub-pixel evaluation value based on a luminance difference.

For example, FIG. 49 shows an example of the matching level of disparity values with integer pixel accuracy that result in the minimum value or the maximum value of each of the difference degree or cost based on the census transformed value and the sub-pixel evaluation value based on the luminance difference. FIG. 49 shows images Ia and Ib and image Ic indicating the match and mismatch between the disparity values with integer pixel accuracy. In image Ic, a colorless pixel is a pixel at which the disparity values match each other, and a black pixel is a pixel at which the disparity values do not match each other. Images Ia and Ib are CG images assumed to have been captured by in-vehicle cameras and obtained in the case where the stereo camera are mounted after rotating 90 degrees from the horizontal arrangement state to the vertical arrangement state. In actuality, image Ia is captured by the camera disposed on the lower side, and image Ib is captured by the camera disposed on the upper side. The lower region in each of images Ia and Ib is a road surface region. In this road surface region, the disparity value is continuously reduced in a direction from the left to the right in images Ia and Ib. In the road surface region in image Ic, black pixels, in other words, mismatch of the disparity values with integer pixel accuracy periodically appear. A cause of the aforementioned mismatch is that when the disparity value has a fractional value of ±0.5 with respect to the disparity value with integer pixel accuracy, the determination of the disparity value with integer accuracy resulting in the minimum value or the maximum value of both of the difference degree or the cost and the sub-pixel evaluation value is unstable. Therefore, when the both do not match each other, −0.5 or 0.5 can be selected as the decimal disparity value in consideration of the continuity with neighboring disparity values to improve the accuracy in estimating the disparity value.

The disparity estimation devices according to the embodiments and the variations estimate the disparity value between the images captured by two cameras 11a and 11b, but this is not limiting. The disparity estimation device may estimate the disparity value between images captured by three or more cameras. In this case, the disparity estimation device may estimate, for each pair of two cameras among the three or more cameras, the disparity value between two images captured by the pair.

Furthermore, as mentioned above, the technique in the present disclosure may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a CD-ROM.

For example, the processors included in the disparity estimation devices according to the above embodiments and variations are typically implemented as large-scale integration (LSI) which is an integrated circuit. These processors may be integrated into individual chips, or a portion or all of the processors may be integrated into one chip.

Moreover, the method of circuit integration is not limited to the LSI; the circuit integration may be implemented as a dedicated circuit or a general purpose processor. A field programmable gate array (FPGA) that can be programmed after manufacturing the LSI or a reconfigurable processor that allows reconfiguration of the connection or configuration of the inner circuit cells of the LSI can be used for the same purpose.

Note that each of the structural elements in each of the above embodiments and variations may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

A portion or all of the structural elements may each be configured from a detachable integrated circuit (IC) card or a stand-alone module. The IC card and the module are computer systems configured from a microprocessor, ROM, and RAM, for example. The IC card and the module may include the above-described LSI or system LSI. The IC card and the module achieve their function as a result of the microprocessor operating according to a computer program. The IC card and the module may be tamperproof.

The disparity estimation method according to the present disclosure may be implemented using processors such as a micro processing unit (MPU) and a CPU, a circuit such as an LSI, an IC card or a stand-alone module, etc.

In addition, the technique in the present disclosure may be implemented as a software program or digital signals including a software program or may be a non-transitory computer-readable recording medium on which such program is recorded. Furthermore, it should be obvious that the program can also be distributed via a transmission medium such as the Internet.

Furthermore, all the numerical figures used above such as an ordinal number and the number or amount are given as examples to describe the technique in the present disclosure in specific terms, and thus the present disclosure is not limited by such illustrative numerical figures. Moreover, the connection relationship between the structural elements is provided as an example for describing the technique in the present disclosure in specific terms, and the connection relationship for implementing the functions in the present disclosure is not limited to this.

Furthermore, the partitioning of function blocks in the block diagrams is an example; multiple function blocks may be integrated into a single function block, a single function block may be divided into two or more blocks, and part of a function may be transferred to another function block. In addition, the functions of two or more function blocks having similar functions may be processed by a single hardware or software through parallel processing or time division.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The technique in the present disclosure is useful as a technique for estimating a disparity value with sub-pixel accuracy between images captured by cameras. The technique in the present disclosure is useful as any technique in which the disparity value between images captured by cameras is used such as a depth sensor which uses cameras and is mounted on a vehicle, a watercraft, an aircraft, a robot, or the like.

What is claimed is:

1. A disparity estimation device, comprising:
a processor; and
a memory,
wherein the processor performs:
(a) obtaining, from the memory, a first image captured by a first camera disposed in a first position and a second image captured by a second camera disposed in a second position, the first image including a plurality of first pixels, the second image including a plurality of second pixels;
(b) calculating, for each of the plurality of first pixels, a first census feature amount based on a comparison between a pixel value of the first pixel and a pixel value of a neighboring pixel of the first pixel in the first image, and calculating, for each of the plurality of second pixels, a second census feature amount based on a comparison between a pixel value of the second pixel and a pixel value of a neighboring pixel of the second pixel in the second image;
(c) calculating, for each of the plurality of first pixels, a difference degree corresponding to a disparity value in a position of each of at least one of the plurality of second pixels with respect to the first pixel using the first census feature amount and the second census feature amount of the at least one second pixel;
(d) obtaining a first disparity value of each of the plurality of first pixels with integer pixel accuracy by selecting, using the difference degree, a disparity value corresponding to a lowest difference degree;
(e) extracting, for each of the plurality of first pixels, a plurality of reference pixels located in positions corresponding to the first disparity value of the first pixel and an additional disparity value different than the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and
(f) obtaining a per-pixel disparity value in a disparity image for the first image with respect to the second image using the second disparity value of each of the plurality of first pixels.

2. The disparity estimation device according to claim 1, wherein the plurality of first pixels include a third pixel, a fourth pixel, and a fifth pixel,
the plurality of second pixels include a sixth pixel, a seventh pixel, and an eighth pixel,
each of the fourth pixel and the fifth pixel is a neighboring pixel of the third pixel located within a predetermined distance from the third pixel in the first image,
each of the seventh pixel and the eighth pixel is a neighboring pixel of the sixth pixel located within a predetermined distance from the sixth pixel in the second image, and
in (b), the first census feature amount of the third pixel includes a comparison value between a pixel value of the third pixel and a pixel value of the fourth pixel and a comparison value between the pixel value of the third pixel and a pixel value of the fifth pixel, and
the second census feature amount of the sixth pixel includes a comparison value between a pixel value of the sixth pixel and a pixel value of the seventh pixel and a comparison value between the pixel value of the sixth pixel and a pixel value of the eighth pixel.

3. The disparity estimation device according to claim 1, wherein the processor calculates a Hamming distance between the first census feature amount and the second census feature amount as the difference degree.

4. The disparity estimation device according to claim 1, wherein, in (e), the processor performs:
(e-1) extracting, from the plurality of second pixels, a first reference pixel, a second reference pixel, and a third reference pixel which are located in positions corresponding to the first disparity value of the first pixel, a first additional disparity value different than the first disparity value, and a second additional disparity value different than the first disparity value, respectively;
(e-2) calculating a first sub-pixel evaluation value based on a difference between (i) the pixel value of the first pixel and the pixel value of the neighboring pixel of the first pixel and (ii) a pixel value of the first reference pixel and a pixel value of a neighboring pixel of the first reference pixel;
(e-3) calculating a second sub-pixel evaluation value based on a difference between (i) the pixel value of the first pixel and the pixel value of the neighboring pixel of the first pixel and (ii) a pixel value of the second reference pixel and a pixel value of a neighboring pixel of the second reference pixel;
(e-4) calculating a third sub-pixel evaluation value based on a difference between (i) the pixel value of the first pixel and the pixel value of the neighboring pixel of the first pixel and (ii) a pixel value of the third reference pixel and a pixel value of a neighboring pixel of the third reference pixel; and (e-5) estimating the second disparity value of the first pixel by equiangular fitting in which a set of the first sub-pixel evaluation value and the first disparity value, a set of the second sub-pixel evaluation value and the first additional disparity value, and a set of the third sub-pixel evaluation value and the second additional disparity value are used.

5. The disparity estimation device according to claim 1, wherein, between (c) and (d), the processor performs (g) including:

for each of evaluation pixels which is one of the plurality of first pixels located in a predetermined direction from a pixel of interest which is one of the plurality of first pixels that has a disparity value to be estimated in the first image, (g-1) calculating a first evaluation value for each of the plurality of second pixels that is located within a search range based on a comparison between a disparity value of a second evaluation pixel adjacent to a first evaluation pixel in the predetermined direction and a disparity value of the second pixel within the search range with respect to a co-located pixel located in the second image and corresponding to the first evaluation pixel, the search range being used to calculate the difference degree, the first evaluation pixel and the second evaluation pixel being included in the evaluation pixels;

(g-2) calculating a second evaluation value for the disparity value of each of the plurality of second pixels within the search range based on a difference degree between the first evaluation pixel and the second pixel within the search range and the first evaluation value for the second pixel within the search range; and (g-3) calculating an addition evaluation value by adding up second evaluation values for all the evaluation pixels corresponding to the disparity value of each of the plurality of second pixels within the search range, and in (d), the disparity value corresponding to the smallest addition evaluation value is determined as the first disparity value of the pixel of interest.

6. The disparity estimation device according to claim 1, wherein, in (e), when the first disparity value and a third disparity value corresponding to one of the plurality of second pixels that results in one of a maximum value and a minimum value of the plurality of sub-pixel evaluation values do not match each other for the first pixel, the processor determines a disparity value of −0.5 or 0.5 as a decimal disparity value based on continuity of disparity values between the first pixel and the neighboring pixel of the first pixel, and uses, instead of the first disparity value, a disparity value obtained by adding the disparity value determined to the first disparity value.

7. The disparity estimation device according to claim 1, wherein, in (b), the processor performs:

(b-1) determining, as a comparison region which is a region of neighboring pixels to be compared upon calculating a census feature amount of a current pixel, a plurality of comparison regions each of which includes the current pixel and which are in different positions with respect to the current pixel; and (b-2) calculating, for each of the plurality of comparison regions, the first census feature amount of the plurality of first pixels and the second census feature amount of the plurality of second pixels, in (c), the processor calculates the difference degree for each of the plurality of comparison regions, and in (d), the processor obtains the first disparity value of the first pixel with integer pixel accuracy by selecting a disparity value corresponding to a lowest difference degree among the difference degrees for all the plurality of comparison regions.

8. The disparity estimation device according to claim 1, wherein, in (c), for the first pixel and the second pixel for which the difference degree is calculated, the processor adds, to the difference degree, a weight based on at least one of a difference between a luminance value that is the pixel value of the neighboring pixel of the first pixel and a luminance value that is the pixel value of the neighboring pixel of the second pixel and a difference between a luminance gradient of the neighboring pixel of the first pixel and a luminance gradient of the neighboring pixel of the second pixel.

9. The disparity estimation device according to claim 5, wherein, in (g), the processor adds, to the first evaluation value, a weight based on at least one of a difference between luminance values that is a difference between a pixel value of the first evaluation pixel and a pixel value of the second pixel within the search range, a difference between a luminance gradient of the first evaluation pixel and a luminance gradient of the second pixel within the search range, and a luminance gradient of one of the first evaluation pixel and the second pixel within the search range.

10. A disparity estimation method, comprising:

(a) obtaining a first image captured by a first camera disposed in a first position and a second image captured by a second camera disposed in a second position;

(b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image;

(c) calculating, for each of the plurality of first pixels, a difference degree corresponding to a disparity value in a position of each of at least one of the plurality of second pixels with respect to the first pixel using the first census feature amount and the second census feature amount of the at least one second pixel;

(d) obtaining a first disparity value of each of the plurality of first pixels with integer pixel accuracy by selecting, using the difference degree, a disparity value corresponding to a lowest difference degree;

(e) extracting, for each of the plurality of first pixels, a plurality of reference pixels located in positions corresponding to the first disparity value of the first pixel and an additional disparity value different than the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels, wherein at least one of (a) to (f) is performed by at least one processor.

11. The disparity estimation method according to claim 10, wherein the plurality of first pixels include a third pixel, a fourth pixel, and a fifth pixel, the plurality of second pixels include a sixth pixel, a seventh pixel, and an eighth pixel, each of the fourth pixel and the fifth pixel is a neighboring pixel of the third pixel located within a predetermined distance from the third pixel in the first image, each of the seventh pixel and the eighth pixel is a neighboring pixel of the sixth pixel located within a predetermined distance from the sixth pixel in the second image, and in (b), the first census feature amount of the third pixel includes a comparison value between a pixel value of the third pixel and a pixel value of the fourth pixel and a comparison value between the pixel value of the third pixel and a pixel value of the fifth pixel, and the second census feature amount of the sixth pixel includes a comparison value between a pixel value of the sixth pixel and a pixel value of the seventh pixel and a comparison value between the pixel value of the sixth pixel and a pixel value of the eighth pixel.

12. The disparity estimation method according to claim 10, wherein a Hamming distance between the first census feature amount and the second census feature amount is calculated as the difference degree.

13. The disparity estimation method according to claim 10, wherein, in (e), (e-1) a first reference pixel, a second reference pixel, and a third reference pixel which are located in positions corresponding to the first disparity value of the first pixel, a first additional disparity value different than the first disparity value, and a second additional disparity value different than the first disparity value, respectively, are extracted from the plurality of second pixels, (e-2) a first sub-pixel evaluation value is calculated, the first sub-pixel evaluation value being based on a difference between (i) the pixel value of the first pixel and the pixel value of the neighboring pixel of the first pixel and (ii) a pixel value of the first reference pixel and a pixel value of a neighboring pixel of the first reference pixel, (e-3) a second sub-pixel evaluation value is calculated, the second sub-pixel evaluation value being based on a difference between (i) the pixel value of the first pixel and the pixel value of the neighboring pixel of the first pixel and (ii) a pixel value of the second reference pixel and a pixel value of a neighboring pixel of the second reference pixel, (e-4) a third sub-pixel evaluation value is calculated, the third sub-pixel evaluation value being based on a difference between (i) the pixel value of the first pixel and the pixel value of the neighboring pixel of the first pixel and (ii) a pixel value of the third reference pixel and a pixel value of a neighboring pixel of the third reference pixel, and (e-5) the second disparity value of the first pixel is estimated by equiangular fitting in which a set of the first sub-pixel evaluation value and the first disparity value, a set of the second sub-pixel evaluation value and the first additional disparity value, and a set of the third sub-pixel evaluation value and the second additional disparity value are used.

14. The disparity estimation method according to claim 10, further comprising, between (c) and (d), (g) including:

for each of evaluation pixels which is one of the plurality of first pixels located in a predetermined direction from a pixel of interest which is one of the plurality of first pixels that has a disparity value to be estimated in the first image, (g-1) calculating a first evaluation value for each of the plurality of second pixels that is located within a search range based on a comparison between a disparity value of a second evaluation pixel adjacent to a first evaluation pixel in the predetermined direction and a disparity value of the second pixel within the search range with respect to a co-located pixel located in the second image and corresponding to the first evaluation pixel, the search range being used to calculate the difference degree, the first evaluation pixel and the second evaluation pixel being included in the evaluation pixels;

(g-2) calculating a second evaluation value for the disparity value of each of the plurality of second pixels within the search range based on a difference degree between the first evaluation pixel and the second pixel within the search range and the first evaluation value for the second pixel within the search range; and (g-3) calculating an addition evaluation value by adding up second evaluation values for all the evaluation pixels corresponding to the disparity value of each of the plurality of second pixels within the search range, and wherein, in (d), the disparity value corresponding to the smallest addition evaluation value is determined as the first disparity value of the pixel of interest.

15. The disparity estimation method according to claim 10, wherein, in (e), when the first disparity value and a third disparity value corresponding to one of the plurality of second pixels that results in one of a maximum value and a minimum value of the plurality of sub-pixel evaluation values do not match each other for the first pixel, a disparity value of −0.5 or 0.5 is determined as a decimal disparity value based on continuity of disparity values between the first pixel and the neighboring pixel of the first pixel, and a disparity value obtained by adding the disparity value determined to the first disparity value is used instead of the first disparity value.

16. The disparity estimation method according to claim 10, wherein, in (b):

(b-1) as a comparison region which is a region of neighboring pixels to be compared upon calculating a census feature amount of a current pixel, a plurality of comparison regions each of which includes the current pixel and which are in different positions with respect to the current pixel are determined; and (b-2) for each of the plurality of comparison regions, the first census feature amount of the plurality of first pixels and the second census feature amount of the plurality of second pixels are calculated, in (c), the difference degree for each of the plurality of comparison regions is calculated, and in (d), the first disparity value of the first pixel with integer pixel accuracy is obtained by selecting a disparity value corresponding to a lowest difference degree among the difference degrees for all the plurality of comparison regions.

17. The disparity estimation method according to claim 10, wherein, in (c), a weight is added to the difference degree for the first pixel and the second pixel for which the difference degree is calculated, the weight being based on at least one of a difference between a luminance value that is the pixel value of the neighboring pixel of the first pixel and a luminance value that is the pixel value of the neighboring pixel of the second pixel and a difference between a luminance gradient of the neighboring pixel of the first pixel and a luminance gradient of the neighboring pixel of the second pixel.

18. The disparity estimation method according to claim 14, wherein, in (g), a weight is added to the first evaluation value, the weight being based on at least one of a difference between luminance values that is a difference between a pixel value of the first evaluation pixel and a pixel value of the second pixel within the search range, a difference between a luminance gradient of the first evaluation pixel and a luminance gradient of the second pixel within the search range, and a luminance gradient of one of the first evaluation pixel and the second pixel within the search range.

19. A non-transitory computer-readable recording medium for use in a computer, the recording medium having a computer program recorded thereon for causing the computer to execute:

(a) obtaining a first image captured by a first camera disposed in a first position and a second image captured by a second camera disposed in a second position;

(b) calculating, for each of a plurality of first pixels of the first image, a first census feature amount based on a comparison between a pixel value of the first pixel and a pixel value of a neighboring pixel of the first pixel in the first image, and calculating, for each of a plurality of second pixels of the second image, a second census feature amount based on a comparison between a pixel value of the second pixel and a pixel value of a neighboring pixel of the second pixel in the second image;

(c) calculating, for each of the plurality of first pixels, a difference degree corresponding to a disparity value in a position of each of at least one of the plurality of second pixels with respect to the first pixel using the first census feature amount and the second census feature amount of the at least one second pixel;

(d) obtaining a first disparity value of each of the plurality of first pixels with integer pixel accuracy by selecting, using the difference degree, a disparity value corresponding to a lowest difference degree;

(e) extracting, for each of the plurality of first pixels, a plurality of reference pixels located in positions corresponding to the first disparity value of the first pixel and an additional disparity value different than the first disparity value from the plurality of second pixels, calculating a plurality of sub-pixel evaluation values based on a relationship between (i) the pixel value of the first pixel and the pixel value of the neighboring pixel of the first pixel and (ii) a pixel value of each of the plurality of reference pixels and a pixel value of a neighboring pixel of the reference pixel, and estimating a second disparity value of the first pixel with sub-pixel accuracy by equiangular fitting in which the plurality of sub-pixel evaluation values are used; and (f) obtaining a per-pixel disparity value in a disparity image for the first image with respect to the second image using the second disparity value of each of the plurality of first pixels.

\* \* \* \* \*